US010222291B2

(12) United States Patent
Thompson et al.

(10) Patent No.: US 10,222,291 B2
(45) Date of Patent: Mar. 5, 2019

(54) LEAK DETECTION FORMULA, ANALYZER AND METHODS OF USE

(71) Applicants: Bernie C. Thompson, Tijeras, NM (US); Neal R. Pederson, Los Alamos, NM (US); Kenneth D. Ley, Salida, CO (US); Steven G. Thoma, Albuquerque, NM (US)

(72) Inventors: Bernie C. Thompson, Tijeras, NM (US); Neal R. Pederson, Los Alamos, NM (US); Kenneth D. Ley, Salida, CO (US); Steven G. Thoma, Albuquerque, NM (US)

(73) Assignee: Automotive Test Solutions, Inc., Albuquerque, NM (US)

( * ) Notice: Subject to any disclaimer, the term of this patent is extended or adjusted under 35 U.S.C. 154(b) by 801 days.

(21) Appl. No.: 13/789,319

(22) Filed: Mar. 7, 2013

(65) Prior Publication Data

US 2014/0251831 A1    Sep. 11, 2014

(51) Int. Cl.
*G01M 3/22* (2006.01)
*G01M 3/04* (2006.01)

(52) U.S. Cl.
CPC ............ *G01M 3/226* (2013.01); *G01M 3/042* (2013.01)

(58) Field of Classification Search
CPC ............ G01M 3/04; G01M 3/06; G01M 3/12; G01M 3/20; G01M 3/222; G01M 3/223;
(Continued)

(56) References Cited

U.S. PATENT DOCUMENTS 2,228,737 A    1/1941  Tandberg et al.
2,254,609 A  *  9/1941  Kinzer .................... C09D 5/00
                                                        106/155.1
(Continued)

FOREIGN PATENT DOCUMENTS

JP         10-26572 A   * 10/1998
KR     20030073463 A   *  9/2003
(Continued)

OTHER PUBLICATIONS

English language translation of KR 2003-0073463 A, originally published on Sep. 19, 2003.*
(Continued)

*Primary Examiner* — David A Rogers
(74) *Attorney, Agent, or Firm* — DeWitt M. Morgan

(57) ABSTRACT

Detecting a leak from a site in a sealed system with a source of pressurized gas which is capable of passing through the site, a composition of matter which adheres to the surfaces of the system and which is capable of showing the presence of the gas escaping from the site. The method includes: injecting gas into the system to a pressure in excess of the surrounding pressure, and covering the external surface with the composition to identify the location of the site by the interaction of the escaping gas with the composition. The composition is foam that includes a surfactant which forms a least one bubble in the presence of escaping gas and an indicator which changes color in the presence of the escaping gas. The leak is an opening down to at least the size of a hole 0.001" in diameter. A gas detector may also be used.

6 Claims, 55 Drawing Sheets

(58) Field of Classification Search
CPC ...... G01M 3/224; G01M 3/225; G01M 3/226; G01M 3/227; G01M 3/228; G01M 3/229
See application file for complete search history.

(56) References Cited

U.S. PATENT DOCUMENTS

| | | | | |
|---|---|---|---|---|
| 2,665,257 | A * | 1/1954 | Potter | 516/14 |
| 3,287,156 | A * | 11/1966 | Griffith | C09D 5/00 |
| | | | | 116/206 |
| 3,388,587 | A * | 6/1968 | Hara | C08J 9/30 |
| | | | | 106/157.1 |
| 3,426,580 | A * | 2/1969 | Callahan, Jr. | 73/40 |
| 3,645,127 | A * | 2/1972 | Mongodin et al. | 73/40.7 |
| 3,664,965 | A * | 5/1972 | Hirota et al. | 252/408.1 |
| 3,856,465 | A * | 12/1974 | Lipscomb | G01M 3/042 |
| | | | | 252/964 |
| 4,676,931 | A * | 6/1987 | Travis | G01N 33/2847 |
| | | | | 252/408.1 |
| 4,756,854 | A * | 7/1988 | Wegrzyn | G01M 3/20 |
| | | | | 252/408.1 |
| 4,784,959 | A | 11/1988 | Wegrzyn | |
| 4,822,743 | A * | 4/1989 | Wegrzyn | 436/3 |
| 4,979,390 | A * | 12/1990 | Schupack | G01M 3/04 |
| | | | | 73/38 |
| 5,783,110 | A * | 7/1998 | Verdicchio | B01J 13/0052 |
| | | | | 252/189 |
| 6,085,576 | A | 7/2000 | Sunshine et al. | 73/29.01 |
| 6,149,952 | A * | 11/2000 | Horan | 426/87 |
| 6,647,761 | B2 | 11/2003 | Barjesteh | |
| 6,957,155 | B2 * | 10/2005 | Harada | G01M 3/229 |
| | | | | 422/186.19 |
| 7,159,445 | B2 * | 1/2007 | Bohm et al. | 73/23.2 |
| 7,448,517 | B2 | 11/2008 | Shieh et al. | |
| 7,592,184 | B2 * | 9/2009 | Khalil | G01N 21/783 |
| | | | | 422/400 |
| 7,779,675 | B2 * | 8/2010 | Wetzig et al. | 73/40.7 |
| 8,003,391 | B2 | 8/2011 | Marganski et al. | |
| 8,085,301 | B2 | 12/2011 | Hill, Jr. et al. | |
| 8,470,933 | B2 * | 6/2013 | Thorn | C08F 136/20 |
| | | | | 436/3 |
| 2004/0118185 | A1 * | 6/2004 | Duerr | 73/40.7 |
| 2005/0126265 | A1 * | 6/2005 | Herzog et al. | 73/49.2 |
| 2005/0284211 | A1 * | 12/2005 | Cram et al. | 73/40 |
| 2006/0257094 | A1 * | 11/2006 | McEvoy et al. | 385/147 |
| 2008/0128657 | A1 * | 6/2008 | Muldoon | G01N 33/18 |
| | | | | 252/408.1 |

FOREIGN PATENT DOCUMENTS

WO   WO 2000/02029 A1 * 1/2000
WO   WO/2011/141707 A1   11/2011

OTHER PUBLICATIONS

Technical Grade Battery Cleaner with Acid Indicator, CRC Industries, Inc., 2005.*
Leak Detector Plus, Wurth, May 2012.*
Compressed Gas Pressure Regulators. Datasheet [Online], Thomasnet, Jan. 13, 2013 [retrieved on May 9, 2014]. Retrieved from the Internet: <URL:http:www.thomasnet.com/articles/instruments-controls/gas-pressure-regulators>, p. 1.
CO2 Responder Portable Carbon Dioxide Detector, Datasheet [online]. Calibration Technologies Inc., Feb. 2013 [retrieved on May 12, 2014]. Retrieved from the Internet: <URL: https:/www.ctiengineering.com/images/co2%20responder%20brochure.pdf>; pp. 1 and 2.

\* cited by examiner

| Order | Ingredient | Grams | Final wt% |
|---|---|---|---|
| 1 | DI H2O | 391.32 | 97.55 |
| 2 | SDS | 6.79 | 1.69 |
| 3 | HTABr | 0.0653 | 0.02 |
| 4 | PS-80 | 0.2189 | 0.05 |
| 5 | Phenol red | 0.04 | 0.01 |
| 6 | 0.1M sodium hydroxide | 2.70 | 0.67 |
| Total | | 401.14 | 99.99 (not 100 because of rounding) |

FIG 11

| Order | Ingredient | Grams | Final wt% |
|---|---|---|---|
| 1 | DI H2O | 500 | 86.74 |
| 2 | Glycerin | 72.5 | 12.58 |
| 3 | HTABr | 0.875 | 0.15 |
| 4 | NaCl | 1.25 | 0.22 |
| 5 | Xanthum gum | 0.1875 | 0.03 |
| 6 | Phenol Red | 0.15 | 0.03 |
| 7 | 0.1M NaOH | 0.5 | 0.09 |
| 8 | Triton-114 | 1.0 | 0.17 |
| Total | | 576.46 | 100.0 |

FIG 12

LEAK DETECTION FORMULA, ANALYZER AND METHODS OF USE

CROSS-REFERENCE TO RELATED APPLICATIONS

This application is a continuation of provisional application Ser. No. 61/759,782, entitled "Leak Detection Analyzer," filed Feb. 1, 2013. This application is also a continuation-in-part of application Ser. No. 13/789,179, now U.S. Pat. No. 9,390,565, entitled "Leak Verification and Detection for Vehicle Fuel Containment Systems", filed Mar. 7, 2013, which is a continuation-in-part of application Ser. No. 13/115,516, entitled "Leak Verification and Detection for Vehicle Fuel Containment Systems", filed Mary 25, 2011 which, in turn, is a continuation of provisional application Ser. No. 61/348,078, entitled "Leak Verification and Detection for Vehicle Fuel Containment Systems", filed May 25, 2010. This application claims the priority to and the benefit of all four applications.

FIELD OF INVENTION

This invention relates to the field of leak detection, more particularly to finding small size leaks in sealed systems, quickly and accurately. This method uses pressurized gas that is put into a sealed system in order to find leakage; and an electronic sensor that senses the presence of the pressurized gas which has escaped from such sealed system to quickly find the base (or general) location of such leak(s). For each base location leak site a composition of matter is then applied that, among other things, changes color to indicate the exact location of the leak. A sealed system is a system that, when closed, is not intended to leak its contents (e.g., a gas, fluid or vapor) to the environment external to the system, but does so through one or more unintended small openings commonly referred to as leak sites. Leak sites may result from, for instance, the use of defective materials, defective manufacturing, defective or improper assembly, or post manufacturing damage. Some sealed systems have no access in which case, for testing purposes, an access port would have to be added. Other sealed systems have designed in access where fluids, vapors or gases can be added or removed, such as vent plugs, and gas caps on vehicle fuel containment systems. Further, some sealed systems are considered to have acceptable leakage if the collective cross-sectional area of the leak site (or sites) does not exceed a predetermined amount. For instance, in cars and light trucks manufactured and sold in the United States, the fuel containment system (e.g., gas tank, fuel sending unit assembly, carbon canister, vent control valve, purge control valve, fuel fill tube, gas cap, fuel vapor recovery system) is considered a sealed system. Leaks greater than 0.040" in diameter on 1996-2000 systems and 0.020" in diameter on later model systems must be identified and have the check engine lamp illuminated with a diagnostic trouble code (DTC) stored in the Engine Control Module. Sealed systems with leaks areas smaller than the specified limits are considered to have acceptable leakage for the design of the system.

INCORPORATION BY REFERENCE

The disclosures of Ser. Nos. 61/759,782, 13/789,179, 13/115,516 and 61/348,078 are incorporated by reference.

BACKGROUND OF THE INVENTION

Locating leakage from sealed systems has been a problem for many years, and is becoming more difficult as environmental considerations impose more stringent standards on leakage. In the automotive industry, for vehicles manufactured from 1996 to 2000, the maximum allowable leakage for the fuel containment system is the equivalent of a hole 0.040" (or 1 mm) in diameter. Starting in 2000, the equivalent hole size has been reduced to 0.020" (or ½ mm). These maximums represent the total allowed for the whole system. Thus, for instance, a 2012 vehicle with three holes in the fuel containment system, each having a diameter of 0.010", exceeds the allowable limit. Further, as discussed in application Ser. No. 13/115,516, when the bell curve effect is taken into consideration, one has to test at a smaller hole diameter than the specified hole size (e.g., 0.020"). Independent of environmental standards, significant economic considerations can come into play. For instance, automotive refrigerant has been R-134a and is currently being changed out to R-1234yf. The cost for a 30 lb cylinder of refrigerant though has increased substantially from $200 for R-134a to $2000 for the new R-1234yf. If a leak is present in these new systems it will be very expensive to find such a leak by filling the system with R-1234yf just to let it leak out in order to locate the leak site. With present detection methods (particularly smoke with or without a fluorescent dye as discussed below) very small leaks (of the order of 0.015" in diameter) are difficult, if not impossible in a practical sense to locate.

U.S. Pat. No. 5,107,698 to Gilliam ("Gilliam") discloses what is known as a "smoke generating machine" that injects what is referred to as "smoke" into "any closed vacuum system" in an engine and, if there is a leak present, a visual inspection will show the leak point(s). The smoke is produced by vaporizing what is referred to as a "smoke-generating" liquid which is, preferably, non-flammable and non-toxic, such as Bray Oil Company fireproof hydraulic fluid C-635 with a flash point of 425 degrees F. Preferably, the smoke generating machine maintains the temperature of the smoke generating liquid in the range of 240-250 degrees F. This heat allows the fluid to change states into a visible vapor (the "smoke"). This smoke is then transferred through a hose from the smoke generating machine into the sealed system. It is claimed that if a leak is present the smoke will escape out of the leak allowing a visual trace to be present. However, Gilliam provides no information as to the size of holes (either a range or, particularly, the lower limit) at which his smoke is effective for its intended purpose. Though not stated, obviously Gilliam's smoke will not escape through openings smaller that the size of the vapor droplets. Since the smoke is actually a heated hydrocarbon that changes from a liquid to a vapor, this vapor is comprised of small hydrocarbon vapor droplets. This vapor will have problems when it contacts obstructions in its path. For instance, these vapor droplets will impinge on the obstructions, walls, or linings of the sealed system and will congeal together. Additionally in turbulent air flow the droplets will congeal together forming larger droplets. These size droplets will not be carried out of the sealed system by the pressurized air. If the vapor droplets are larger than the leak size no visual smoke will be present.

U.S. Pat. No. 5,922,944 to Pieroni et al. ("Pieroni") also discloses a smoke generating machine that is designed to inject smoke into a sealed system and, if there is a leak present, a visual inspection will show the leak point. The smoke that is produced is a hydrocarbon base, particularly a non toxic petroleum based oil, such as Citgo Oil Company's synthetic PAO 46 oil, that is also vaporized in a chamber when drops of the oil come into contact with a heating grid. The vapor droplets (or smoke) are then transferred through a hose into the sealed system. It is stated that "any leak [in the system to be tested] will allow some of the smoke to escape." It is further stated that:

> Therefore, a visible detection of escaping smoke will provide a quick and easy indication of the presence and location of the leak so that repairs might be implemented. On the other hand, should no smoke escape, then the integrity of the system to be tested is indicated to be intact and not in need of service.

However, as with Gilliam, Pieroni provides no information as to the size of holes, either a range or, particularly, the lower limit, at which their smoke is effective for its intended purpose. Though not stated, obviously such smoke will not escape through openings smaller that the size of the vapor droplets. Further, EP 1 384 984 A1 to Haddad et al. ("Haddad"), discussed in greater detail below, states that Pieroni describes "a smoke generating machine that has particular application for producing smoke to identify the presence an location of relatively large leaks in the fluid system." Both Pieroni and Haddad are commonly owned by Star Enviro-Tech, Inc.

The problem with the above described apparatus and methods is two fold: first the smoke must come out the leak site in order to locate the leak site; and second it must be visible. With the advent of the need to detect very small leaks it has become apparent that (perhaps because of the size of the vapor particles; perhaps because of the pressure at which the smoke is used) smoke will not discharge out such size leaks. Further, even when smoke passes through an opening, particularly from leak sites that are smaller than 0.020" in hole diameter size, and more particularly those 0.015" in diameter and smaller, it may not be visible. Additionally even if a large leak is present, such as a 0.040" in hole diameter size, and the sealed system has a substance contained within it such as gasoline in an automotive fuel containment system, the gasoline vapor can mix with the smoke (a vaporized hydrocarbon) and eliminate the visual smoke. Turbulent air flow that allows the vapor droplets to congeal together or impinge on surfaces will also result in limited or no smoke from large or small leak sizes. Further if a larger leak is present and the air is moving across the leak site the visual smoke may not be able to be seen. Even if the smoke is escaping from the leak site, the light source will need to be in an optically ideal position in order to visually see the smoke. Additionally, since the smoke is a hydrocarbon based composition, it will coat the inside of the sealed system. Fluorescent dye, as discussed below, can also coat the inside of the system. In either or both cases these coatings may be detrimental to the type of system being tested. Finally, these smoke machines are of a low pressure type, usually about 0.5 PSI. This limitation eliminates testing both low and high pressure systems (at their working pressures) with these type machines.

EP 1 384 984 A1 to Haddad et al. discloses a smoke generating machine that can be used in potentially explosive environments "such as, but not limited to, the evaporative or air brake system of a motor vehicle," and which can locate "relatively small leaks". In order to limit an explosion a non-combustible gas is used with a hydrocarbon based smoke that carries a fluorescent dye for detecting the presence and location of "small leaks" by leaving a fluorescent trace at the site of the leak. An ultra violet light source is then shined over the sealed system. If there is a leak present the dye trace can be seen at the leak site under ultraviolet light. More specifically, a commercially available fluorescent dye is mixed into the smoke generating oil in the smoke generating machine (which appears to be essentially the same as that disclosed in Pieroni). This mixture of the oil and dye is then vaporized by the heating grid of the smoke machine so that the smoke acts as a reliable carrier of the vaporized fluorescent dye through the system being tested and past the site of any leak. It is further asserted that the fluorescent dye "should have high flash and boiling points to avoid a premature breakdown when the oil supply 8 to which the dye is added is vaporized into smoke" within the smoke generating machine. There is no chemical reaction between the fluorescent dye and the smoke or the contents (if any) of the sealed system. Thus, the dye that is added to the material used to generate the smoke is unaltered. If it comes out a leak, it is still the same compound that was added to the smoke machine.

While Haddad makes a number of references to "relatively small leaks" (in apparent contrast to the detection of "relatively large leaks" by the method and apparatus of the '944 Patent), "small holes" and "very small holes". However, as with the disclosure of Pieroni, no hole size, or sizes, or range of hole sizes is specified. Again, to be effective it is necessary to have smoke leaving the leak site either to carry dye trace or to be visually seen leaving the leak site.

Problems and Objects

The above described systems all have problems locating leaks in a number of real world situations, including being limit to detecting holes larger than 0.015" in diameter. As stated in Motor, April 2010, M. Warren ("Warren"), "smoke works great for 0.040- and 0.020-leaks". This article also states: "When you've determined that you're looking for a small leak (less than 0.020 in or 0.5 mm), then secure a dead calm environment." Finally, the smoke plume illustrated in FIG. 1 of this article is taken with "near perfect illumination, with two high-powered lights from two different angles." Neither of these conditions (dead calm or perfect illumination) are encountered in auto repair shops. The Warren article also makes reference to a gas analyzer, sometimes also known as a four or five gas analyzer, which is instrumentation that is designed to read the emission levels from a running engine at the exhaust tailpipe. Such instrumentation includes the instrument itself including a housing (which includes digital readouts, a pump, an infrared detector cell and chemical cells), a probe (designed to be inserted in the tailpipe) and a hose (typically 20 feet long) interconnecting the probe with the instrument. The instrument is designed to be set on a work bench. Hydrocarbons (in parts per million ("PPM"), carbon monoxide (CO) (in %) and carbon dioxide ($CO_2$) (in %) are determined with the use of a sample tube with infrared light and an infrared collector. The oxygen ($O_2$) is read in percent and the nitrogen oxides (NOx) in PPM by chemical cells. Neither the probe nor the hose include any sensors. Rather the exhaust gases to be analyzed are pulled through the probe and the hose by the pump. Such gas analyzers were not designed for identifying leaks and, as demonstrated by applicants test results discussed in reference to FIGS. 9A-O is not effective. Further, the hydrocarbons sensed by a gas analyzer are not a gas, but rather either a vapor or an aerosol. (In referencing Warren, no representation is made that this article or any associated use constitutes prior art.)

Further, with regard to fluorescent dyes, in order for the dye trace to be present at a small leak site it has been suggested that the system should be pressurized with the smoke for 15 to 30 minutes. However, applicants' own testing (i.e., smoking the fuel containment system of a vehicle for up to 30 minutes) suggests that this will not help in identifying the location of small leaks.

What is needed is a method and apparatus that can quickly and accurately find leaks within sealed systems and is not subject to the hole size limitation of smoke based leak detection systems. These leaks that must be located can be large (greater than 0.040" in diameter), or small leaks (down to at least 0.001" in diameter), or anywhere in between, and can be located along a seam or molding line, at connection points between components, or due to the porosity of the material, or be so small that the human eye cannot see them. What is also needed are systems that can test both low pressure and high pressure systems at their working pressure. What is further needed is an apparatus and method that does not require smoke generating machines or the chemicals used in generating the smoke, and can be used in varying lighting conditions (including poor lighting) and in the presence of moving ambient air. The present invention accomplishes these goals.

SUMMARY OF THE INVENTION

The present invention allows fast, accurate leak testing to be done in the field, in varying lighting conditions (including poor lighting), where the ambient air is moving, and without the need for a smoke generating machine or the associated chemicals (including a fluorescent dye). Hole sizes as small as 0.001" in diameter can be repeatedly detected. It accomplishes this by the use of a gas from a source external to the system being tested, the pressure of which can be set or adjusted depending upon the application, a gas sensor and a leak finding composition of matter which foams (or is in the form of a foam) on the surface(s) being tested for leaks.

The sealed system to be tested is charged with pressurized gas from an external source, one that will react with at least one constituent of the foam of the present invention to create a color change, such as carbon dioxide ("$CO_2$"). The pressure to which the sealed system will be charged is set depending on the type of system being tested. Examples of both wet and dry systems include but are not limited to: (1) a fuel containment system in an automobile which would have a testing pressure of 0.5 psi (pounds per square inch); (2) internal combustion engine cooling systems having a testing pressure of 5-15 psi (e.g. radiator, heater core, water pump, hoses, heads); (3) air compressors and systems having a testing pressure of 90-200 psi; (4) vehicle air ride systems having a testing pressure of 20-200 psi; (5) vehicle air brake systems having a testing pressure of 100-120 psi (e.g., compressors, reservoirs, control valves, actuators, hoses and lines); (6) pressurized holding tanks or pipes, hoses and reservoirs, for pressurized air or gas systems (e.g., natural gas 15 psi); (7) a household water pipe having a testing pressure of 30-50 psi; (8) an air conditioning system or refrigeration system having a testing pressure of 100-200 psi; and (9) a hydraulic system having a testing pressure of 200-5000 psi. This is accomplished by, for instance, using a pressure regulator on a pressurized tank or bottle of $CO_2$ which, in turn, is connected to the sealed system. The pressure regulator will allow the $CO_2$ to enter into the sealed system at the desired pressure. Also, if necessary, it will allow the pressure to be adjusted during testing. The sealed system now having a higher pressure internally than the surrounding area around the sealed system, will allow the $CO_2$ to escape out of the sealed system if one or more leaks are present. Further the preferred gas $CO_2$ has very small molecules that will escape the sealed system through very minute leak sizes (e.g., less than 0.001" in diameter).

Once the sealed system is pressurized as discussed above it will be necessary to use a device on the outside of the sealed system that can detect the presence of escaping gas (e.g., $CO_2$), if any. Escaping $CO_2$ will in most cases be detected with instrumentation including an electronic sensor capable of detecting very minute traces of, in the preferred embodiment, $CO_2$. The electronic sensor is connected with, preferably, both a visual indicator lamp and audio alert alarm so that when $CO_2$ is detected both visual and audio alerts are activated.

With the above described method and instrumentation a very small leak to a very large leak can be isolated to a small area. While the detector can quickly and easily locate the general area (base location) of the leak, it may not be able to determine the exact location. Thus, in many applications, and particularly where the leak is very small, it will be necessary to initiate a second test in order to determine the exact location of the leak or leaks. This second test (or second part of the testing sequence) is accomplished using a leak finding composition that is applied to the base area identified by the detector. Preferably, this is a surfactant containing solution that: (1) readily adheres to the surface(s) (e.g., metal, plastic) being tested for a leak; (2) that foams when it is sprayed on (or otherwise applied to) the base area; and (3) which is capable of forming bubbles over the location of the leak in the presence of the escaping gas. However, it has been determined that a large leak size, or sufficiently high pressure, or both, will allow enough gas to be released that the foam cannot hold the pressure and the bubble(s) indicating the leak location will pop almost immediately. Different surfactants or chemicals can be used to strengthen the surface tension of the foam making it much harder for the bubble(s) to break. However, even with greater surface tension, the combination of leak size and applied pressure can break the bubble(s) that indicate leakage. The foam may or may not be forced apart leaving a visual hole in the foam where the leak site is located. Thus, in order to determine the location of the leak even if the bubble(s) cannot be formed (or maintained), and a visual hole has not been produced, a colorimetric pH indicator is added to the foam forming solution. With the use of $CO_2$, the preferred indicator is one of the colorimetric pH indicators such as phenol red. The phenol red when added to the leak finding solution turns the solution pink (fuchsia) in color. When this pink leak finding foam is then applied to the leak area the $CO_2$ being released from the leak will react with the water base in the foam turning it acidic, namely: $CO_2 + H_2O \rightarrow H_2CO_3 \rightarrow H+ + HCO_3 =$ carbonate acid. The phenol red indicates the presence of an acid with a color change, namely from pinkish to yellow. Phenol red exhibits a gradual transition from yellow to pink over the pH range 6.8 to 8.2. Above pH 8.2, phenol red turns a bright pink (fuchsia) color. Conversely, it will change from pinkish to yellow color when the pH value decreases. So, as initially applied to the base area, the foam is pink (fuchsia) to red in color However, as the $CO_2$ reacts with the water the resulting acid will change the color around the leak site to yellow. Additionally the gas could be one that has a pH lower than 6.8 or the gas could carry chemistry that is lower than a pH 6.8. Either of these would result in a color change at the leak site due to the leak finding solution. With this indicator added to the leak finding solution it will not matter if the bubble(s) form. If the leak finding solution bubble(s) cannot form, the color change from pinkish to yellow will show the exact location of the leak. If the bubble(s) are able to form, the presence of the bubble(s) and the color change will show the exact location of the leak. In this way either indictor, bubble(s) or color change, will show the exact location of the leak point. The surfactants that are used to make the leak finding solution can be many.

BRIEF DESCRIPTION OF THE DRAWINGS

FIG. 11 is a chart of the preferred leak finding solution; and

FIG. 12 is a chart of the composition of an alternate leak finding solution.

DESCRIPTION OF THE PREFERRED EMBODIMENT

Figure 1:
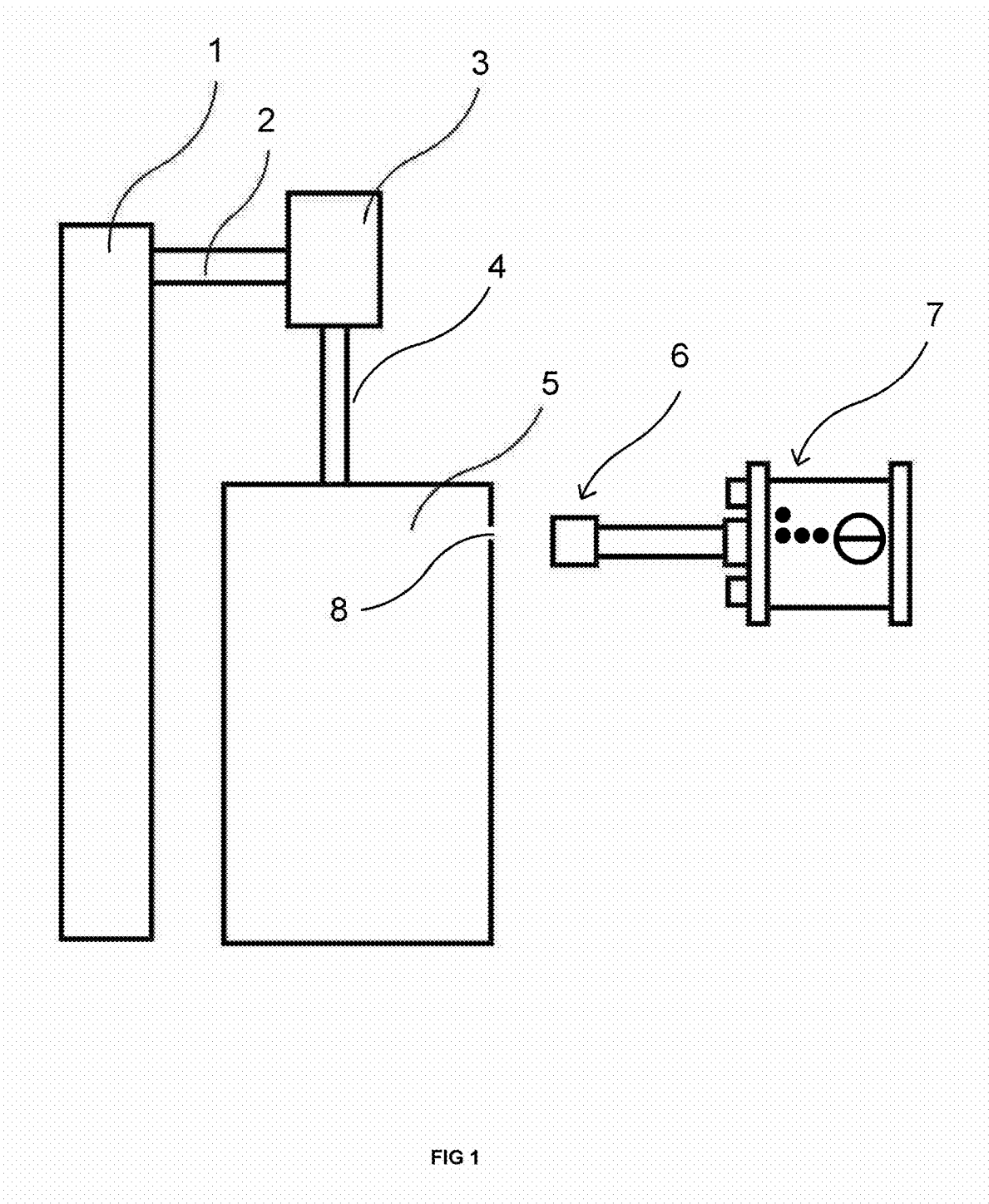
FIG. 1 is a block diagram of the leak detection system with the $CO_2$ detector.
Figure 2:
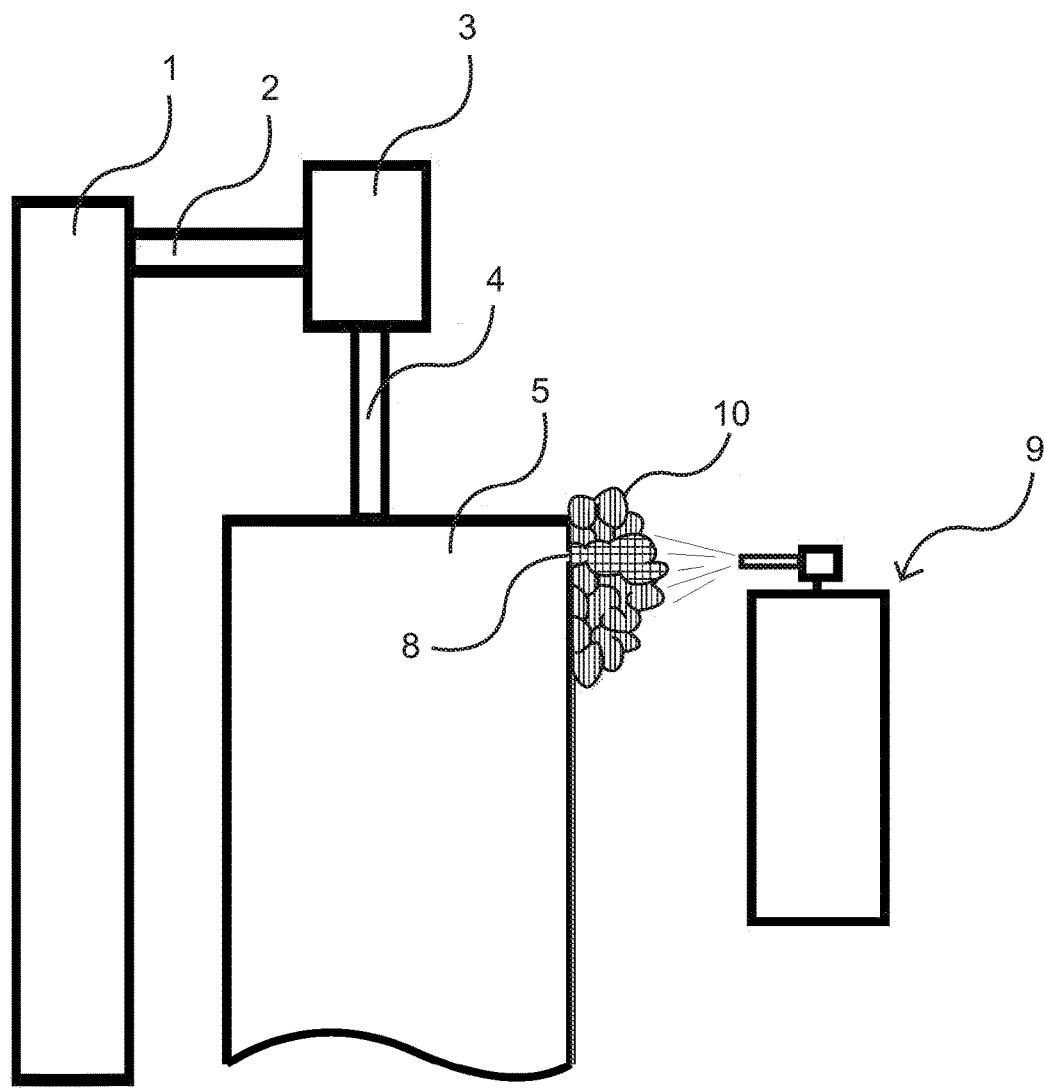
FIG. 2 is a block diagram of the leak detection system illustrating the application of the foam to the leak area and the change in color from pinkish to yellow in the presence of $CO_2$ escaping from a leak.

FIGS. 1-2 illustrate the leak detection system of the present invention, including the application of the foam. In FIG. 1 the $CO_2$ pressurized bottle 1 is connected to a conventional pressure regulator 3 through hose 2. In operation, the service person will adjust pressure regulator 3 to the correct pressure for the system being tested. Hose 4 connects to sealed system 5. Thus, the pressure regulator 3 feeds $CO_2$ from bottle 1 into sealed system 5 through hose 4. If one or more leaks are present in sealed system 5 then $CO_2$ will escape out of the leak site(s) into the surrounding area. As illustrated, sealed system 5 has a leak at leak site 8 which leaks $CO_2$ into the surrounding area.

After pressurizing system 5, a service person looking for leakage then moves $CO_2$ detector 7 with sensor 6 round the sealed system 5. Where $CO_2$ is leaking out of sealed system 5, sensor 6 detects the presence of this gas in the surrounding area. Detector 7 reads the sensor's voltage change that breaks a set threshold, and the visual alert lamp and audio alert are turned on. These alerts let the service personal know that a leak is present in the general area where the gas is sensed. As discussed below, the service person can then adjust the sensitivity in order to further isolate the area of the leakage.

Figure 3A:
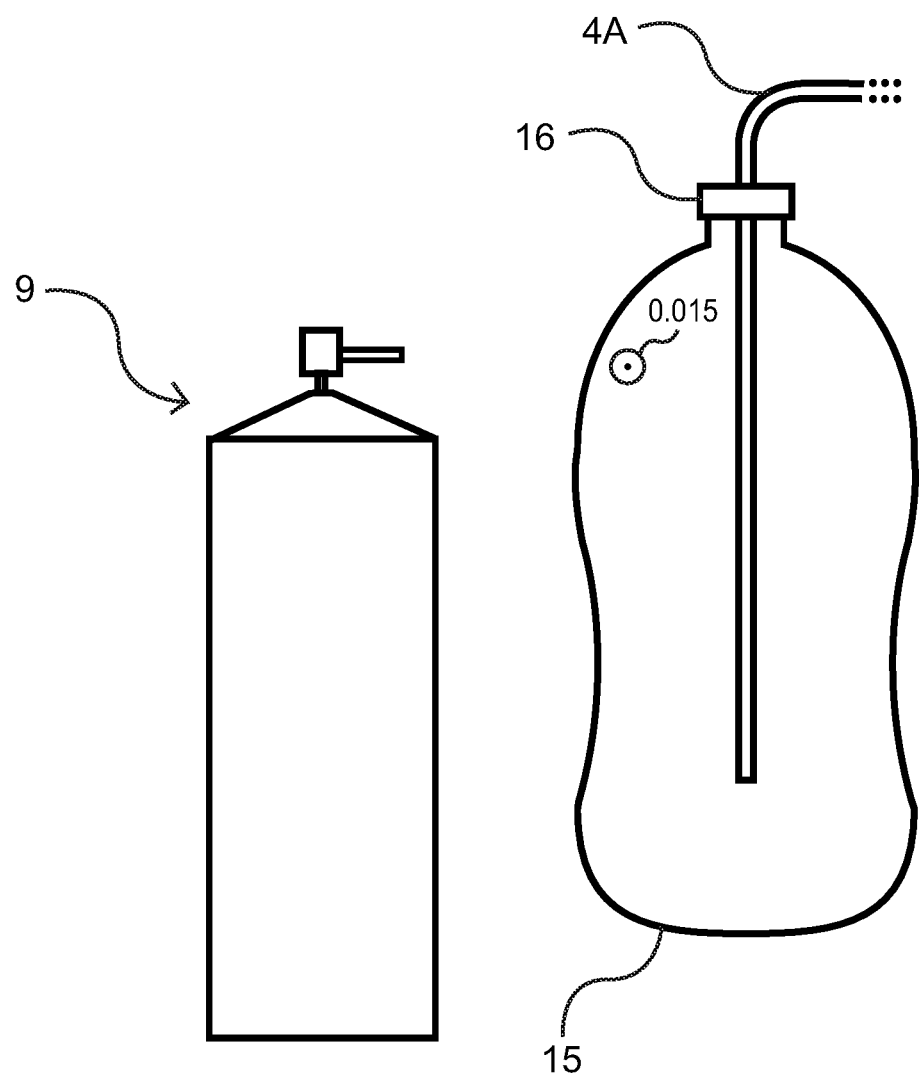
FIGS. 3A-F is a series of line drawings illustrating a plastic bottle (having a 0.015" diameter leak) pressurized with $CO_2$, the application of the foam of the present invention, the change in color (from pink to yellow in the presence of $CO_2$), and the formation of a bubble (FIG. 3F)
Figure 3B:
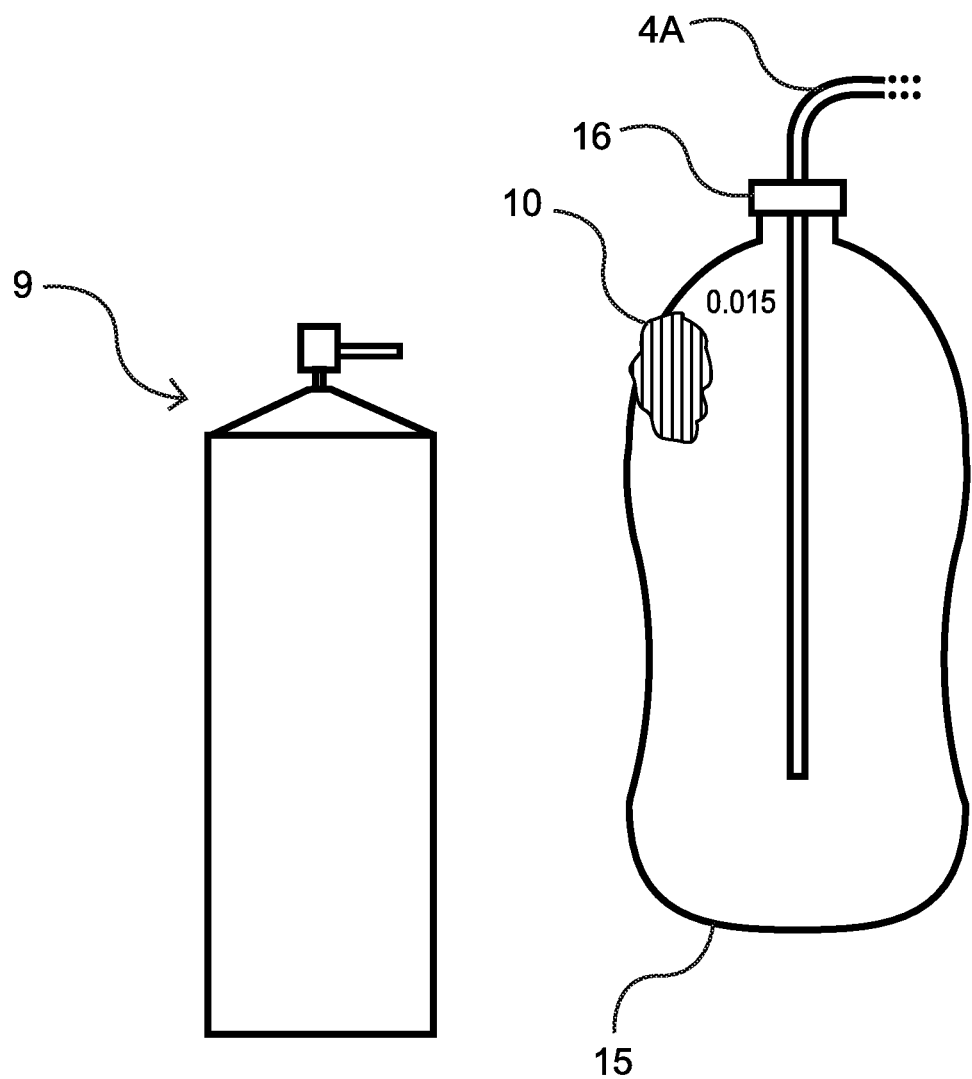
Figure 3C:
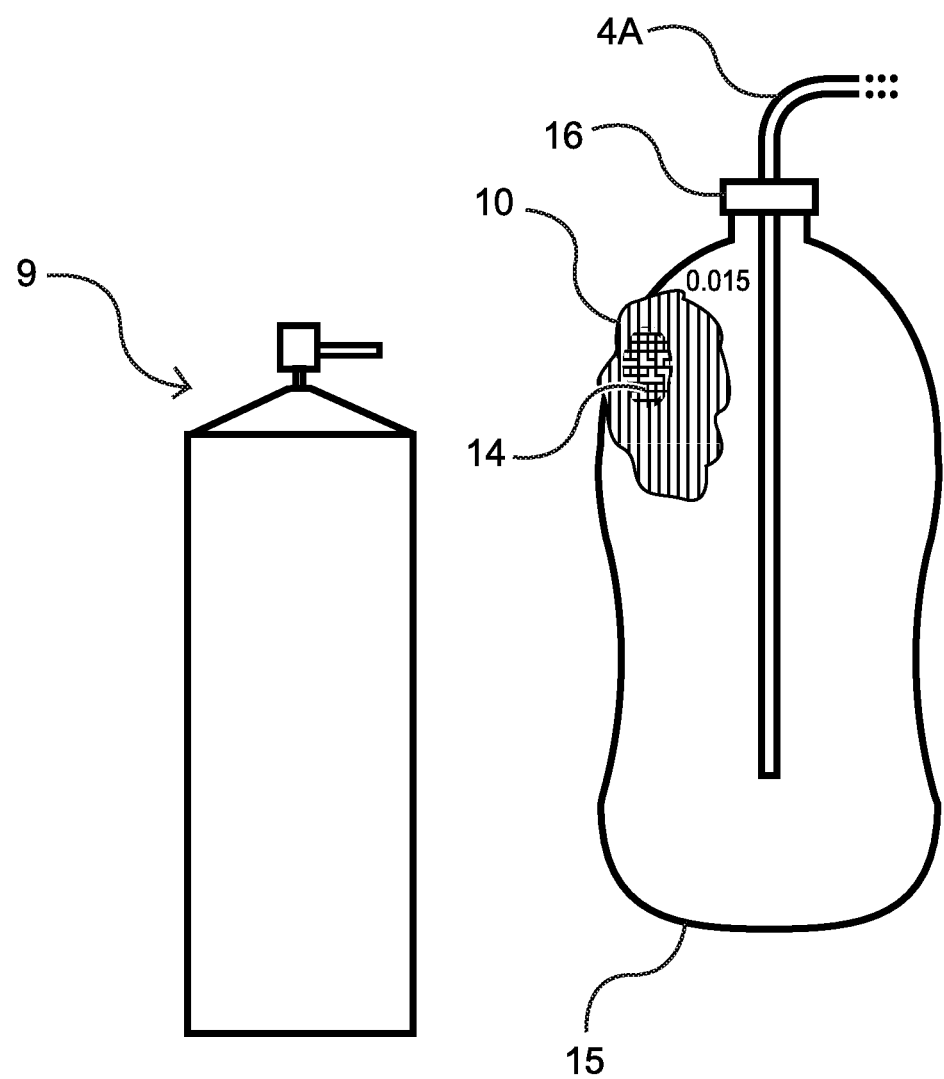
Figure 3D:
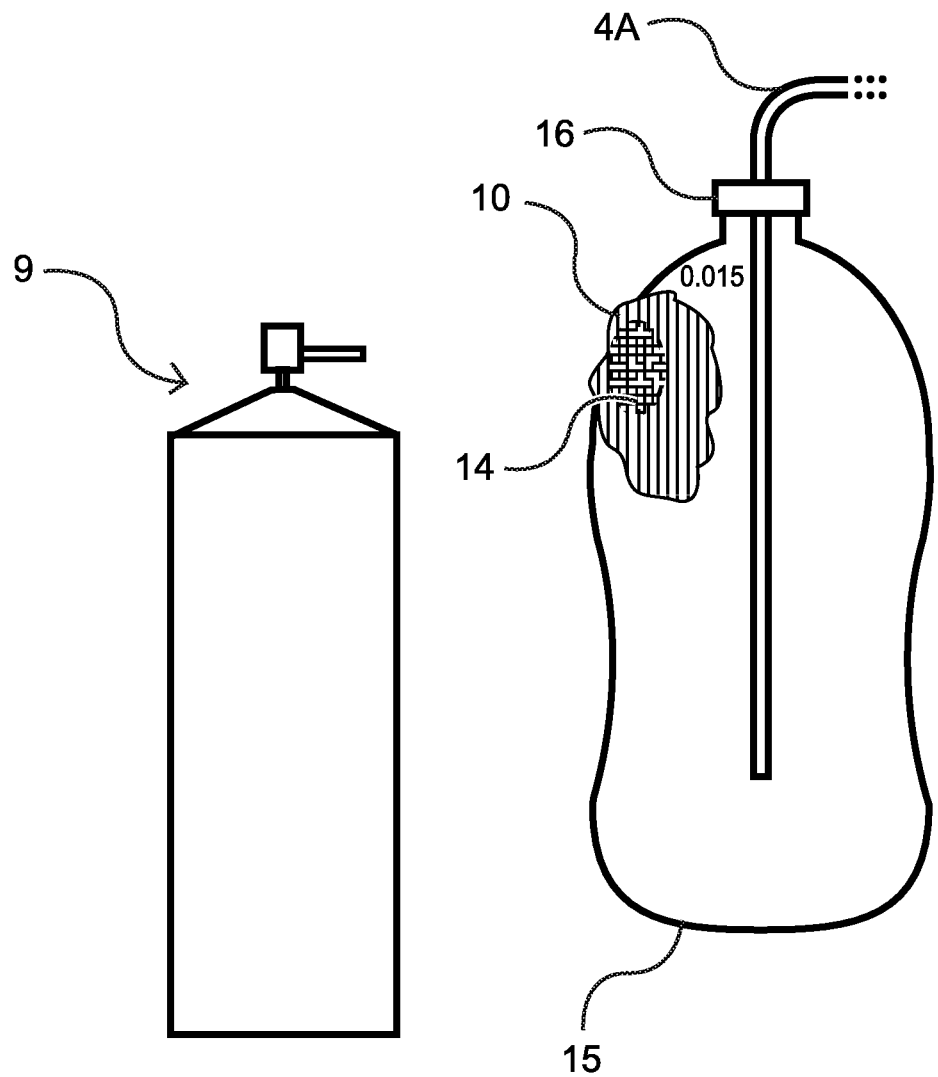
Figure 3E:
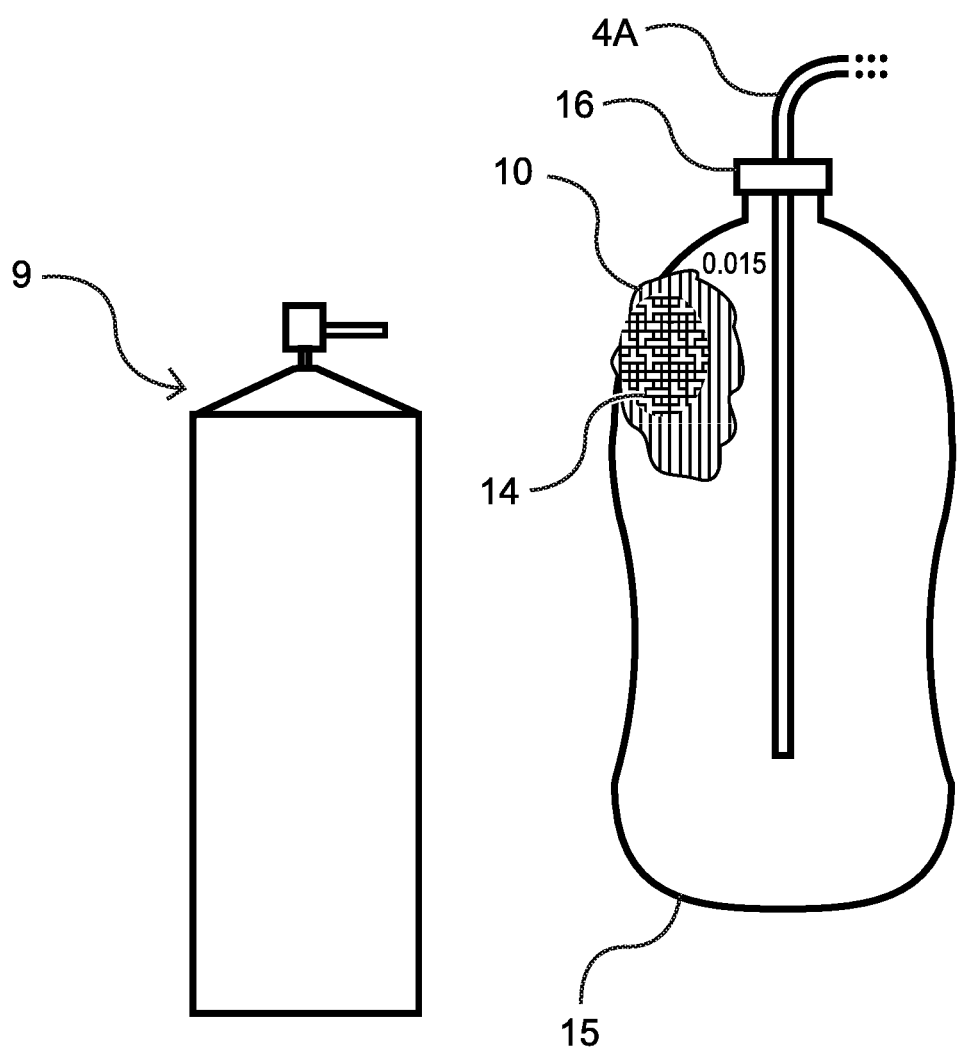
Figure 3F:
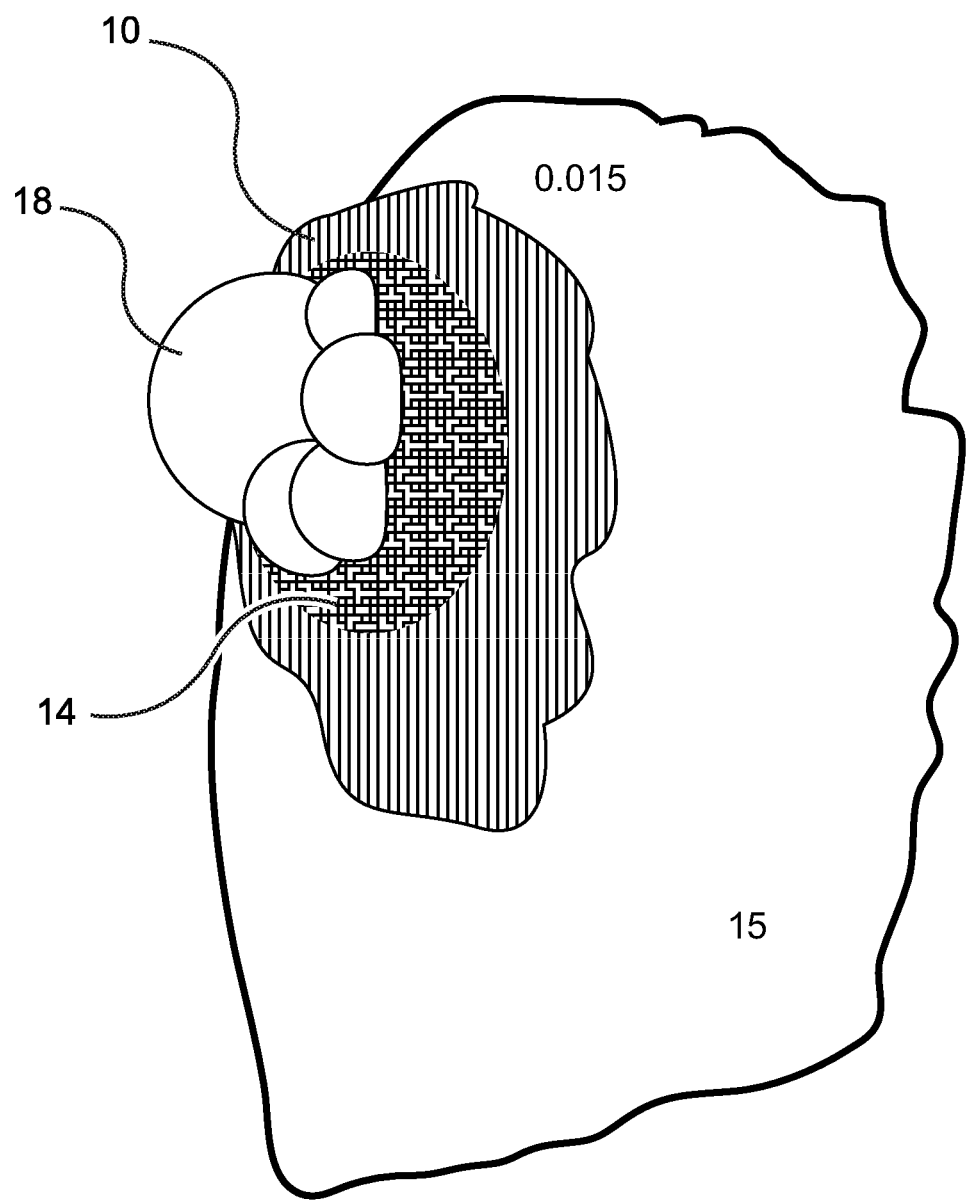

With reference to FIG. 2, the service person now having identified the base area where the $CO_2$ leakage is occurring takes leak finding solution applicator 9 and sprays the area with the leak finding solution (not shown) which forms foam 10. Foam 10 produces bubble(s) and undergoes a color change from pinkish to yellow at leak site 8 due to the presence of escaping $CO_2$. The foregoing is dramatically illustrated in FIGS. 3A-F, a time sequence of drawings corresponding to the originally filed color photos, where the sealed system 5 takes the form of a plastic bottle 15 having a cap 16 and, approximately a 0.015 inch diameter pin-hole leak (not visible in the originally filed color photo, but circled in black in FIG. 3A). The bottle is pressurized with $CO_2$ from a tank (not shown) via the line 4A. When leak finding solution comes into contact with the exterior of the plastic bottle 15 a pink foam 10 is formed. See FIG. 3B. As is evident from FIGS. 3C-E, as the $CO_2$ escapes from the pin-hole leak the color of the foam 10 over the leak site starts to change from pink to yellow 14 as such $CO_2$ reacts with the water base in the foam turning it acidic. Further chemistry details are set forth in the Summary of the Invention, above. As is evident from examining FIG. 3F, bubbles 18 are also forming. However, as previously discussed, under certain conditions bubbles may not form but the color change takes place. Either way, the service person now has identified the exact location of the leak.

It would also be apparent that, under certain circumstances, the service person would not need to first locate the general area of a leak with the $CO_2$ leak detector. Rather he could fill the sealed system with the correct $CO_2$ pressure for such system and then spray the leak finding solution at critical points (or over the entire surface) of the system. The leak site can now be clearly identified by either the color change, the presence of bubbles, or the combination of color change and presence of bubbles the manifestation thereof depending on the leak size. For example, in a house under construction where the plumbing has just been installed and is leaking (this would be determined by a vacuum test where vacuum decay would indicate a leak is present somewhere in the pipes), the joints that were soldiered together are most likely where the leak is located. (The copper tubing is most likely not the source of any leak.) The system would be pressurized to the correct pressure with $CO_2$ and each joint would then be sprayed with the leak finding solution. In this way the more expensive electronic leak detector would not be used; however the location of the leak site would still be found.

Figure 4:
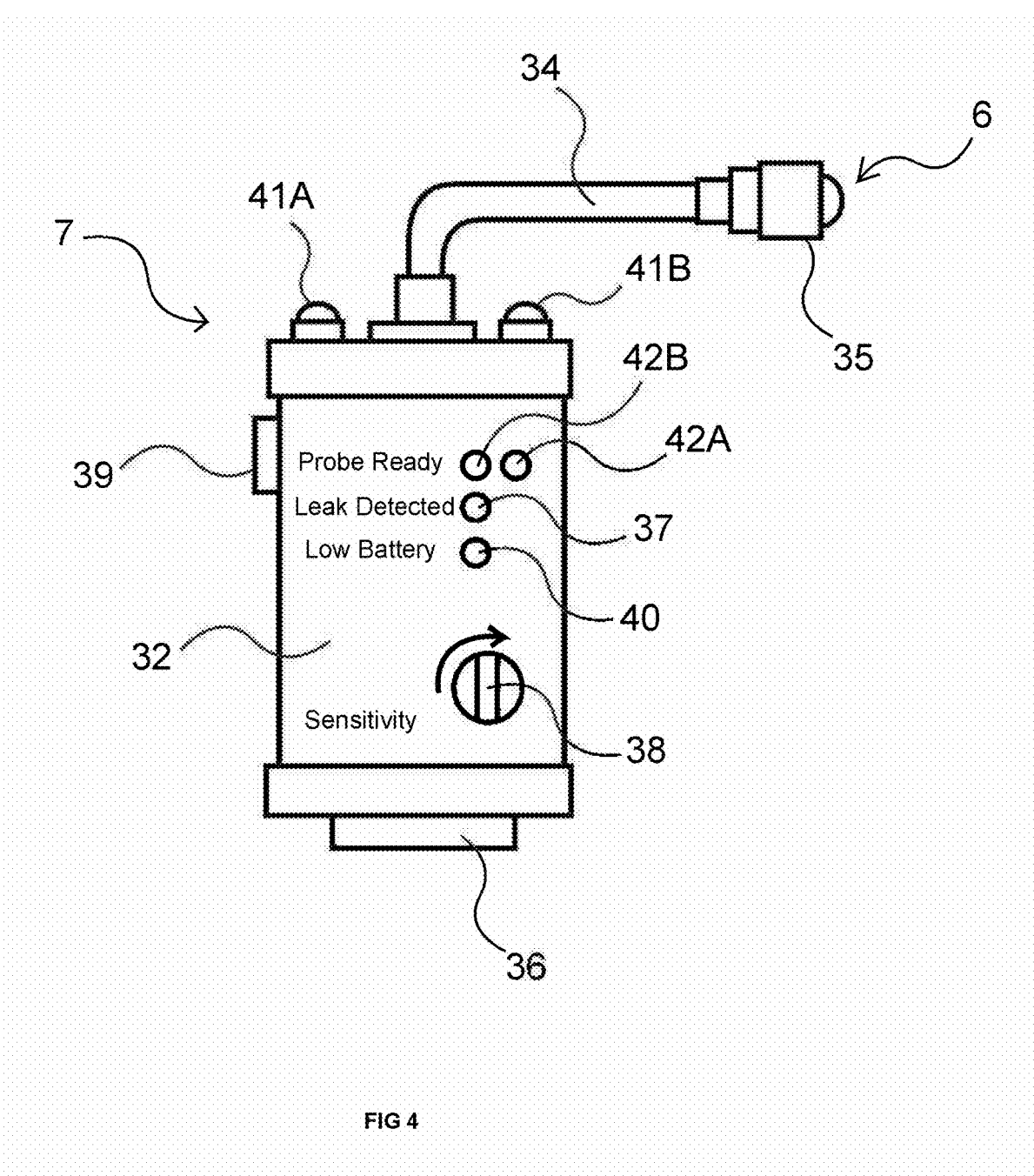
FIG. 4 is an illustration of the $CO_2$ leak detector.

FIG. 4 illustrates the $CO_2$ leak detector 7, including leak detector housing 32 and $CO_2$ sensor 6 located at end of flexible connector 34 in sensor holder 35. For testing for leakage from the fuel containment system of an automobile, connection hose 34 is on the order of 14 inches long. Depending on the application, shorter of longer lengths would be appropriate. Regardless of the length, the use of a flexible connector 34 allows sensor 6 to be moved into small, remote areas. As is also evident from FIG. 4, detector 7 includes audio alert 36, visual alert 37, off/on switch 39, low battery lamp 40, head lights 41A and B, and probe ready lights 42A (red) and 42B (green). As discussed in greater detail below, the service person can change the sensitivity of the $CO_2$ detector 7 by rotating the sensitivity knob 38.

Figure 5:
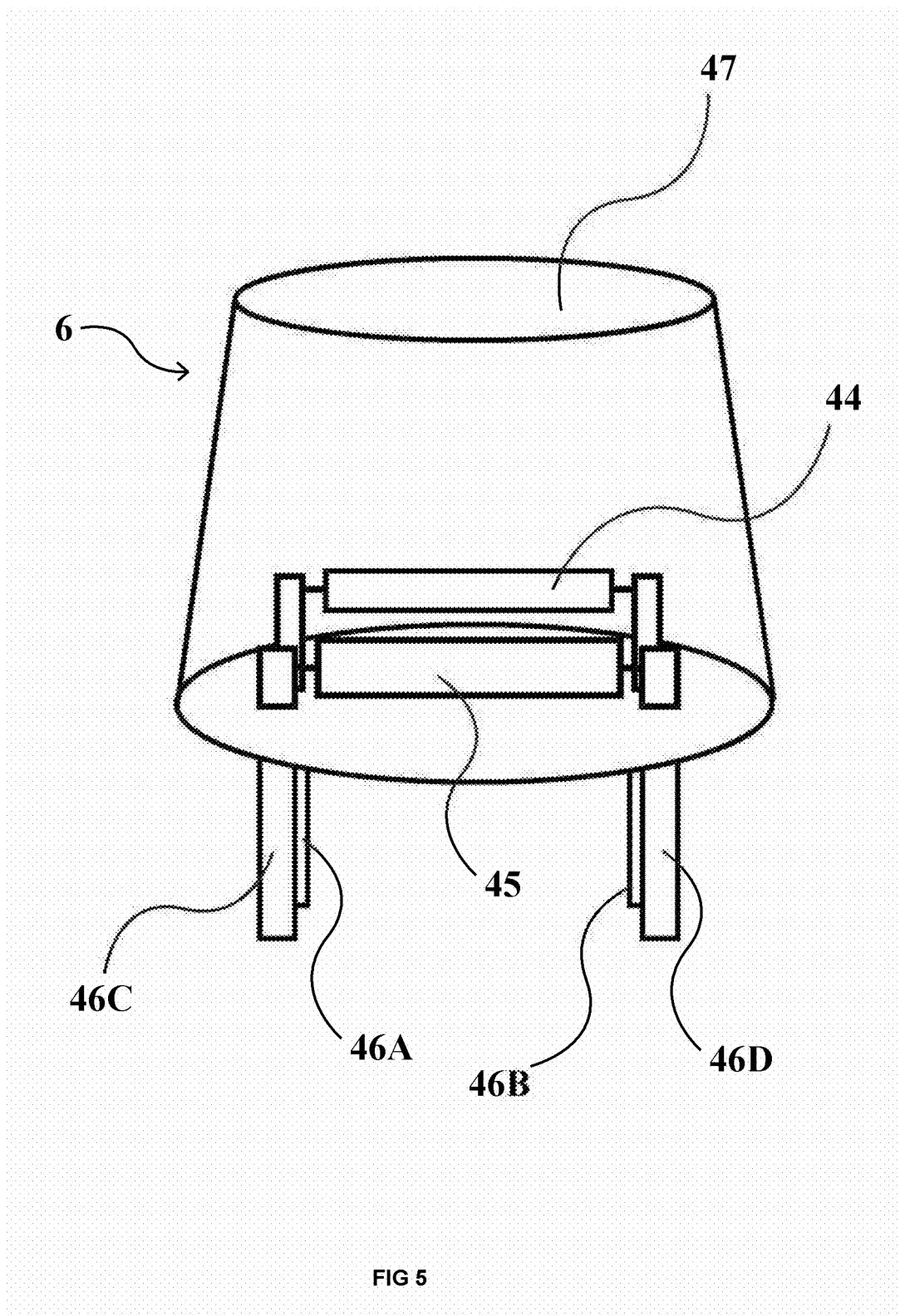
FIG. 5 is an illustration of the $CO_2$ sensor probe.

As is evident from FIG. 5, $CO_2$ sensor 6 includes sensing element 44 that produces a voltage change when it comes in contact with $CO_2$. More specifically, sensing element 44 operates on the bases of a Electromotive Force (EMF) resulting from the electrode reaction (shown below) according to the Nerst Equation (shown directly below):

$$EMF = Ec - (R \times T)/(2F) In(P(CO_2)).$$

$P(CO_2)$—$CO_2$—partial Pressure Ec—constant Volume R—Gas Constant volume T—Absolute Temperature (K); F—Faraday constant Though other sensing elements can be used, preferably sensor element 44 is a Nerst Cell in that an electrochemical reaction takes place on the cell changing the voltage output from the sensor. When the sensor is exposed to $CO_2$ the following electrode reaction occurs:

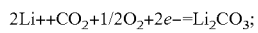 Cathodic reaction:

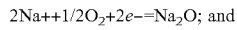 Anodic reaction:

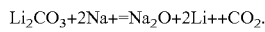 Over all chemical reaction:

In order for the sensor element to operate it must be heated slightly above ambient temperature. This is accomplished with heating element 45. Connection pins 46A, 46B, 46C, and 46D connect sensor element 44 and sensor heating element 45 to $CO_2$ detection circuit 50. Screen 47 protects sensing and heating elements.

Figure 6A:
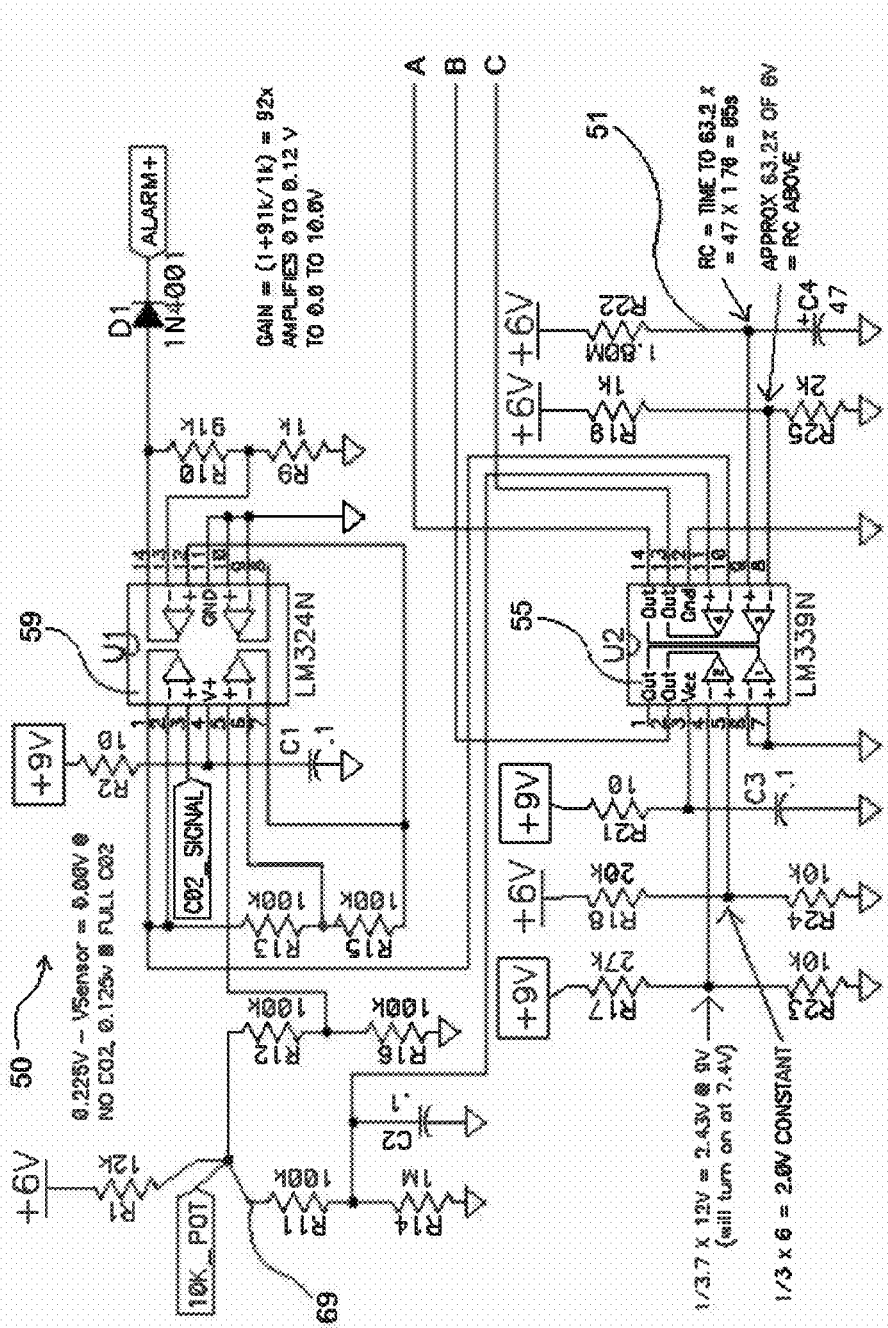
FIGS. 6A-C is an illustration of the electronics incorporated in the $CO_2$ leak detector of FIG. 4.
Figure 6B:
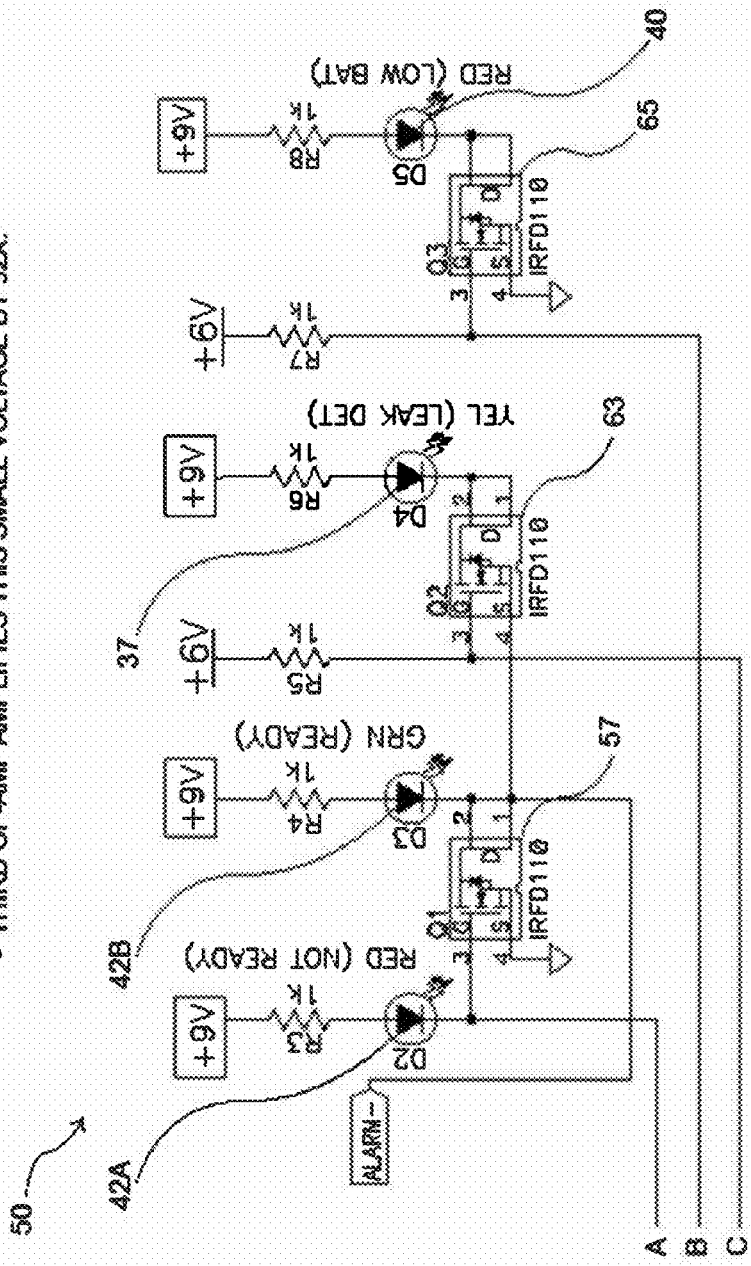
Figure 6C:
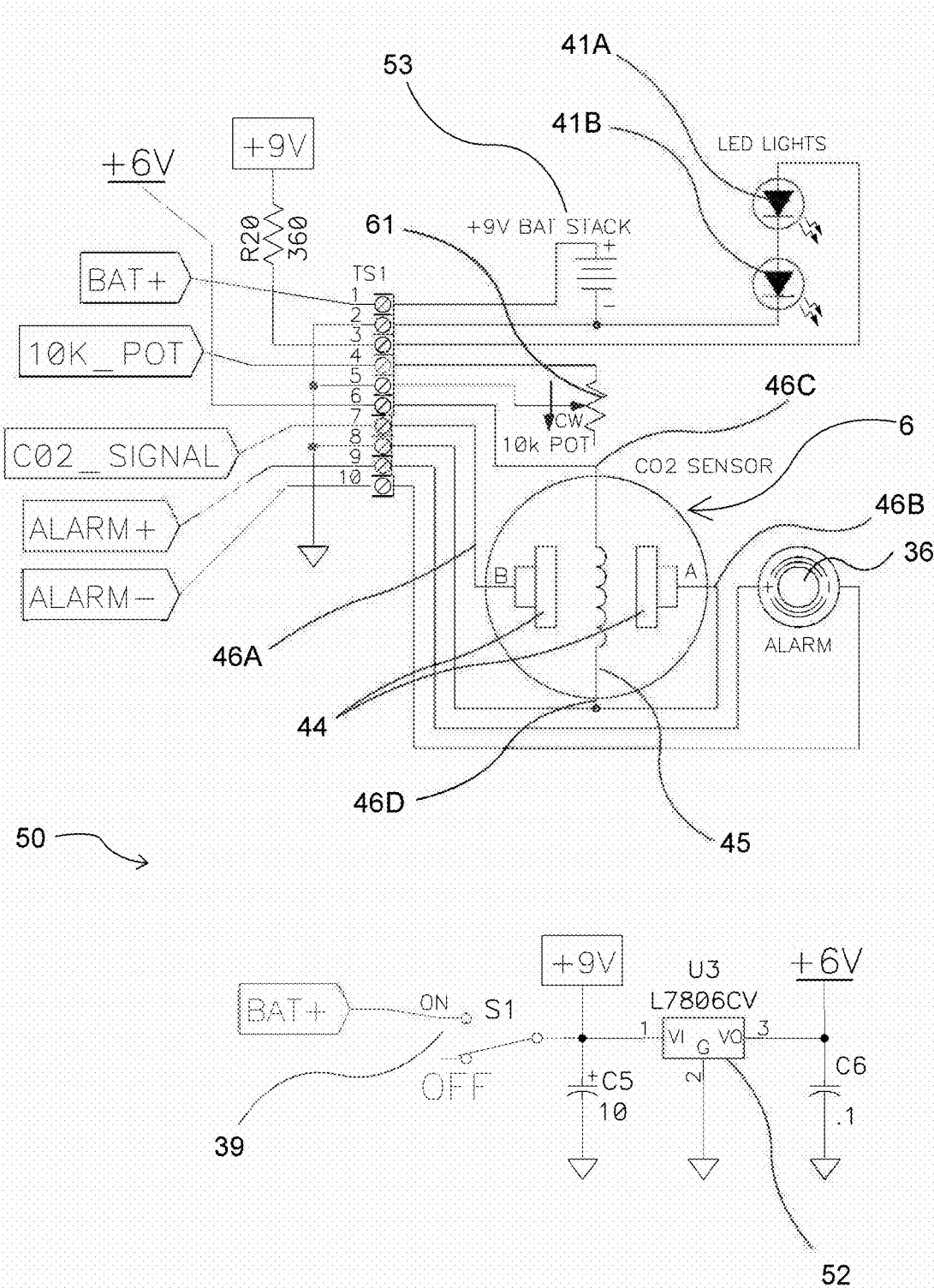

FIGS. 6A-C illustrate the leak detector circuit 50. Battery 53 supplies power to switch 39 such that when switch 39 is in its closed position battery voltage (in the order of 9 volts) is supplied to regulator 52. In turn, voltage regulator 52 regulates voltage at 6 volts for the various circuits within leak detector circuit 50. When switch 39 is first turned on battery voltage is supplied to timer circuit 51. Comparator circuit 55 uses the voltage from timer 51 to turn driver 57 on or off. So long as timer circuit 51 has not reached its preset voltage (approximately 3.79 volts) threshold driver 57 is off, in which case leak detection lamp 37 and alarm 36 do not have a ground circuit and so will remain off. However, the circuit for lamp 42A is on during timer circuit 51 warm up. Once timer circuit 51 has crossed its preset voltage threshold driver 57 is turned on, thus: completing the ground circuits for leak detection lamp 37 and alarm 36; turning off lamp 42A; and turning on lamp 42B. Regulator 52 also supplies 6 volts to heater 45 with in sensor 6 to heat $CO_2$ sensor 44 (illustrated as 44A and B in FIG. 6C). As discussed above, $CO_2$ sensor 6 sends a voltage output based on sensed $CO_2$ concentration on sensor 44. This sensed $CO_2$ concentration is converted into a voltage output change that is read by amplifier 59, pin 3. Pins 1 and 2 are connected together setting this as a buffer circuit. Amplifier 59 amplifies the $CO_2$ sensor voltage to audio alarm 36 out of pin 14. As $CO_2$ sensor voltage is amplified by amplifier 59 to audio alarm 36, voltage is increased whereby the audio output becomes louder. Comparator 55 receives buffered $CO_2$ voltage from amplifier 59, pin 1, and compares it to the threshold voltage set by 10 k pot 61, of divider (or sensitivity) circuit 69, connected to sensitivity knob 38. Via knob 38 and pot 61, voltage divider circuit 69 sets the voltage to amplifier 59 via pin 5, which voltage is amplified at pin 7. Divider circuit 69 also sets the voltage at comparator 55, pin 11, which is used to turn on leak detector lamp 37. In operation, when the voltage threshold set by sensitivity circuit 61 is crossed leak detected lamp 37 is turned on by driver 63. Comparator 55 also receives the battery voltage signal from battery 53 and compares this voltage to determine if battery voltage is below a preset threshold. If this voltage threshold is crossed driver 65 is turned on, thus turning on low battery lamp 40.

In operation, when a service person turns on detector 7 with on/off switch 39 head lights 41A and 41B are turned on by battery voltage through resistor R20 so the leak sight under inspection will be illuminated. As discussed above in reference to FIG. 5, sensor 6 has a heating element 45 to heat sensor element 44. The ready light 42A is illuminated red until sensor element 44 is hot enough to operate correctly. During this warm up the alert circuits for both alarm 36 and lamp 37, are not grounded. Once $CO_2$ sensor element 44 is at operating temperature the alert circuits are grounded, ready light 42A (red) is turned off and ready light 42B (green) is illuminated. At this time the service personal can now use detector 7 to isolate leakage from the sealed system.

In operation, once $CO_2$ sensor element 44 comes into contact with $CO_2$ the voltage across element 44 drops and a signal is sent to detector circuit 50, particularly amplifier 59, pin 3. More specifically, detector circuit 50 monitors the voltage from sensor element 44 with amplifier 59 pin 3, then buffers and amplifies the sensor element voltage. This buffered voltage is sent to comparator circuit 55 where it is compared to the voltage value from voltage divider circuit 69. When the threshold voltage of comparator 55 is crossed, comparator 55, via pin 13, turns on driver 63 which activates the alert circuit and lamp 37. The circuit (including amplifier 59, pin 14) for alarm 36 is turned on and amplified by amplifier 59. The sensitivity circuit 69 changes the voltage that goes to amplifier 59 pin 5 which, in turn, changes the volume of audio alert 36. Audio alert 36 is proportional to the account of $CO_2$ sensed (i.e., the more $CO_2$ sensed the louder the alert). The $CO_2$ detection circuit is set to turn on the alerts when the set threshold voltage is crossed, which threshold voltage can be adjusted by the operator to adjust the sensitivity of detector 7. This sensitivity allows the point that the alerts are turn on to be changed depending on the amount of $CO_2$ that is detected. This is done by a dial 38, mounted on the detector housing 32, which changes the resistance of the 10$k$ potentiometer 61 in sensitivity or divider circuit 69.

Figure 7:
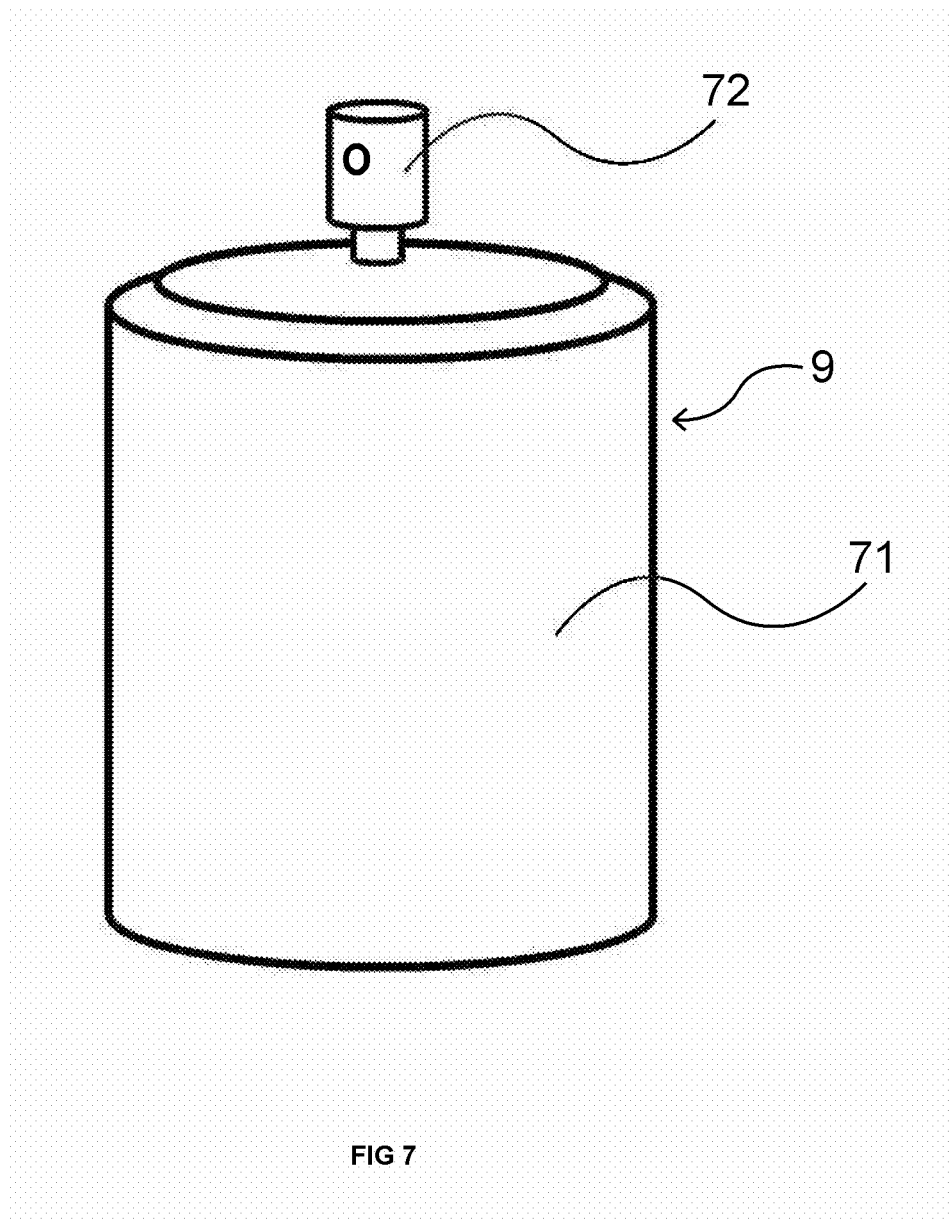
FIG. 7 is an illustration of the $CO_2$ leak finding solution preferred applicator.

The preferred form of applicator 9 for delivering the leak finding solution, illustrated in FIG. 7, is an aerosol can 71 that is pressurized with propellant and releases the leak finding solution out of nozzle 72. The preferred propellant is nitrogen. In the case of phenol red, the nitrogen assures that the indicator stays above a pH of 8.2 with extended storage. This allows the indicator (including indicators other than phenol red) to be maintained at a pH that maintains its sensing ability when exposed to the amount of $CO_2$ exiting from the leak site.

The leak finding solution is made up from mostly water, to which is added, the surfactants and indictor. The surfactants that are added to the water may be anionic, cationic, and or nonionic and may include quaternary ammonium salts such as Hexadecyltrimethyl ammonium bromide (HTABr), polyethers such as Triton X-114, emulsifiers such as Polysorbate-80 (PS-80) and other amphiphilic molecules such as sodium dodecyl sulfate (SDS). Chemicals that are added to the water may be, modifiers such as polyvinylpyrrolidone, poly(ethylene oxide), xanthum gum, guar gum, and glycerin, and electrolytes such as sodium chloride. The preferred indicator, phenol red, is added to the solution to provide the indicator that changes the leak finding solution pinkish in color. The preferred mixture is deionized water, Hexadecyltimethly ammonium bromide HTABr, polysorbate-80, sodium dodecyl sulfate (SDS), sodium hydroxide and phenol red, as indicated in FIG. 11. The numbers are rounded to the nearest hundredth. Note also that the 0.1M sodium hydroxide could be tabulated as sodium hydroxide and water, but should probably be added as a dilute solution as indicated here. It has been found that the foam formed from this composition readily adheres or sticks to the various types of surfaces (e.g., metal, plastic) that are likely to be tested for leaks.

FIG. 12 shows an alternative composition of matter that is in a container and shaken by hand. When shaken the mechanical energy of the solution hitting the inside of the container is transferred to the solution allowing the surfactants and chemicals to form a foam, which is used as a carrier for the phenol red. This foam is then removed from the container (e.g., with an instrument such as a spoon) and applied to the leak site area, or it could be directly applied by dumping the container out on the leak site. The phenol red contained in the solution changes the color of the foam to pink (fuchsia); if a leak is present the foam will change from pink to yellow at the leak site as previously discussed. As with the previously described composition, the foam produced by this formula readily adheres or sticks to the site being tested for leaks.

The use and variation of surfactants in the above described solutions allows the surface tension to be modified so the gas escaping from the leak site will normally produce bubbles. With different blends of the chemical(s) and surfactant(s) that make up the leak finding solution nozzle 52 will need to be changed in order to produce the correct foam. There is a number of different style nozzles that can be used on an aerosol can. These different nozzles will need to be matched to the properties of the leak finding solution, so as the solution can work properly, both to make foam and bubbles. With the addition of the preferred pH indicator, phenol red, the foam will become a carrier for the indicator. This carrier or foam will now be colored pink, which will allow the foam, when applied to the sealed system, to react with the $CO_2$ from the leak site changing the carrier or foam color to yellow. If no leakage is present there will be no change to the foam color. As previously discussed, this solution finds leaks in two methods: the first method is to produce bubble(s) around the leak site; and the second method is for the foam to be one color (pink in the case of phenol red) and to change in another contrasting color (yellow in the case of phenol red) around the leak site. This color change from red-pink (fuchsia or pinkish) to yellow results in a great contrast between these colors making it quit easy to identify the exact location of the leak site. Either method will clearly identify the exact location of the leak site.

It would also be possible to make the solution in the pH 6.8 range, turning it yellow in color. The gas, or a carrier in the gas, would then be based toward a pH of 8.2. This would make the leak solution (yellow in color) turn red-pink at the leak site when exposed to $CO_2$. Additionally, many different indicators could be used such as bromothymol blue, neutral red, cresol red, azolitmin, naptholphthalein, etc. When using such other indicators one would need to adjust the pH of the surfactant solution to 'work' in the range of the chosen indicator.

The preferred gas, carbon dioxide ($CO_2$), can change the pH of water as it dissolves slightly in water to form a weak acid called carbonic acid, $H_2CO_3$, according to the following reaction:

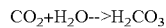

$$CO_2 + H_2O \rightarrow H_2CO_3$$

Then the carbonic acid reacts slightly and reversibly in water to form a hydronium cation, $H_3O+$, and the bicarbonate ion, $HCO_3^-$, according to the following reaction:

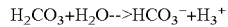

$$H_2CO_3 + H_2O \rightarrow HCO_3^- + H_3^+$$

This is why water, which normally has a neutral pH of 7, when exposed to air changes its pH to an acidic base of 5.5.

Other gases, but not limited to ammonia or sulfur dioxide, could be used to bring about a color change. These substances could be put in pressurized air or an inert gas, wherein such air or inert gas acts as a carrier, to pressurize a sealed system. Sulfur dioxide as seen below will make a weak acid that will change the pH of an indicator, thus changing its color. If you dissolve sulfur dioxide into water it forms sulfurous acid, which is weak diprotic acid.

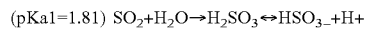

$$(pKa1=1.81) \ SO_2 + H_2O \rightarrow H_2SO_3 \leftrightarrow HSO_3^- + H+$$

It would be apparent that those skilled in the art could readily choose a gas phase molecule that when in contact with water will alter the water's pH (either acidic or alkali) and determine its appropriate concentration in combination with a suitable colorimetric pH indicator.

Figure 8A:
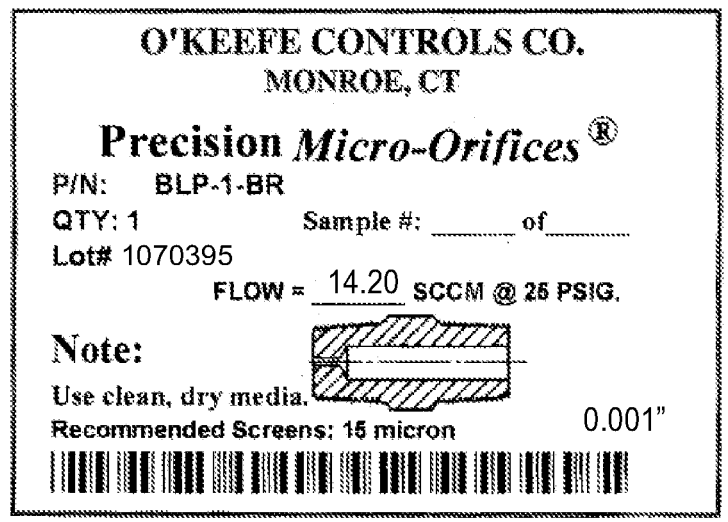
FIGS. 8A-X is a series of drawings illustrating the differences in the ability to detect leaks with the present invention and with smoke generated by a Snap-on Smart Smoke Machine EELD500.
Figure 8A:
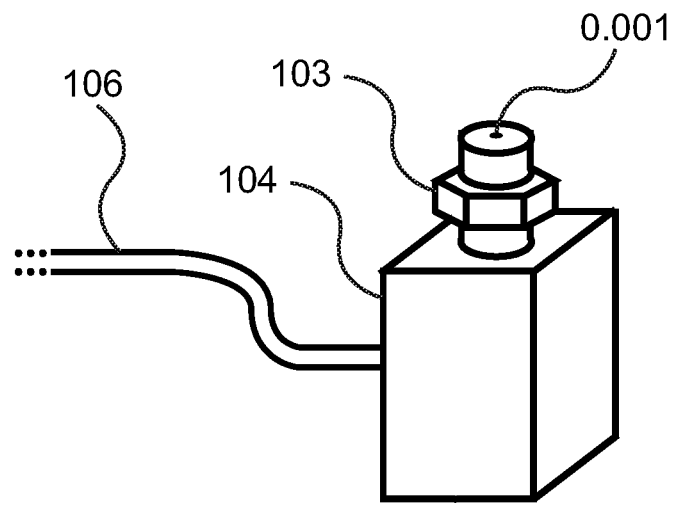
Figure 8B:
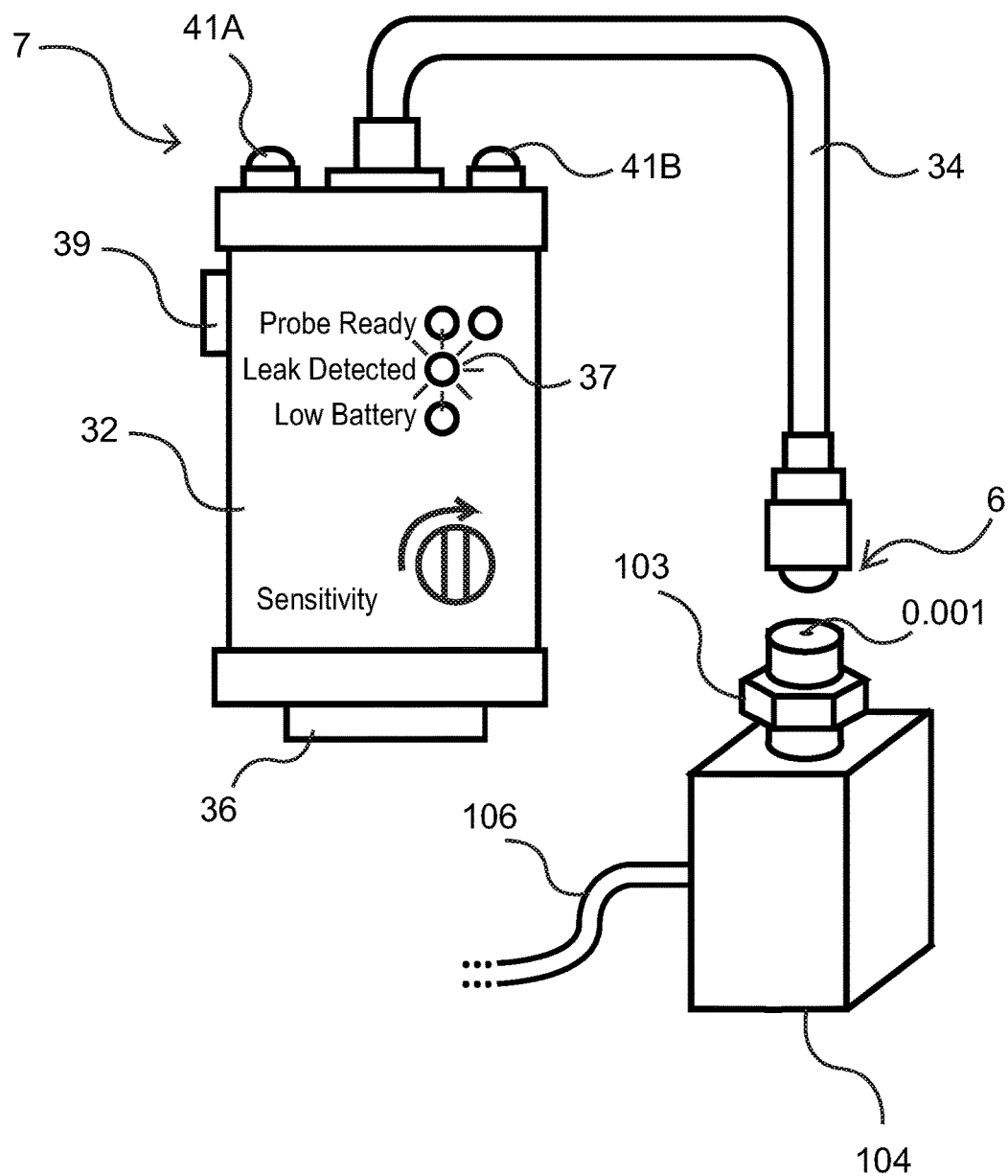
Figure 8C:
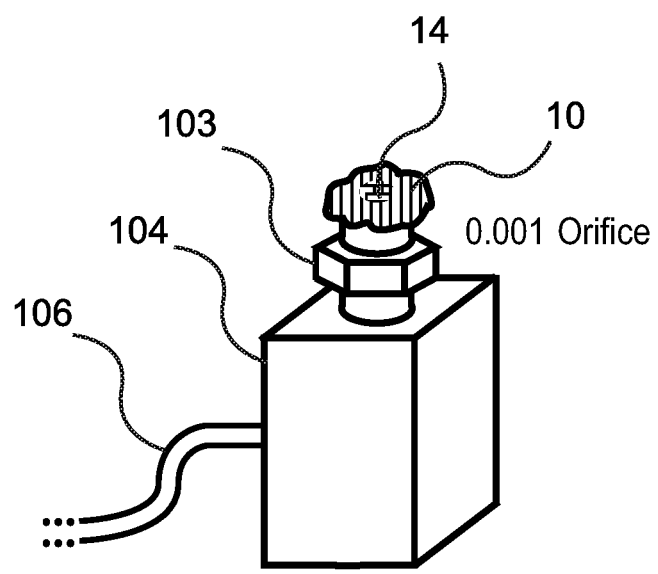
Figure 8D:
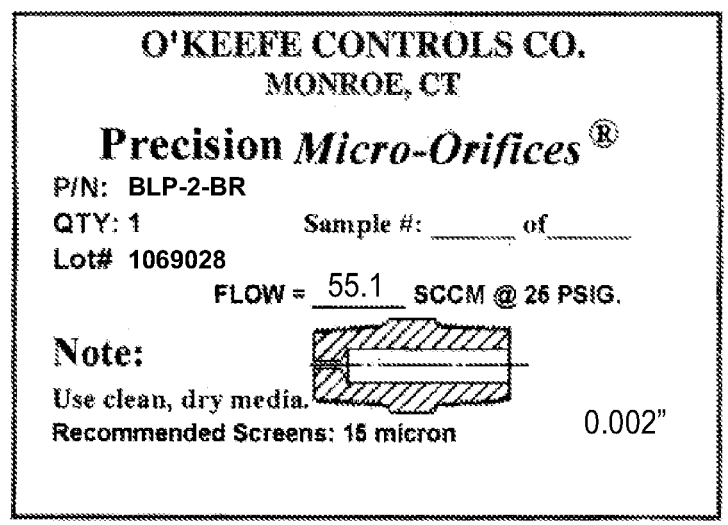
Figure 8D:
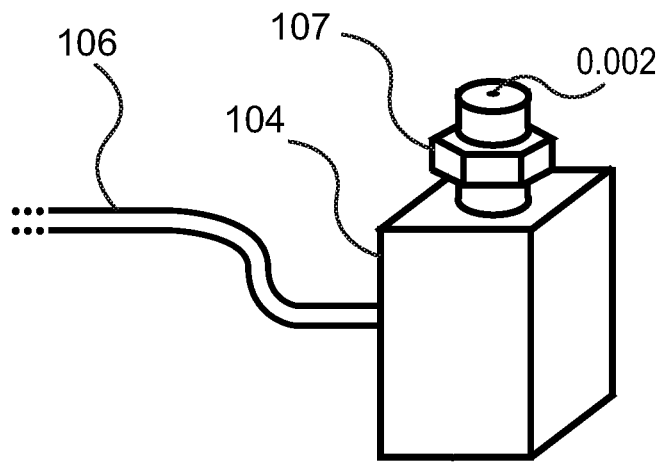
Figure 8E:
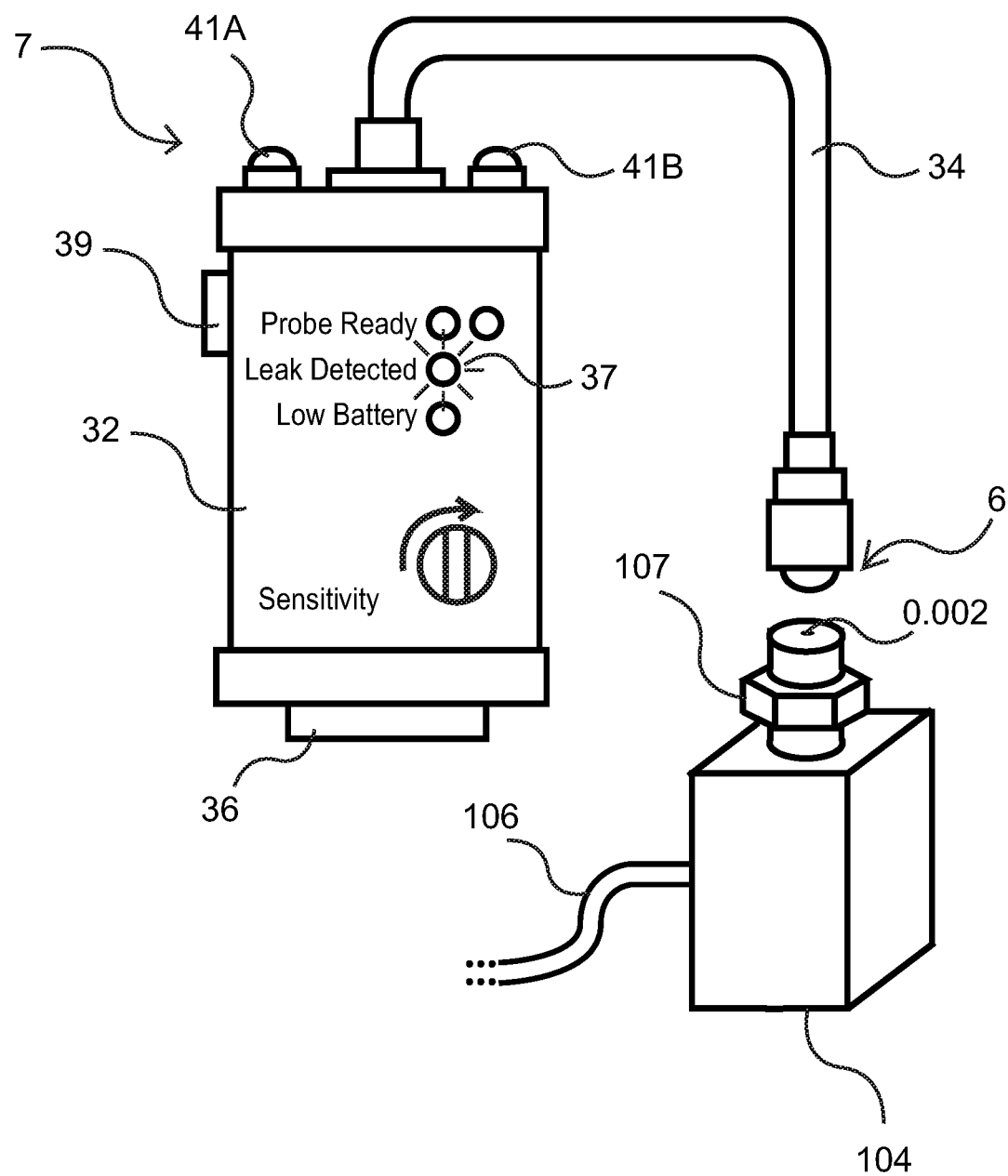
Figure 8F:
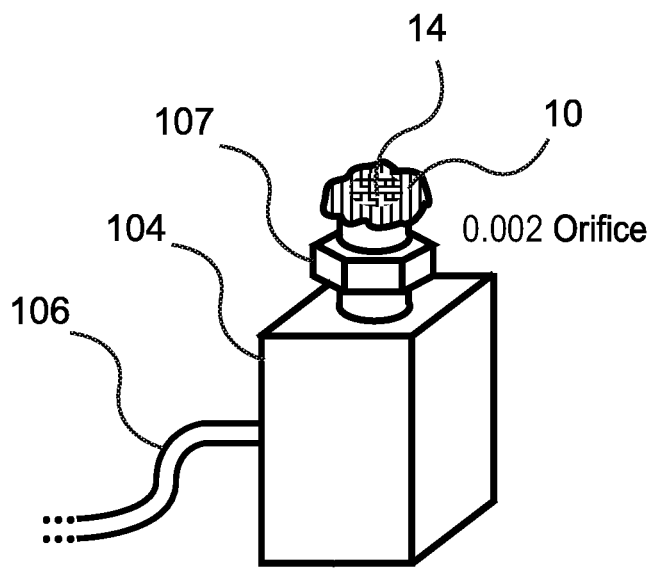
Figure 8G:
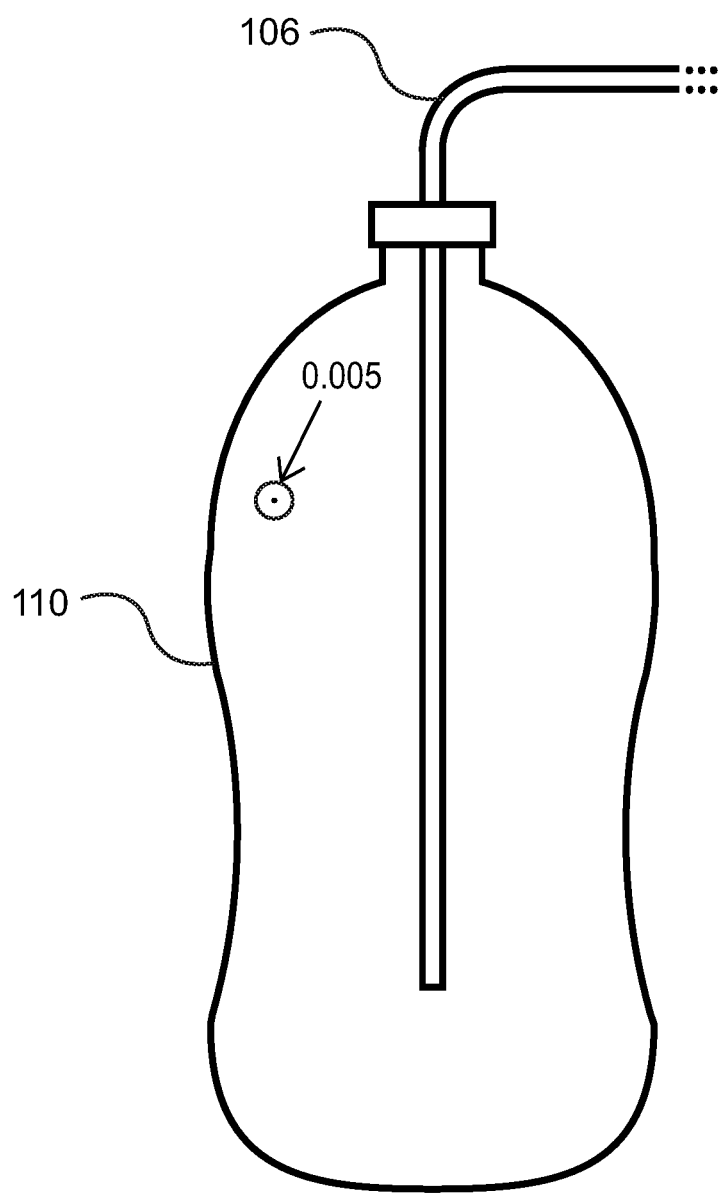
Figure 8H:
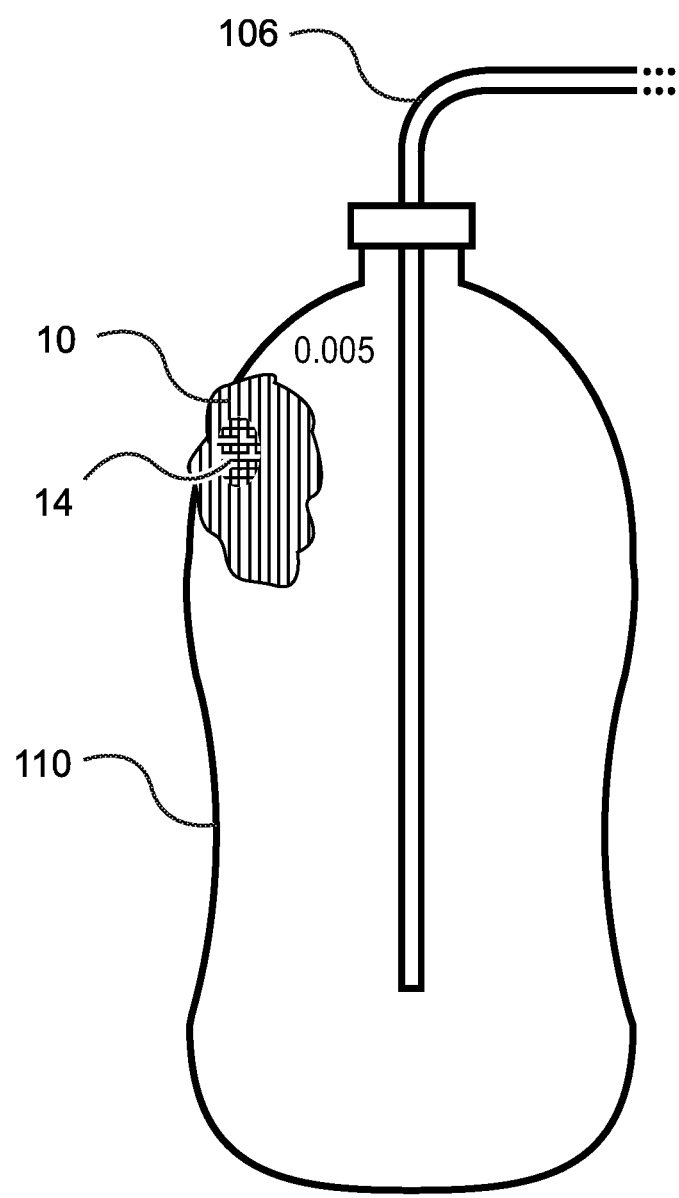
Figure 8I:
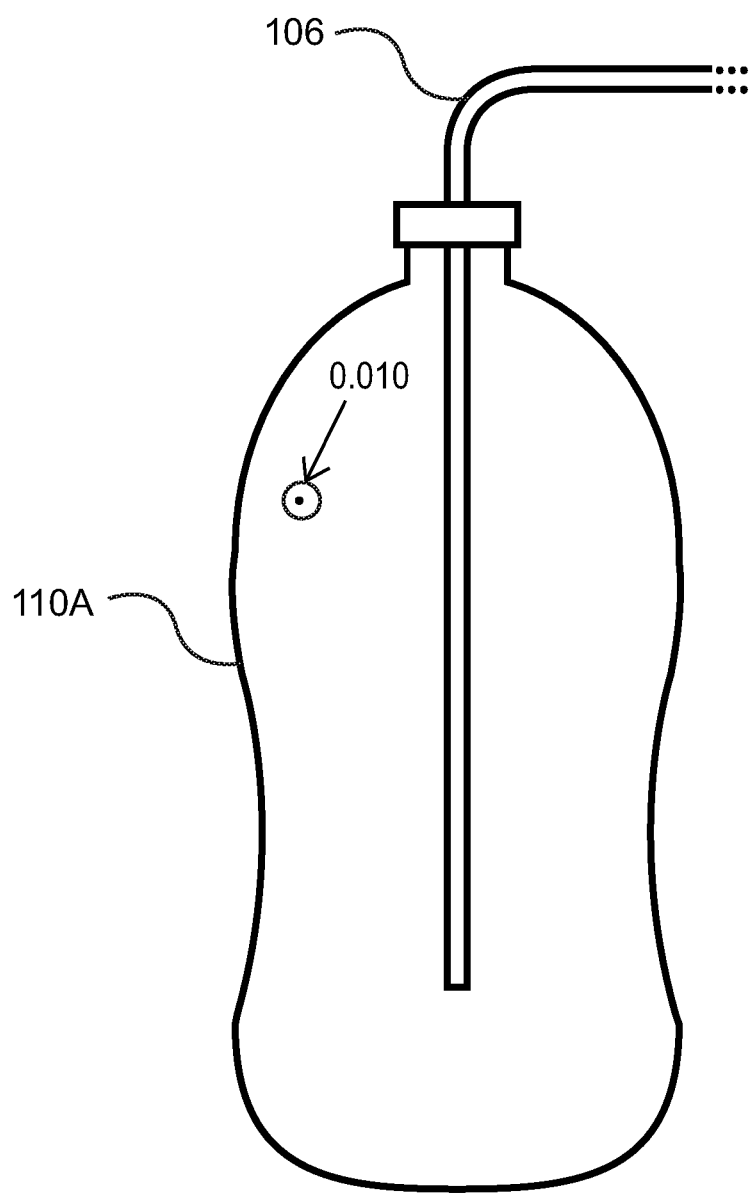
Figure 8J:
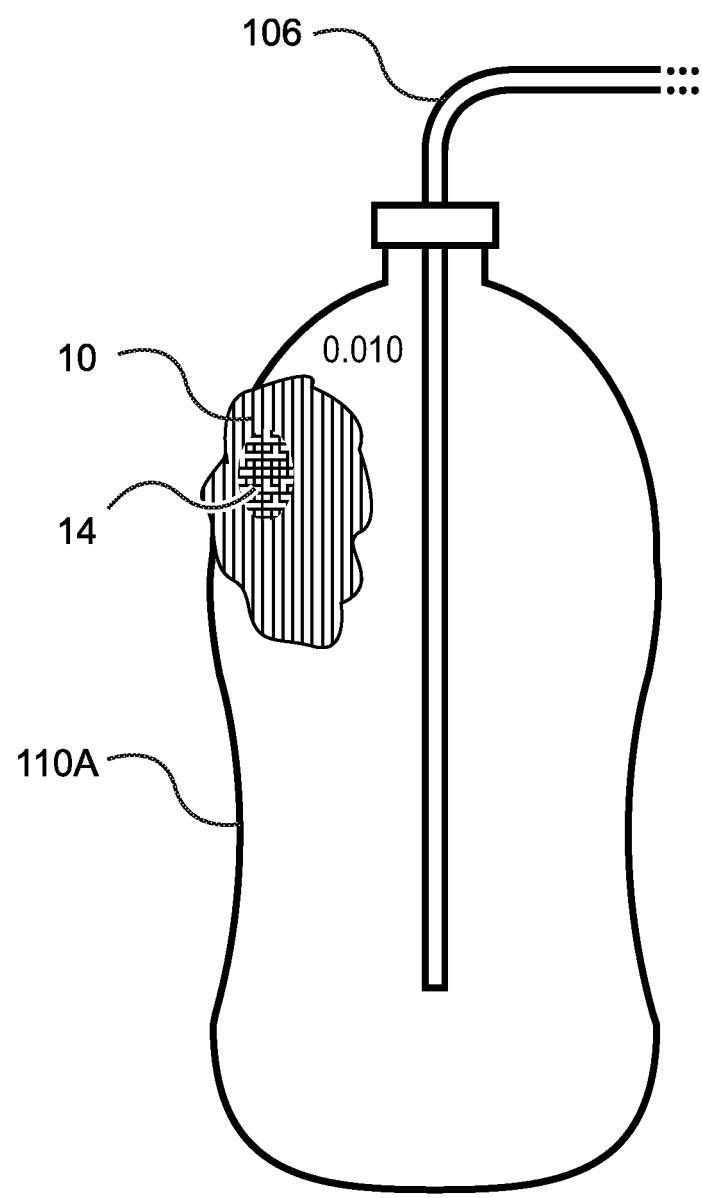
Figure 8K:
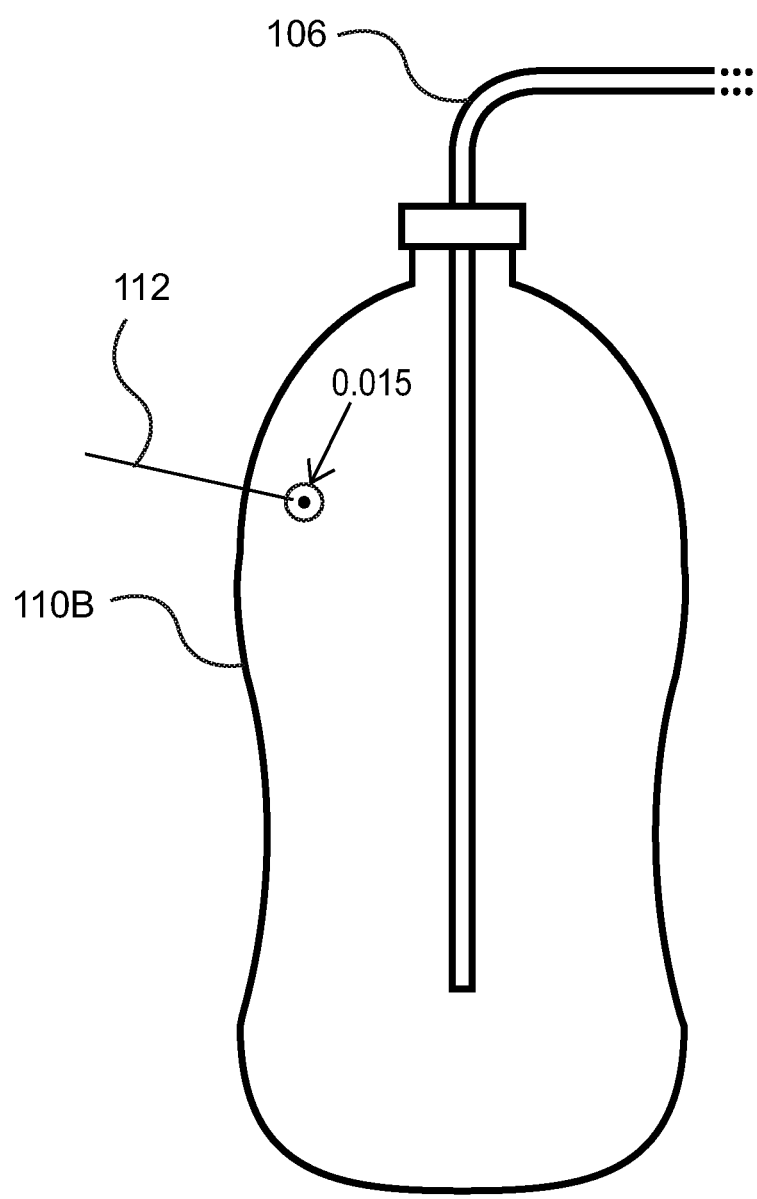
Figure 8L:
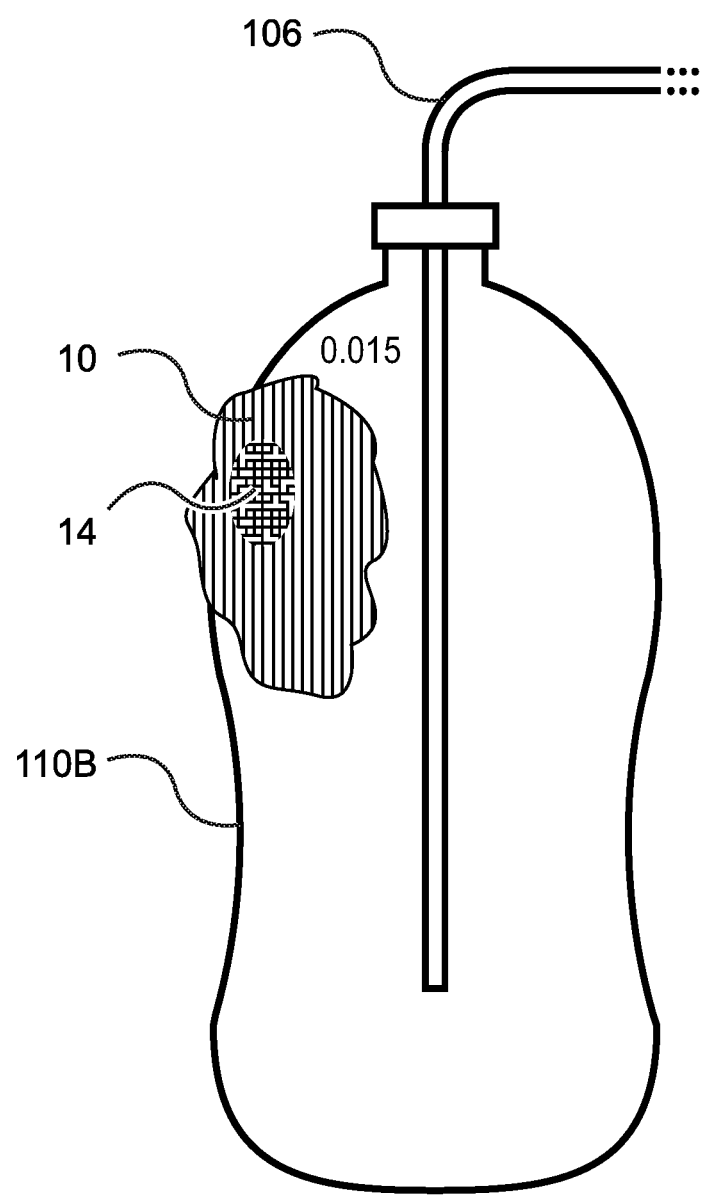
Figure 8M:
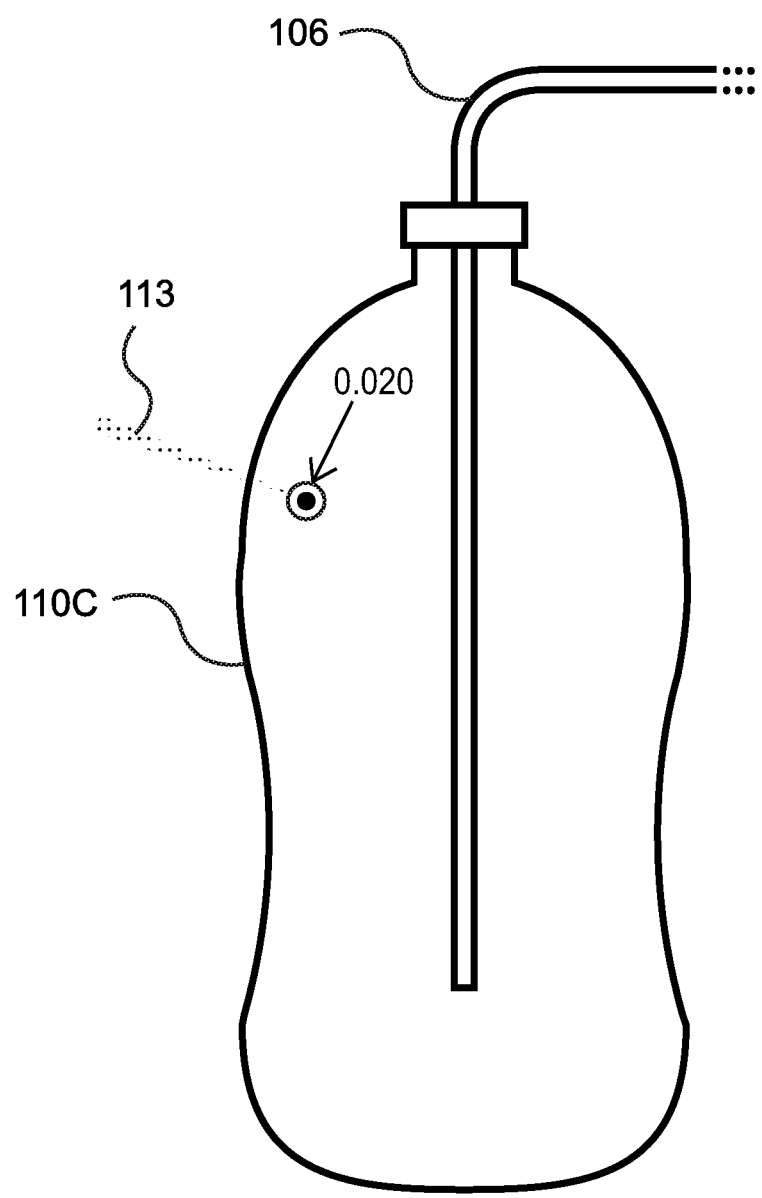
Figure 8N:
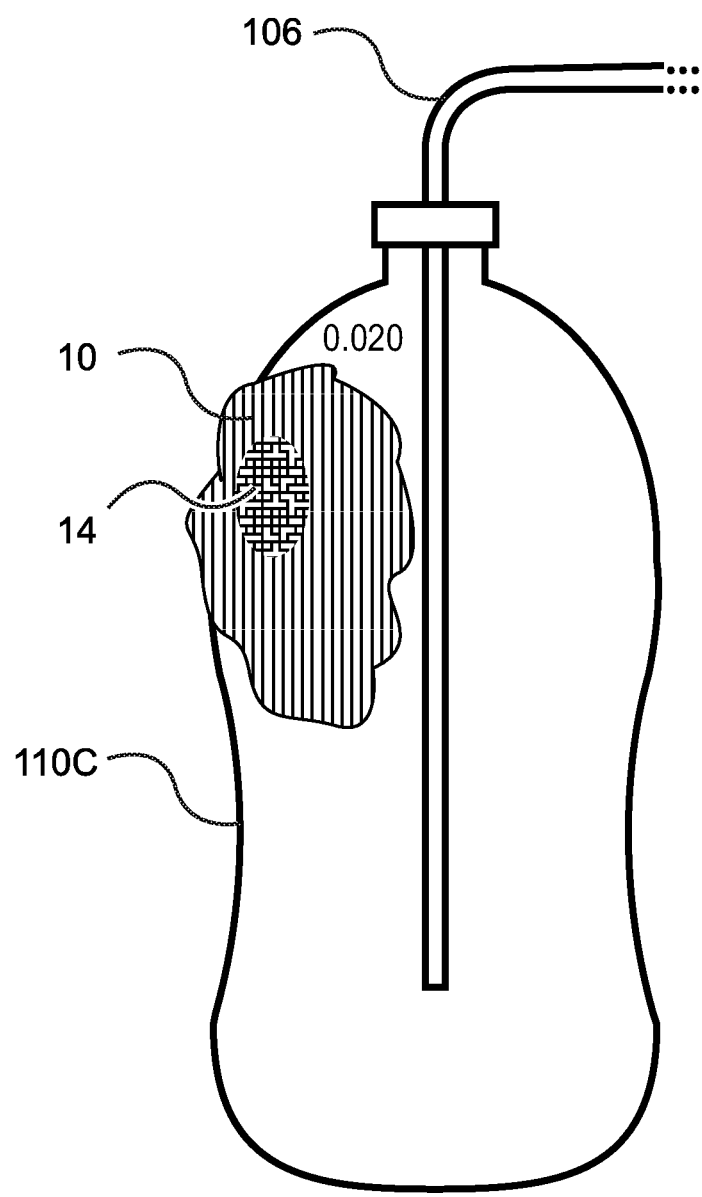
Figure 8O:
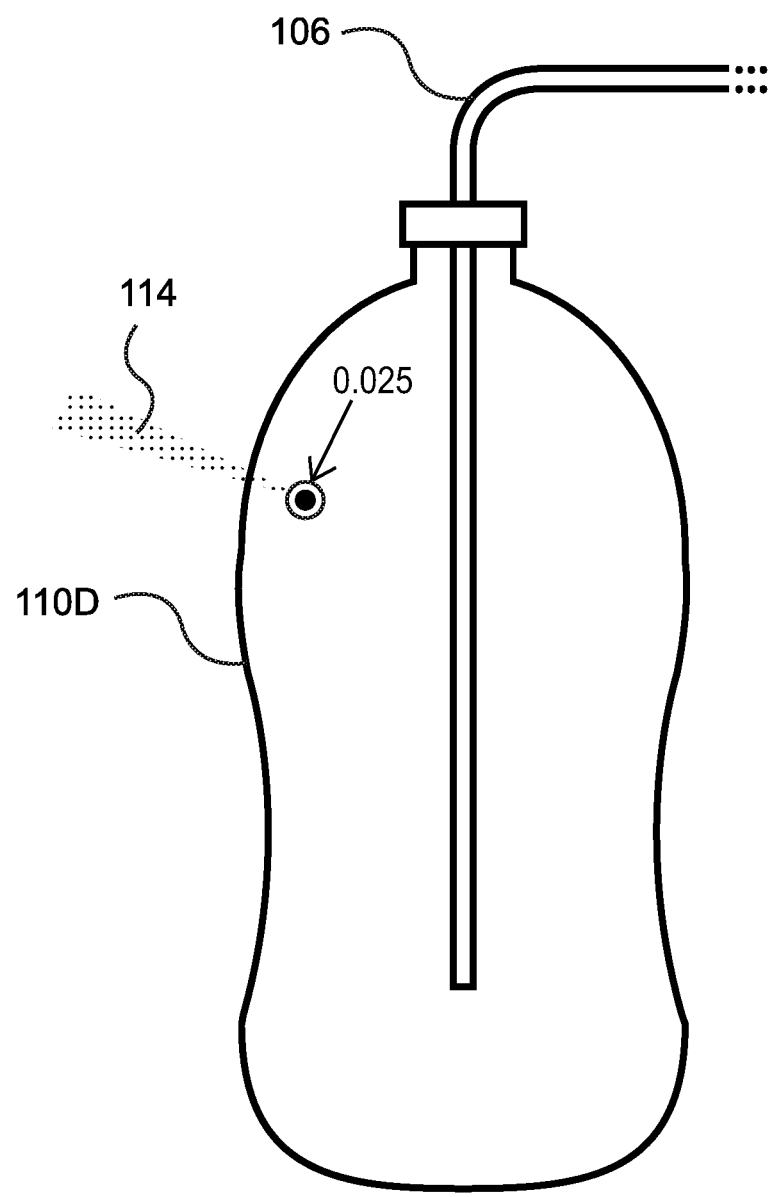
Figure 8P:
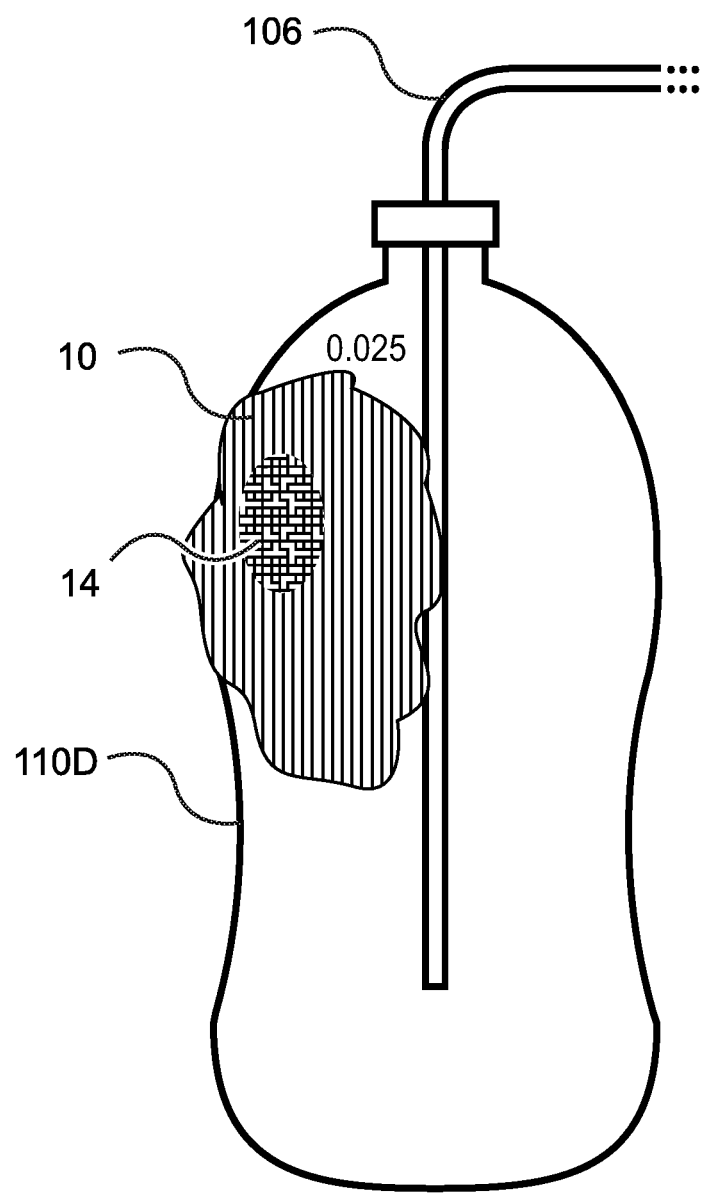
Figure 8Q:
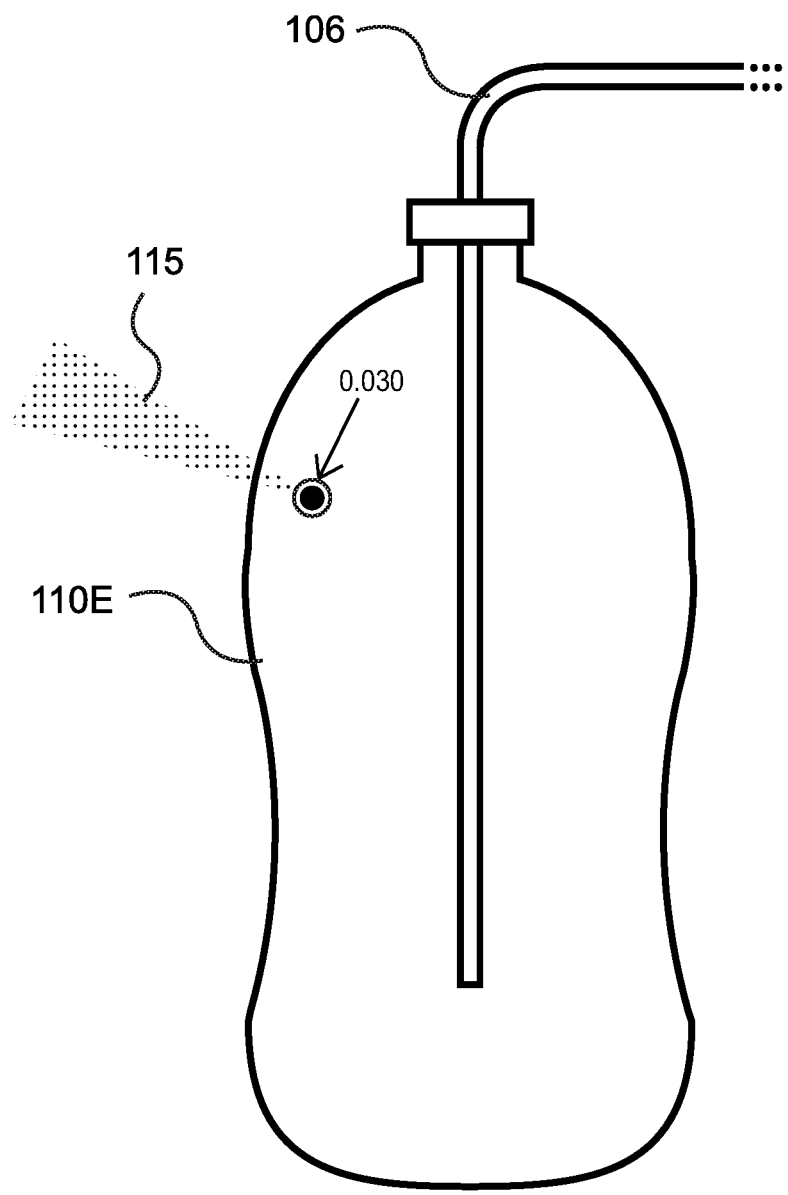
Figure 8R:
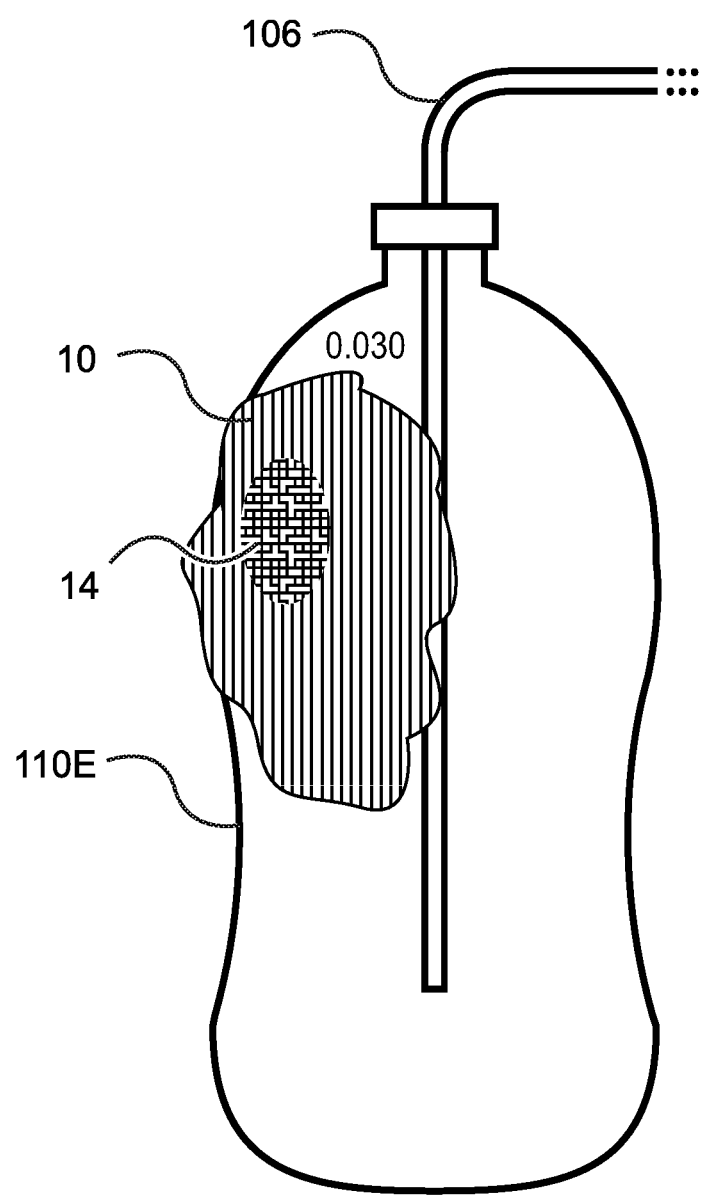
Figure 8S:
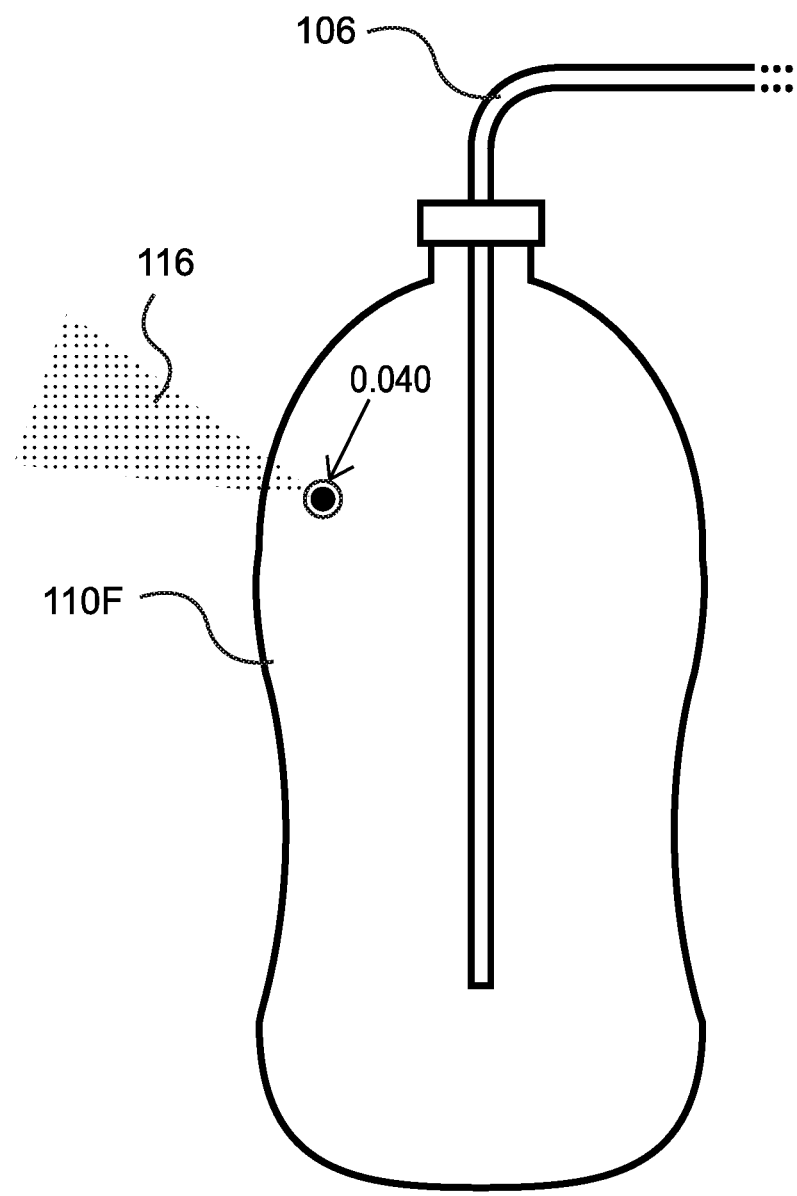
Figure 8T:
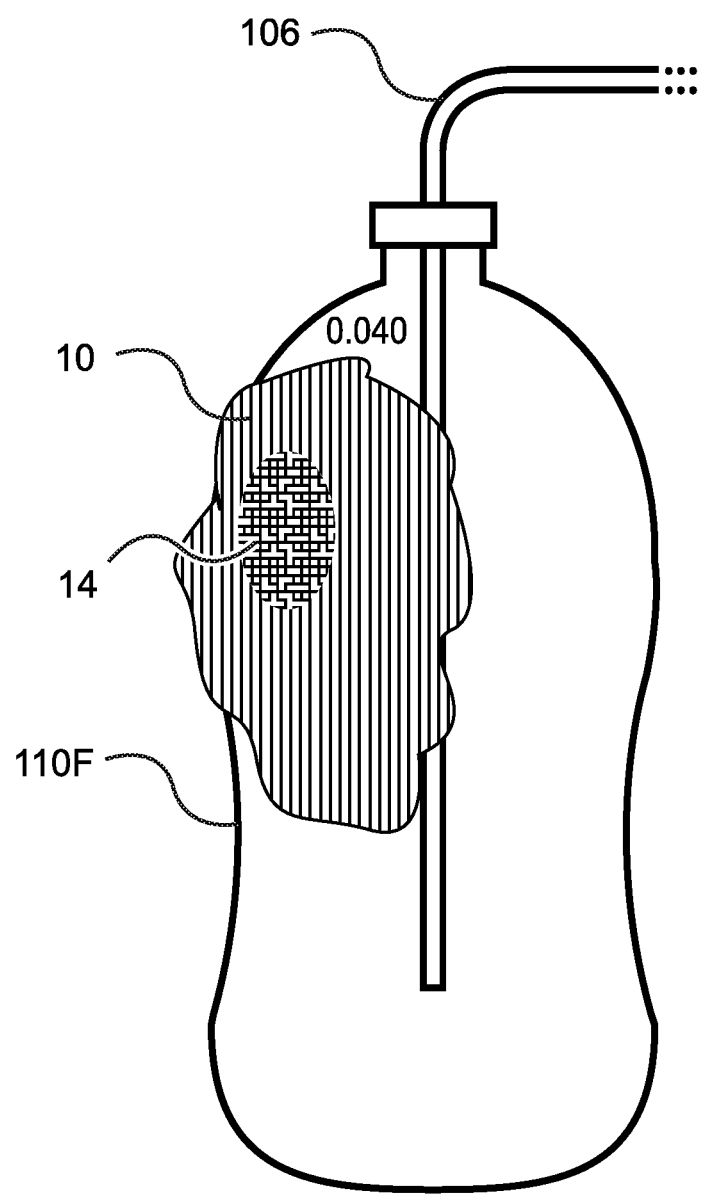
Figure 8U:
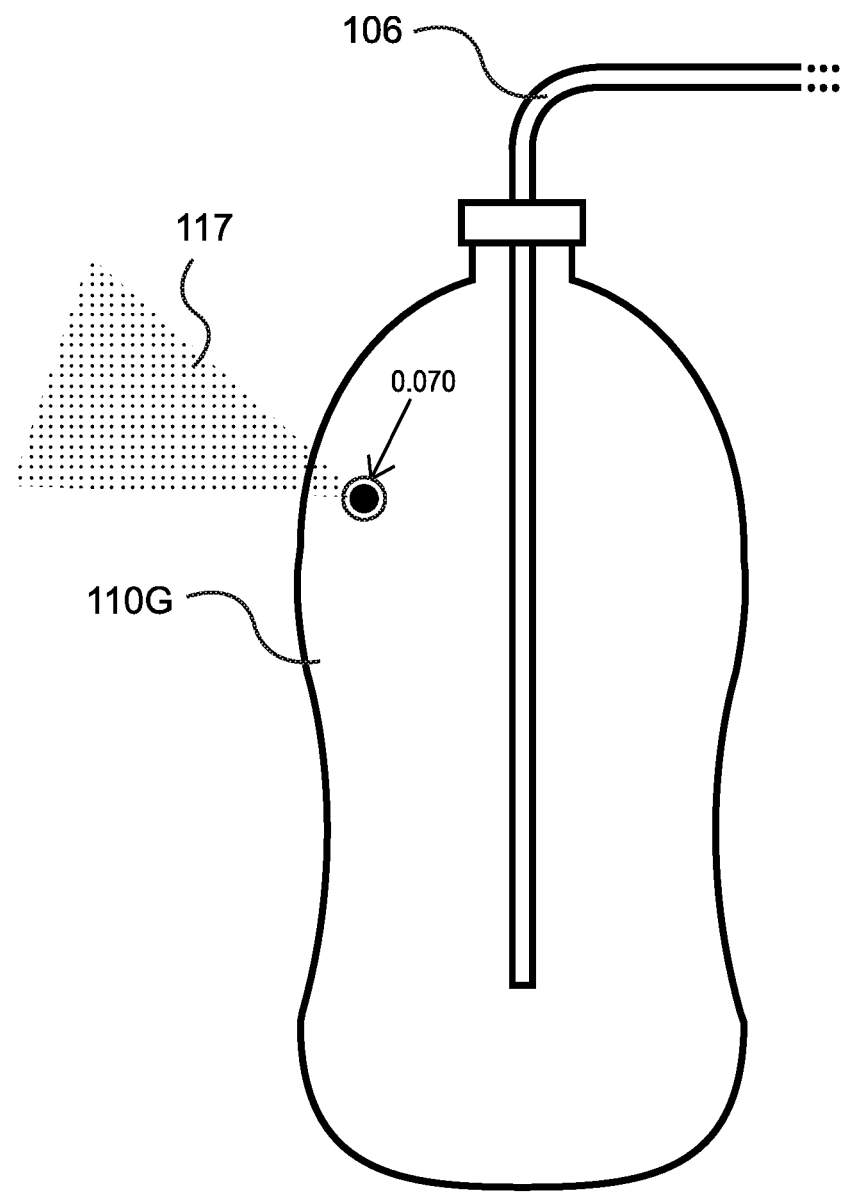
Figure 8V:
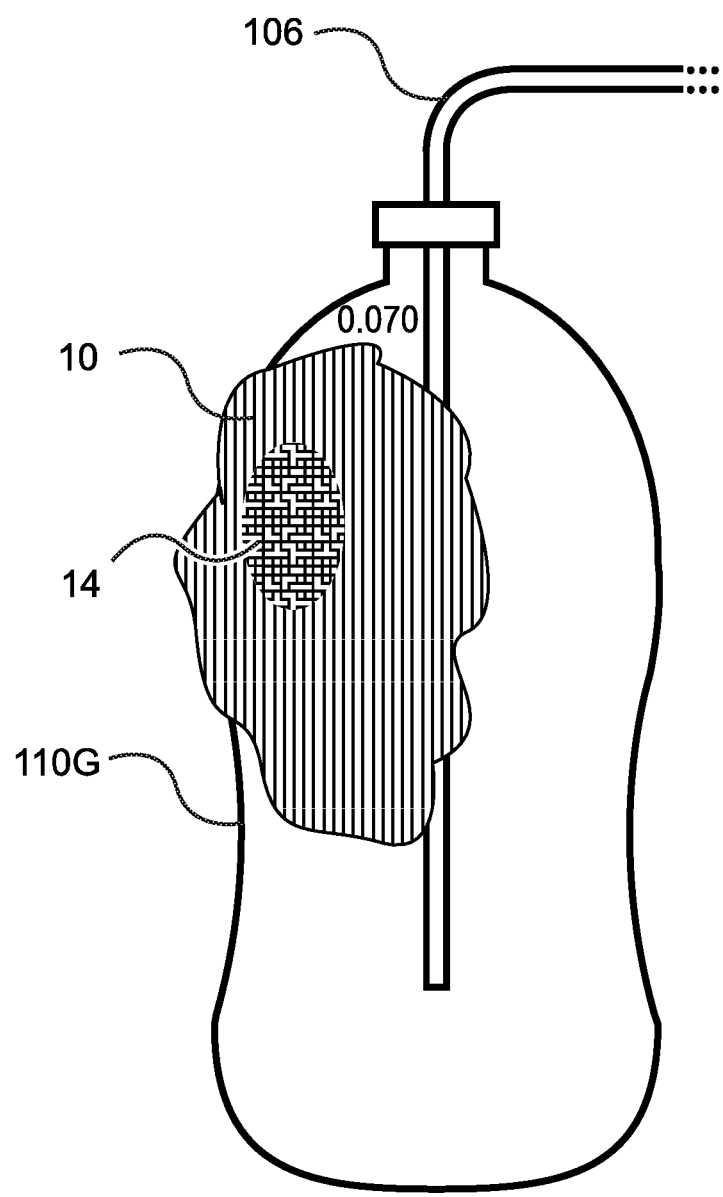
Figure 8W:
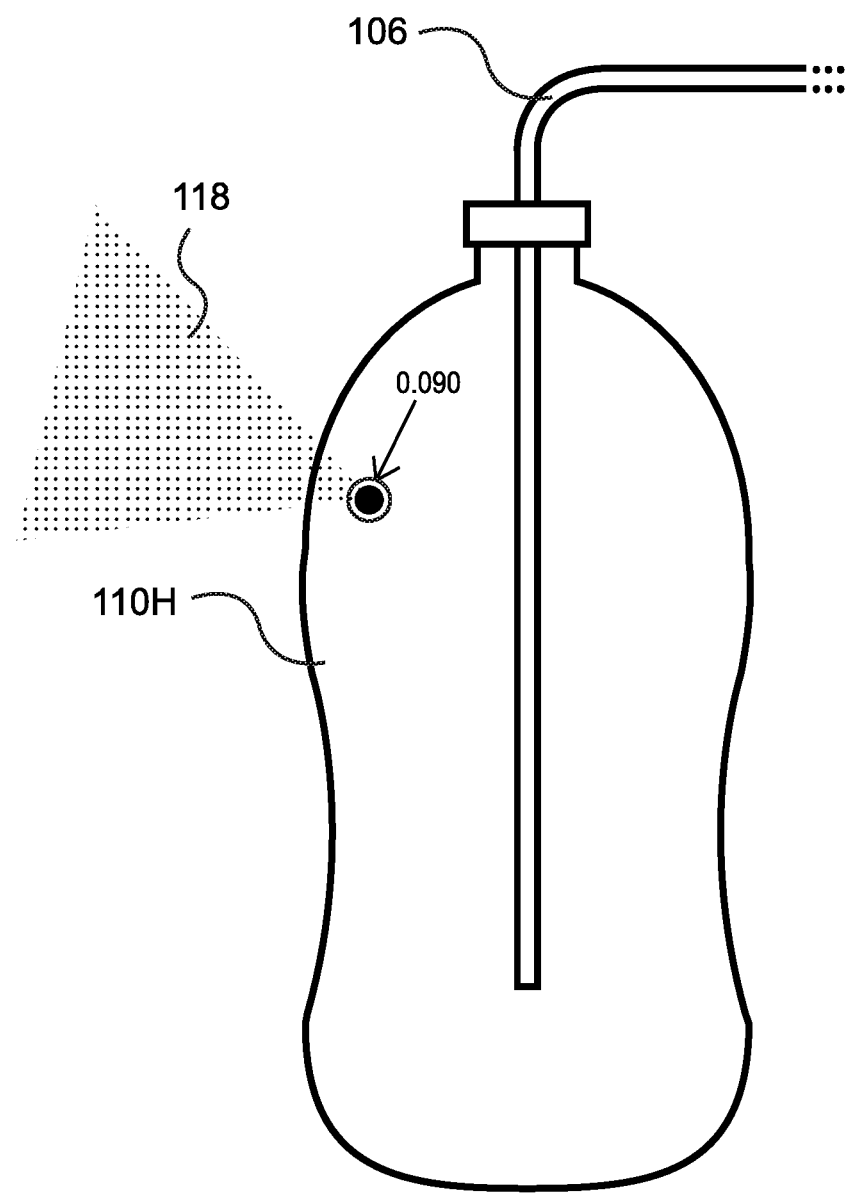
Figure 8X:
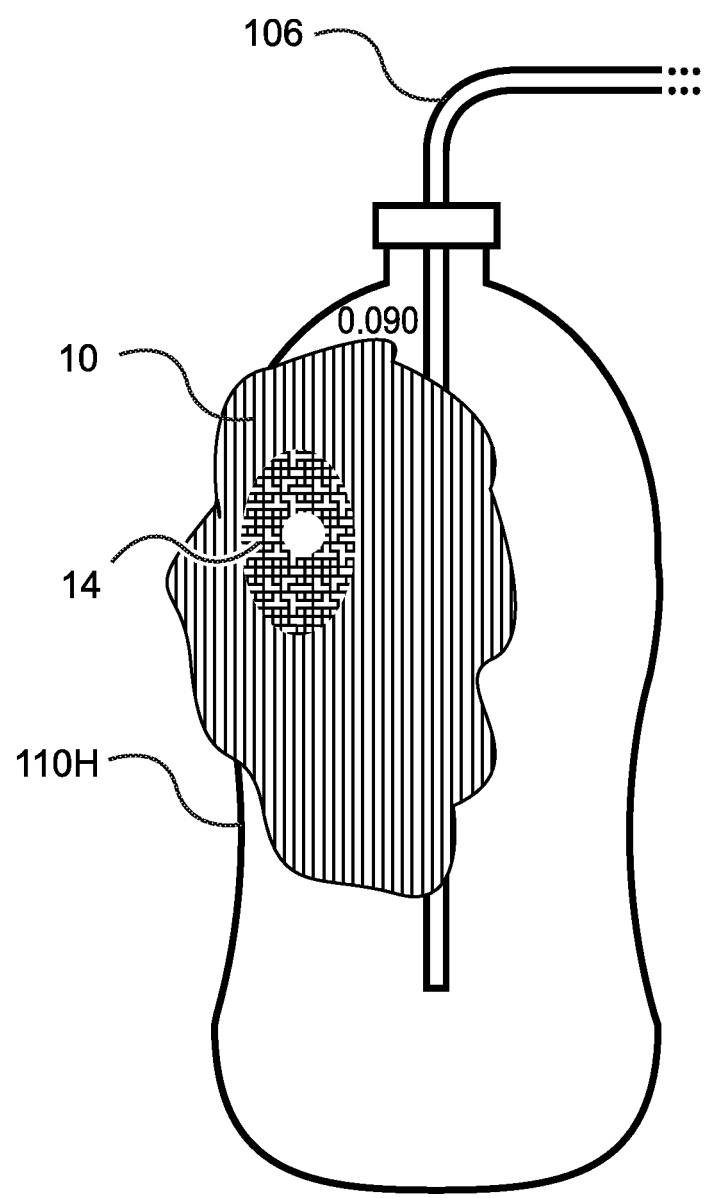

The following, with reference to FIGS. 8A-X, is a comparison between the use of smoke from a smoke machine (i.e., a Snap-on Smart Smoke Machine EELD500) with the present invention, which demonstrates that the smoke machine has very limited ability. For each and every comparison: (1) the leak site location is known prior to the test; (2) the lighting to see smoke is optimized; (3) there is no air movement in the testing area; (4) the smoke generating machine is set at 12.5 inches of water column, which is the factory setting; and (5) the $CO_2$ pressure is set at 14.0 inches of water column. Further, and again for every test, the sealed system being tested for a leak is first filled with smoke from the Snap-on smoke machine, sealed, and then pressurized with $CO_2$. These are not real world conditions, but are optimized to determine the maximum capabilities (in terms of smallest hole size) for the smoke machine. The leak detector of the present invention is only shown in conjunction with finding the very smallest of leaks at 0.001" and 0.002" in diameter (FIGS. 8A-C and FIGS. 8D-F, respectively). It should be understood that if detector 7 can find these very small leak sites, larger leaks are no problem and, therefore, not illustrated in reference to the tests illustrated in FIGS. 8G-X.

FIGS. 8A-C illustrate the use of a fitting 103 with 0.001" orifice from O'Keefe Controls Co. coupled to a test block 104 which, in turn, is connected to the Snap-on smoke machine (not shown) via tubing 106. As in all the tests, the tubing and fitting with the orifice was first pressurized with the smoke machine (i.e., 12.5 inches water column), then sealed and examined for the presence of escaping smoke, and then pressurized with $CO_2$ (i.e., 14.0 inches water column). The leak detector was then used to find the location to apply the leak finding pink foam. As is evident from FIG. 8A, no smoke was observed exiting from the 0.001" orifice. However, the presence of $CO_2$ in the vicinity of such orifice was detected with detector 7. See FIG. 8B. After the gas was detected, the orifice was covered with pink foam 10 according to the present invention, which turned yellow 14 over the orifice (the leak site). FIG. 8C.

FIGS. 8D-F illustrate the use of a fitting 107 with 0.002" orifice from O'Keefe Controls Co. coupled to test block 104 which, in turn, is connected to the Snap-on smoke machine (not shown) via tubing 106. Again the tubing and fitting with the orifice was first pressurized with the smoke machine (i.e., 12.5 inches water column), then sealed and examined for the presence of escaping smoke, and then pressurized with $CO_2$ (i.e., 14.0 inches water column). The leak detector 7 was then used to find the location to apply the leak finding pink foam. As is evident from FIG. 8D, no smoke was observed exiting from the 0.002" orifice. However, the presence of $CO_2$ in the vicinity of such orifice was detected with detector 7. FIG. 8E. After the gas was detected, the orifice was covered with pink foam 10 according to the present invention, which turned yellow 14 over the orifice (the leak site). FIG. 8F.

FIGS. 8G & H illustrate the use of the leak finding composition of matter (in this case the foam) where the leak is a hole approximately 0.005" in diameter in a plastic bottle 110. See FIG. 8G where the hole is circled for identification. The bottle 110 was first pressurized with smoke (i.e., 12.5 inches water column), then sealed and tested with smoke (i.e., examined to see if any smoke was escaping through the hole). Then the bottle 110 was pressurized with $CO_2$ (i.e., 14.0 inches water column) and leak finding pink foam 10 was applied to the hole and the immediately surrounding area. As is evident from FIG. 8G, no smoke was observed exiting from the 0.005" orifice. Since the location of the hole is known, the leak detector of the present invention was not utilized. When the orifice was covered with pink foam 10 according to the present invention, it turned yellow 14 over the orifice (the leak site). FIG. 8H.

FIGS. 8I & J illustrate the use of the leak finding composition of matter (in this case the foam) where the leak is a hole approximately 0.010" in diameter in a plastic bottle 110A. See FIG. 8I where the hole is circled for identification. The bottle 110A was first pressurized with smoke (i.e., 12.5 inches water column), then sealed and examined for the presence of escaping smoke. Then the bottle 110A was pressurized with $CO_2$ (i.e., 14.0 inches water column) and the leak finding pink foam applied. As is evident from FIG. 8I, no smoke was observed exiting from the 0.010" orifice. Since the location of the hole is known, the leak detector of the present invention was not utilized. When the orifice was covered with pink foam 10 according to the present invention, it turned yellow 14 over the orifice (the leak site). FIG. 8J.

FIGS. 8K & L illustrate the use of the leak finding composition of matter (in this case the foam) where the leak is a hole approximately 0.015" in diameter in a plastic bottle 110B. See FIG. 8K where the hole is circled for identification. The bottle 110B was first pressurized with smoke (i.e., 12.5 inches water column), then sealed and examined for the presence of escaping smoke. Then the bottle 110B was pressurized with $CO_2$ (i.e., 14.0 inches water column) and the leak finding pink foam applied. Though not evident from the color photograph (original FIG. 8K), with optimal lighting and no air movement in the test area, a very very little amount of smoke was observed exiting from the 0.015" orifice as indicated by reference 112. Since the location of the hole is known, the leak detector of the present invention was not utilized. When the orifice was covered with pink foam 10 according to the present invention, it turned yellow 14 over the orifice (the leak site). FIG. 8L.

FIGS. 8M & N illustrate the use of the leak finding composition of matter (in this case the foam) where the leak is a hole approximately 0.020" in diameter in a plastic bottle 110C. See FIG. 8M where the hole is circled for identification. The bottle 110C was first pressurized with smoke (i.e., 12.5 inches water column), then sealed and examined for the presence of escaping smoke. Then pressurized with $CO_2$ (i.e., 14.0 inches water column) and the leak finding pink foam was applied. Though not evident from the color photograph (original FIG. 8M), with optimal lighting and no air movement in the test area, a very little amount of smoke was observed exiting from the 0.020" orifice as indicated by reference 113. Since the location of the hole is known, the leak detector of the present invention was not utilized. When the orifice was covered with pink foam 10 according to the present invention, it turned yellow 14 over the orifice (the leak site). FIG. 8N.

FIGS. 8O & P illustrate the use of the leak finding composition of matter (in this case the foam) where the leak is a hole approximately 0.025" in diameter in a plastic bottle 110D. See FIG. 8O where the hole is circled for identification. The bottle 110D was first pressurized with smoke (i.e., 12.5 inches water column), then sealed and tested for the presence of escaping smoke. Then the bottle 110D was pressurized with $CO_2$ (i.e., 14.0 inches water column). Though not evident from the color photograph (original FIG. 8O), with optimal lighting and no air movement in the test area, a little amount of smoke was observed exiting from the 0.025" orifice as indicated by reference 114. Since the location of the hole is known, the leak detector of the present invention was not utilized. When the orifice was covered with pink foam 10 according to the present invention, it turned yellow 14 over the orifice (the leak site). FIG. 8P.

FIGS. 8Q & R illustrate the use of the leak finding composition of matter (in this case the foam) where the leak is a hole approximately 0.030" in diameter in a plastic bottle 110E. See FIG. 8Q where the hole is circled for identification. The bottle 110E was first pressurized with smoke (i.e., 12.5 inches water column), then sealed and examined for the presence of escaping smoke. Then the bottle 110E was pressurized with $CO_2$ (i.e., 14.0 inches water column) and the leak finding solution applied. From careful observation of the color photograph (original FIG. 8Q), with optimal lighting and no air movement in the test area, smoke was observed exiting from the 0.030" orifice as indicated by reference 115. Since the location of the hole is known, the leak detector of the present invention was not utilized. When the orifice was covered with pink foam 10 according to the present invention, it turned yellow 14 over the orifice (the leak site). FIG. 8R.

FIGS. 8S & T illustrate the use of the leak finding composition of matter (in this case the foam) where the leak is a hole approximately 0.040" in diameter in a plastic bottle 110F. See FIG. 8S where the hole is circled for identification. The bottle 110F was first pressurized with smoke (i.e., 12.5 inches water column), then sealed and examined for the presence of escaping smoke. Then the bottle 110F was pressurized with $CO_2$ (i.e., 14.0 inches water column) and, as in the previous tests, the leak finding pink foam applied to the leak and the immediately surrounding area. From careful observation of the color photograph (original FIG. 8S), with optimal lighting and no air movement in the test area, it can be seen that smoke was observed exiting from the 0.040" orifice as indicated by reference 116. Again, since the location of the hole is known, the leak detector of the present invention was not utilized. When the orifice was covered with pink foam 10 according to the present invention, it turned yellow 14 over the orifice (the leak site). FIG. 8T.

FIGS. 8U & V illustrate the use of the leak finding composition of matter (in this case the foam) where the leak is a hole approximately 0.070" in diameter in a plastic bottle 110G. See FIG. 8U where the hole is circled for identification. The bottle 110G was first pressurized with smoke (i.e., 12.5 inches water column), then sealed and examined for the presence of escaping smoke. Then the bottle 110G was pressurized with $CO_2$ (i.e., 14.0 inches water column) and the leak finding pink foam applied to the leak area. From observation of the color photograph (original FIG. 8U), with optimal lighting and no air movement in the test area, it can be seen that smoke was observed exiting from the 0.070" orifice as indicated by reference 117. Since the location of the hole is known, the leak detector of the present invention was not utilized. When the orifice was covered with pink foam 10 according to the present invention, it turned yellow 14 over the orifice (the leak site). FIG. 8V.

FIGS. 8W & X illustrate the use of the leak finding composition of matter (in this case the foam) where the leak is a hole approximately 0.090" in diameter in a plastic bottle 110H. See FIG. 8W where the hole is circled for identification. The bottle 110H was first pressurized with smoke (i.e., 12.5 inches water column), then sealed and examined for the presence of escaping smoke. Then the bottle 110H was pressurized with $CO_2$ (i.e., 14.0 inches water column)

and the leak finding pink foam applied. From observation of the color photograph (original FIG. 8W), with optimal lighting and no air movement in the test area, it can be seen that smoke was observed exiting from the 0.090" orifice as indicated by reference 118. Since the location of the hole is known, the leak detector of the present invention was not utilized. When the orifice was covered with pink foam 10 according to the present invention, it turned yellow 14 over the orifice (the leak site). FIG. 8X.

The above described testing was not done on orifices smaller than 0.001" in diameter. However, as the $CO_2$ molecule is very small, and will escape from a hole less than 0.001", detection of leaks smaller than 0.001" is possible.

When attempting to use a gas analyzer (either a typical one or the ATS Emission—5 Gas Analyzer discussed below) for leak detection several limitations are apparent. First, as previously pointed out, the instrument itself usually sits on a table or on a cart, at some distance from the probe which is at the end of a 20 ft. hose. Second, the gas analyzer has a digital read out on the front panel that essentially requires the technician to be physically close to the instrument in order to view the analysis of sample gas that the gas analyzer has pumped into the sample tubes for testing. This is not a problem when the probe is inserted into a tail pipe and held in place by a clip or bracket. However, for trying to test a vehicle's fuel containment and handing systems for leaks a technician will be holding the probe and inspecting such places as the top of the fuel tank. Thus, it will be very hard for the technician to be watching the front display panel of the gas analyzer and, at the same time, watching where the probe is currently located. Accordingly, in order to try to find the leak(s), it will take two technicians, one to move and watch the gas analyzer probe and the second to watch the gas analyzer display panel. Third, when a gas sample is tested and $CO_2$ or HC is detected, the gas analyzer display will move up as the sample is analyzed and then back down once the sample is pumped out of the sample tubes. This process from the time the gas traces are detected to the time they are cleared takes about 8 seconds. Fourth is the time it takes to pump the sample gas from the test site into the sample tubes. This time delay, between 8 to 20 seconds depending on the brand of gas analyzer and the length of hose, creates a problem in locating the location of the leak site (assuming that the analyzer could actually detect the presence of gas escaping from the containment system). Depending on how fast the sample probe is moving across the leak site, the probe will have moved a significant distance from the leak site by the time the gas analyzer display shows the gas sample. Thus, the location of the leak site will be missed.

In addition to the foregoing, fifth and arguably the most important, the amount of dilution from the air surrounding the leak site that the gas analyzer will pump into the sample tubes is so great compared to the trace gas (e.g., the $CO_2$ that has been used to pressurize the system) escaping from a leak site that the gas analyzer cannot find small leak sizes even when the leak site is known in advance. Again, the gas analyzer probe is just a vacuum nozzle. This is not a problem when inserted in the tail pipe of a running engine where the ambient air is excluded by the pressure of the exhaust gas stream within the exhaust pipe. However, in attempting to use such a system for leak detection, which is an open air environment, the probe is sucking in considerably more ambient air than any gas it is trying to detect and, thus, significantly diluting any sample collected. While the automotive gas analyzer can read small gas samples; the very small amount of gas escaping from a small leak site, with the dilution factor, makes it very hard or impossible to detect small leaks.

Figure 9A:
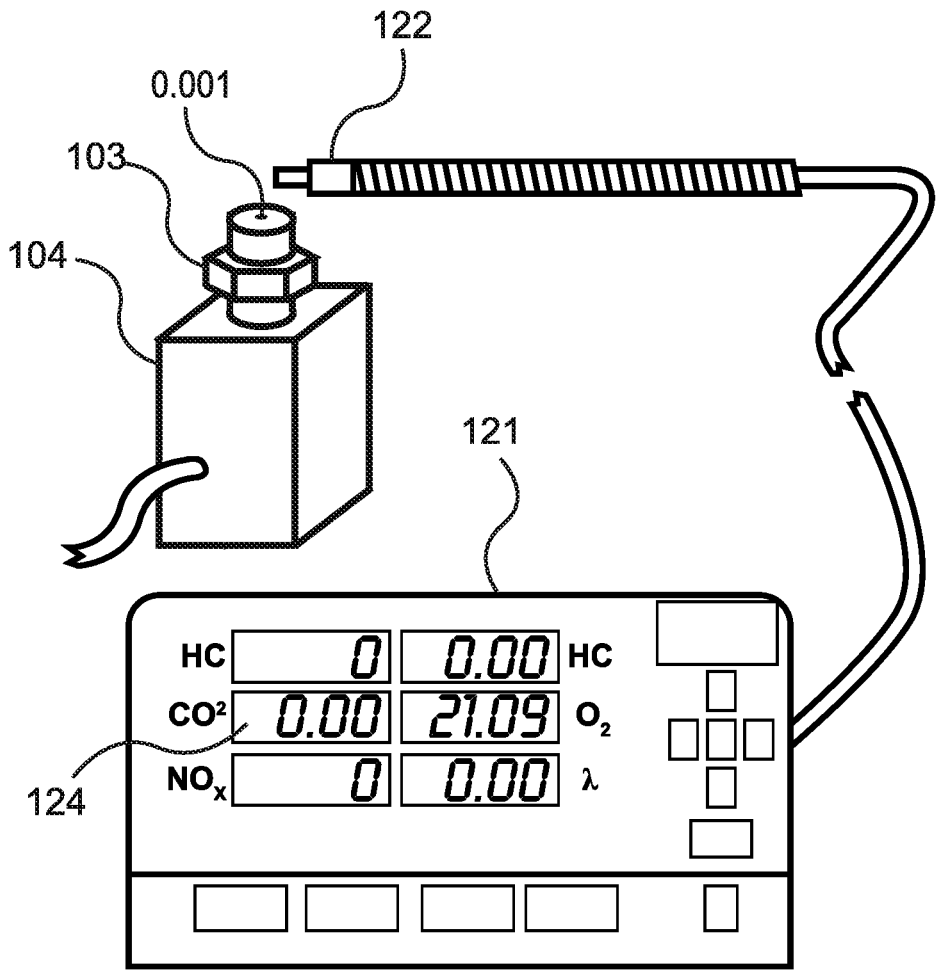
FIGS. 9A-N is a series of drawings illustrating the use of commercial automotive gas analyzer to try to detect the presence of $CO_2$ leaking from various size holes ranging from 0.001 inches in diameter up to 0.030 inches in diameter.
Figure 9A:
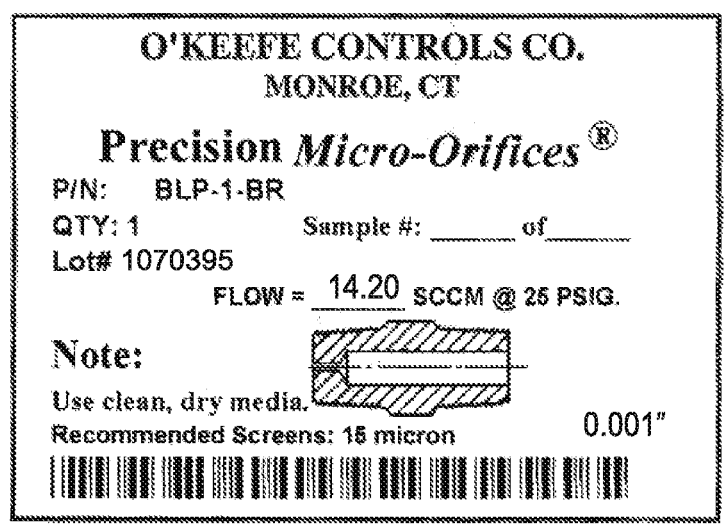
Figure 9B:
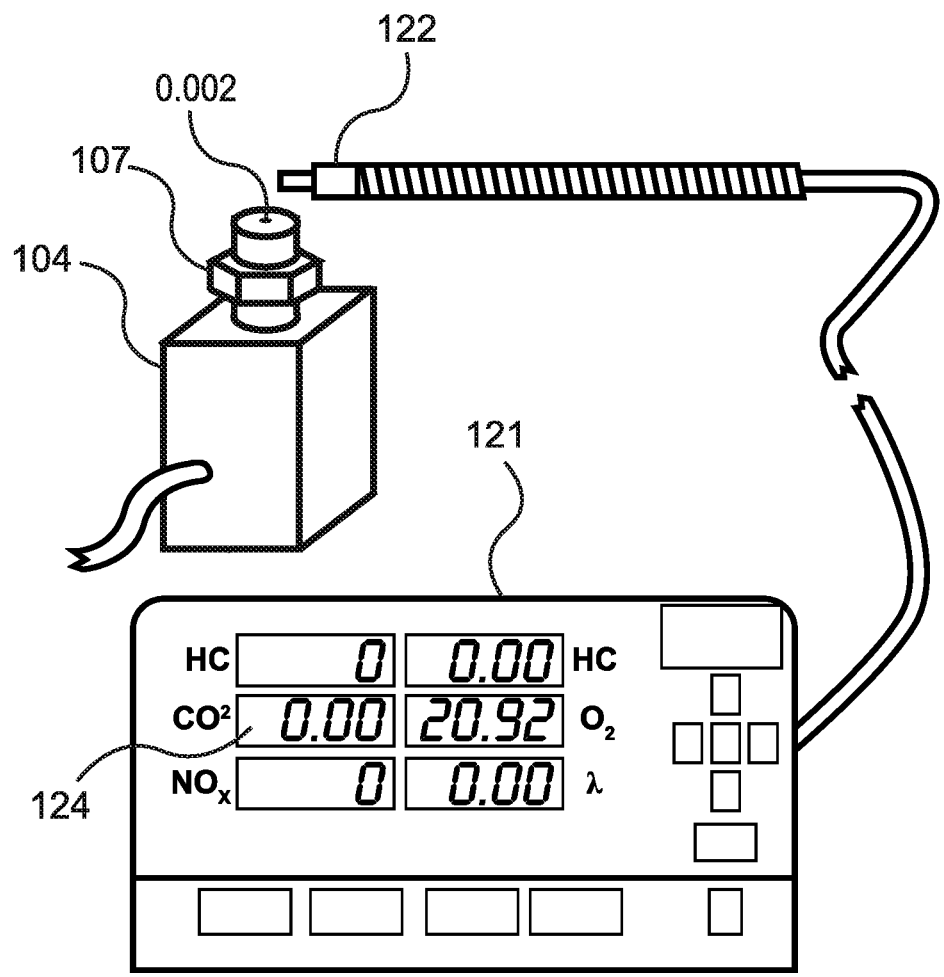
Figure 9B:
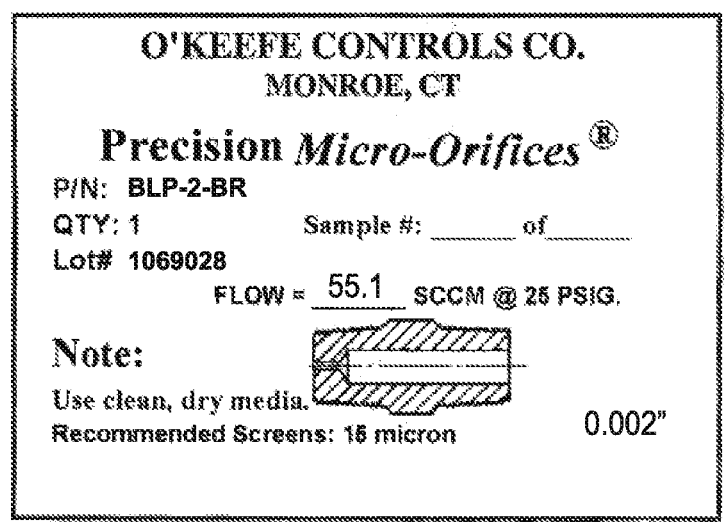
Figure 9C:
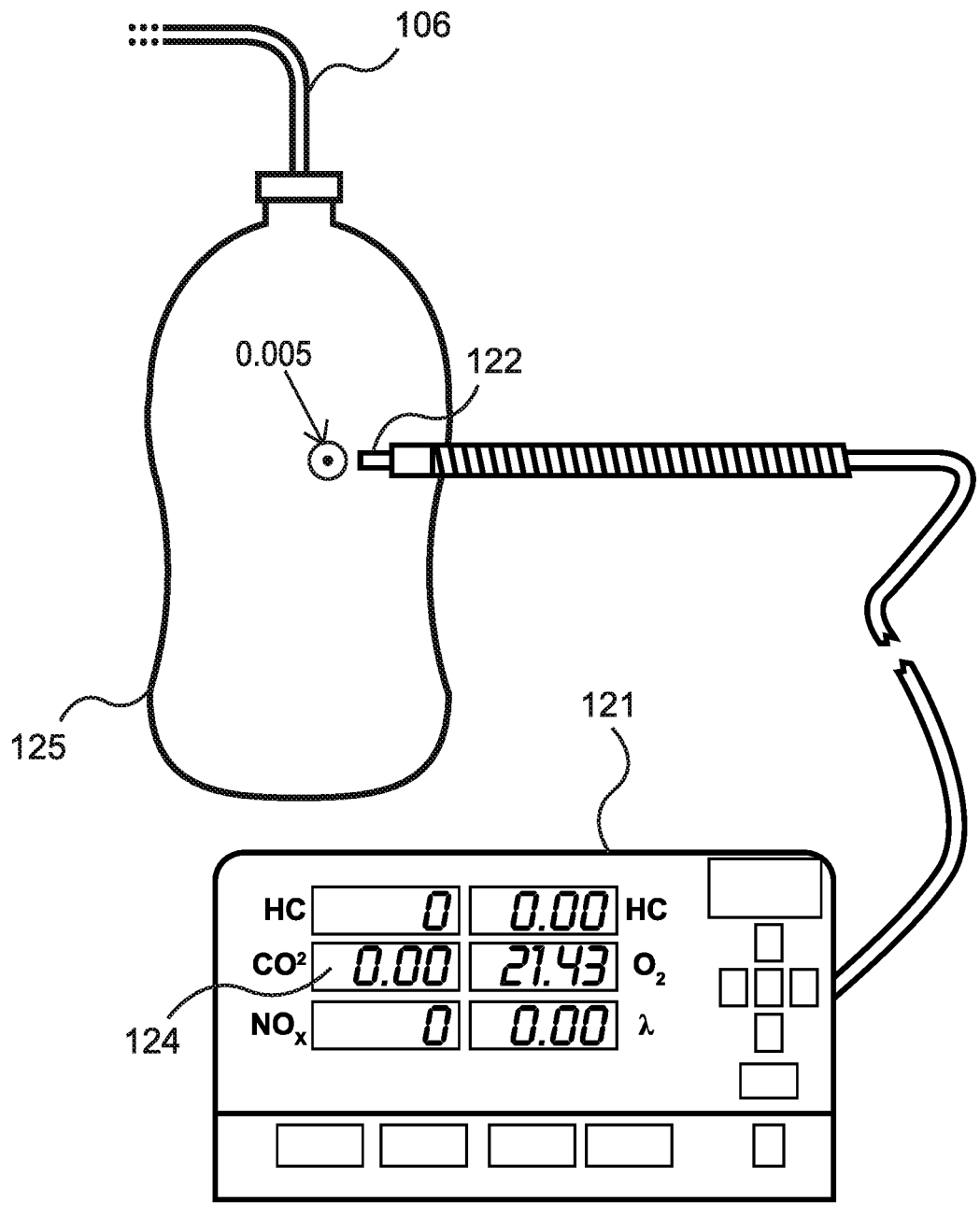
Figure 9D:
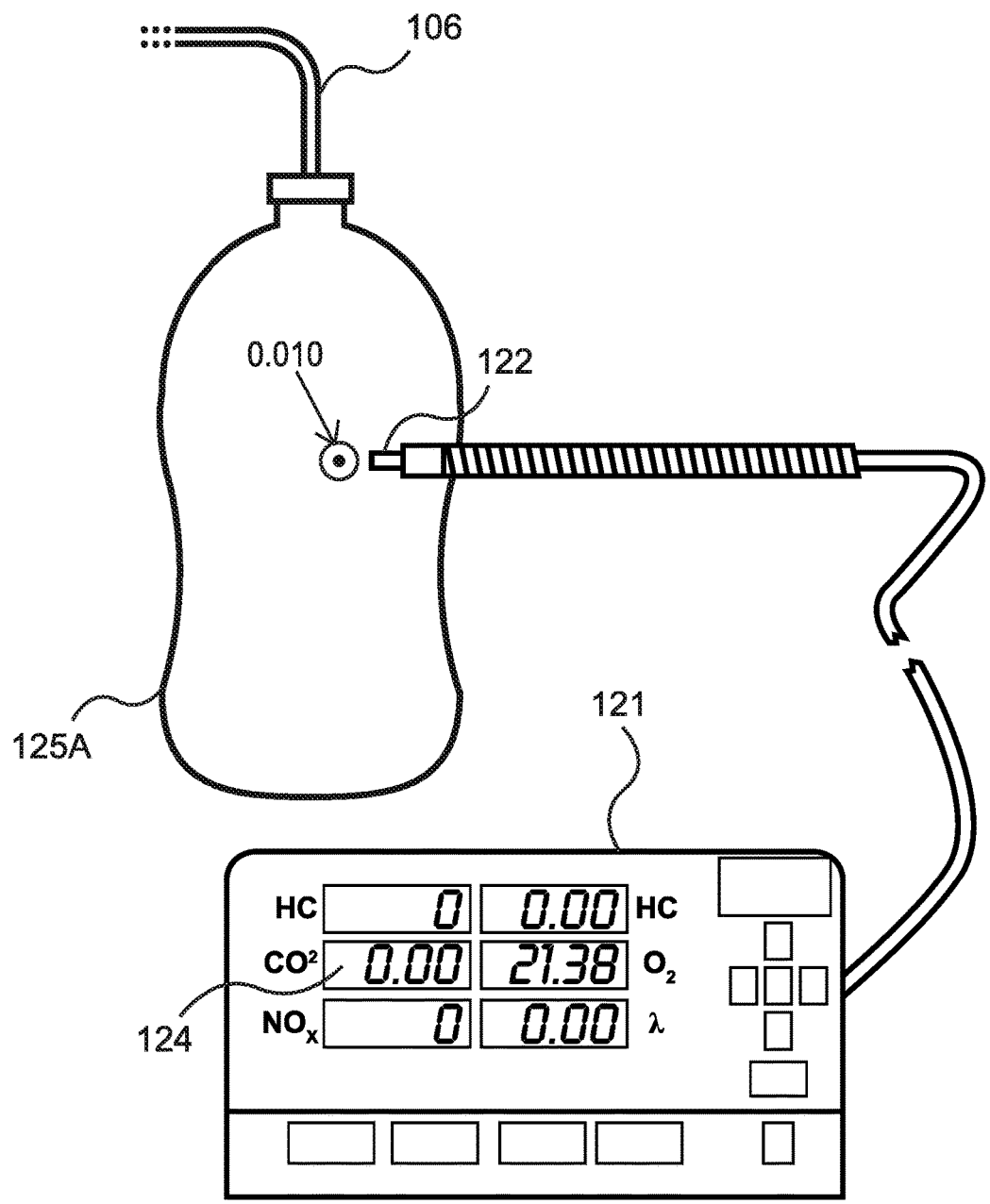
Figure 9E:
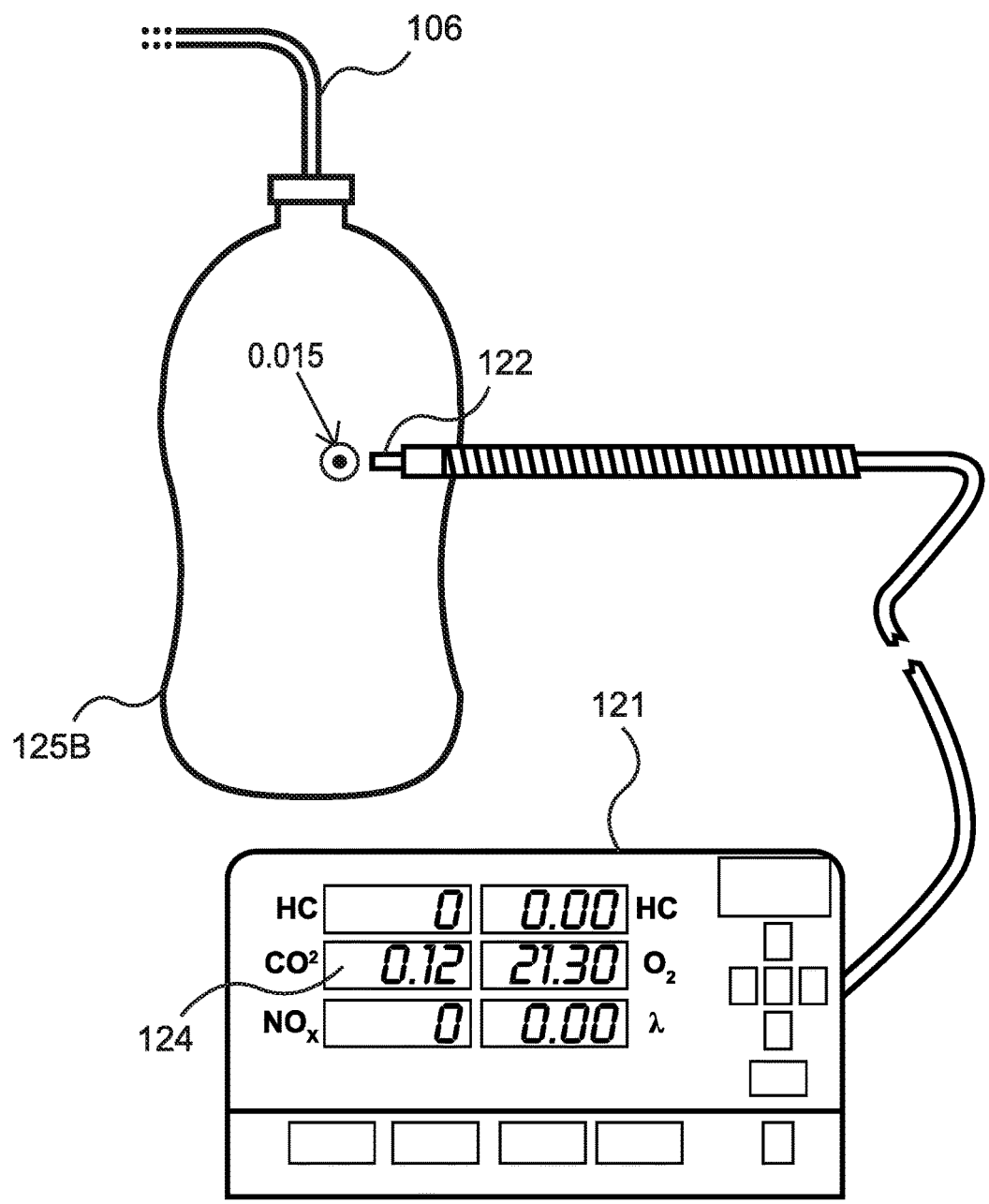
Figure 9F:
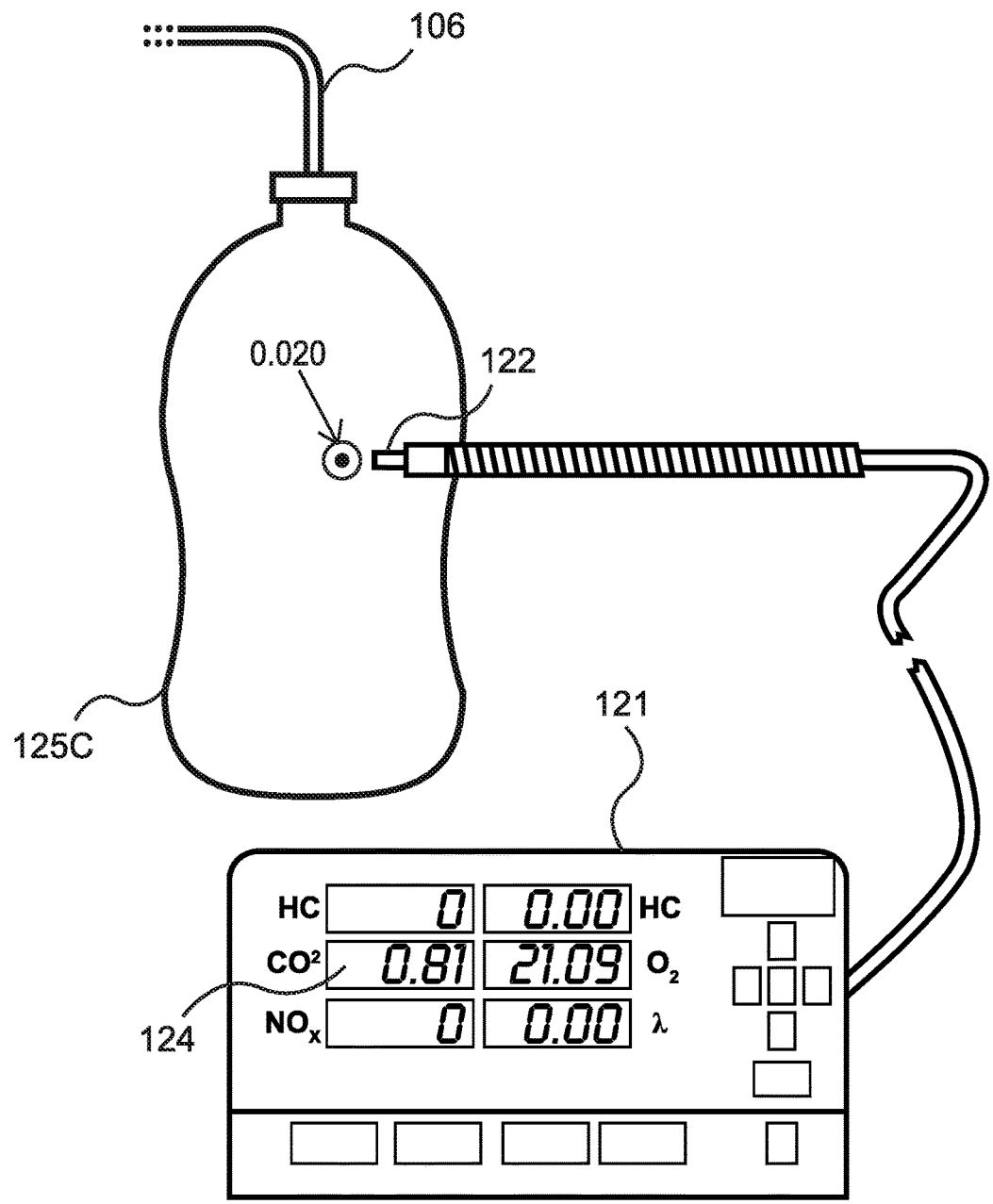
Figure 9G:
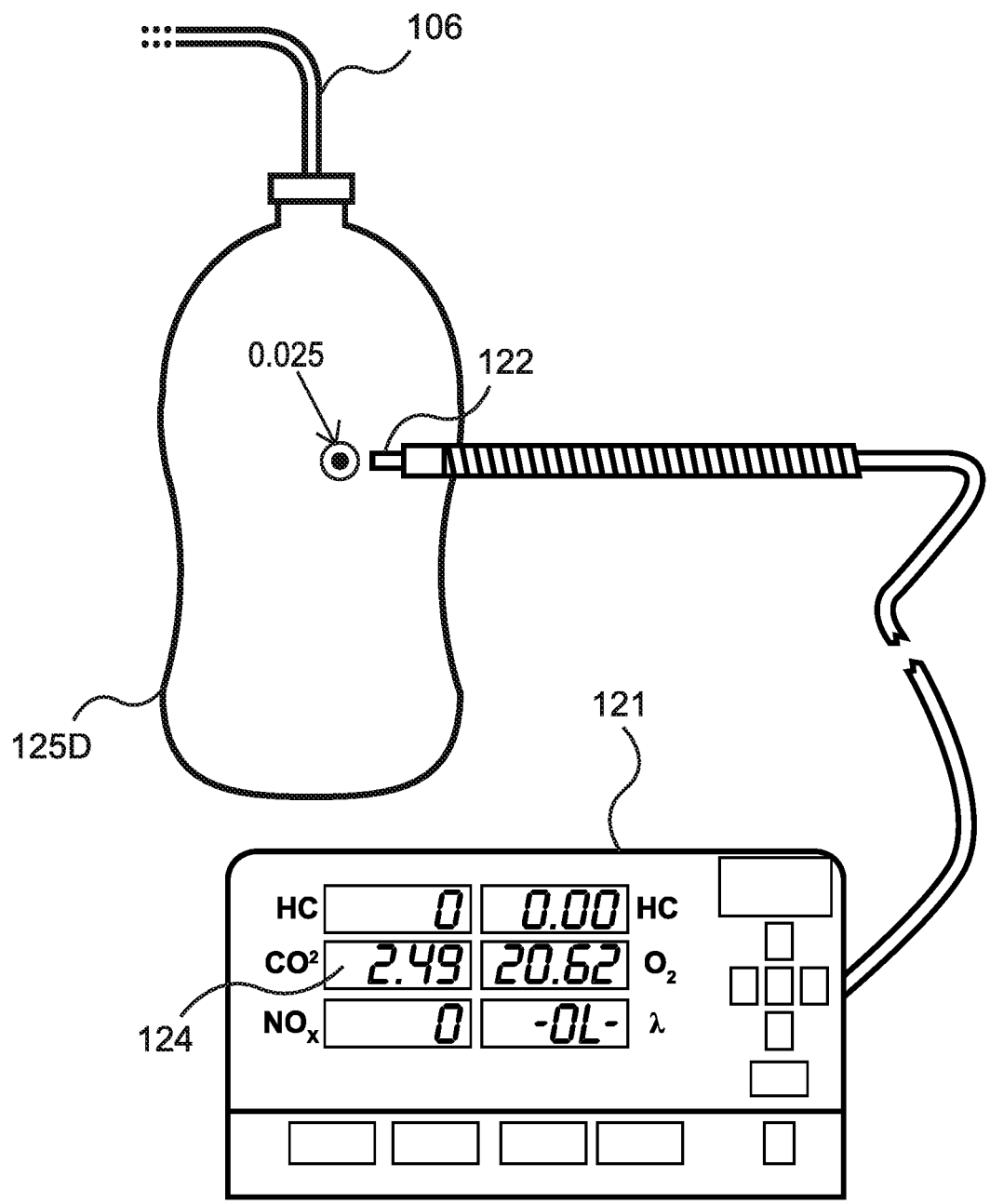
Figure 9H:
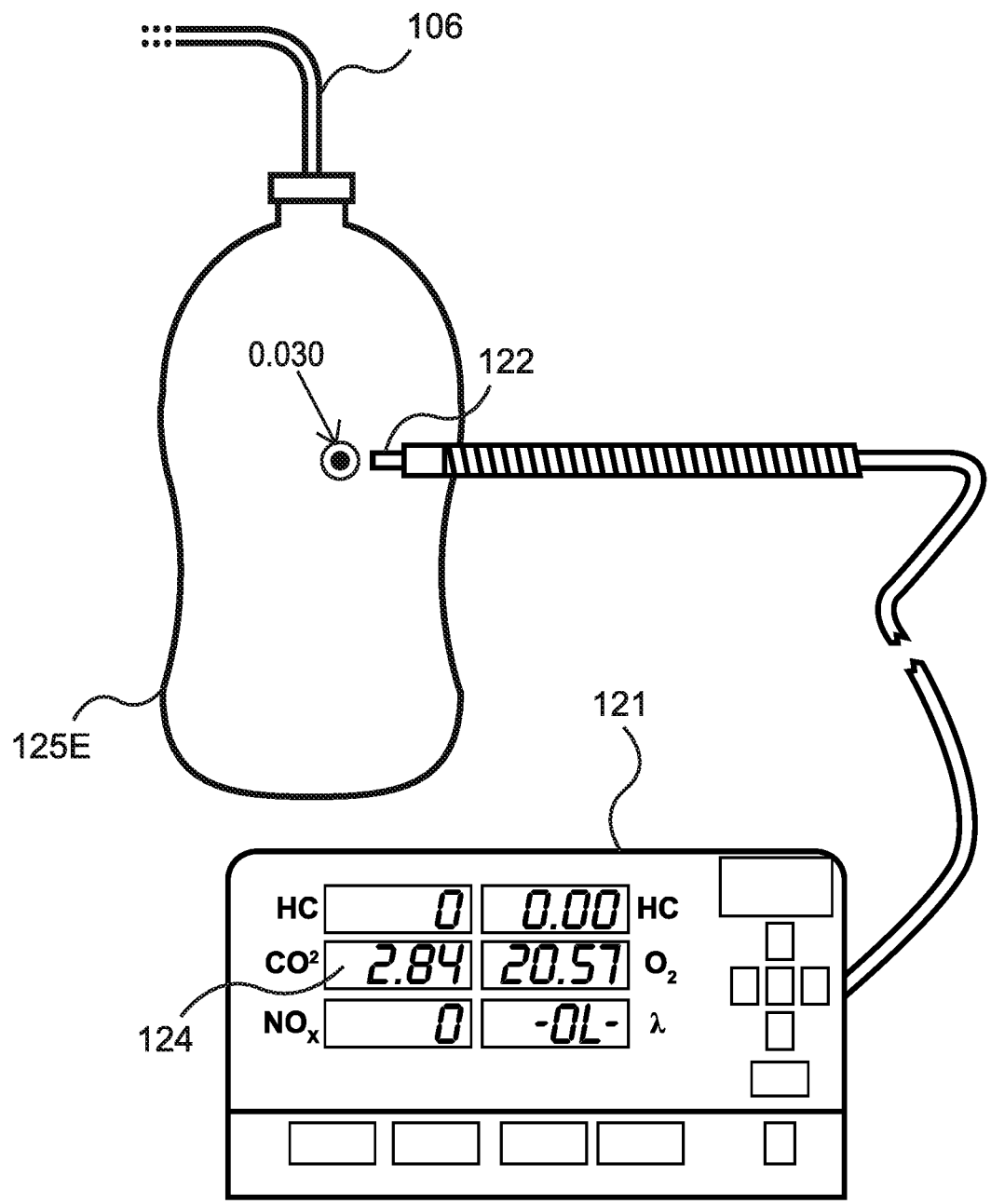
Figure 9I:
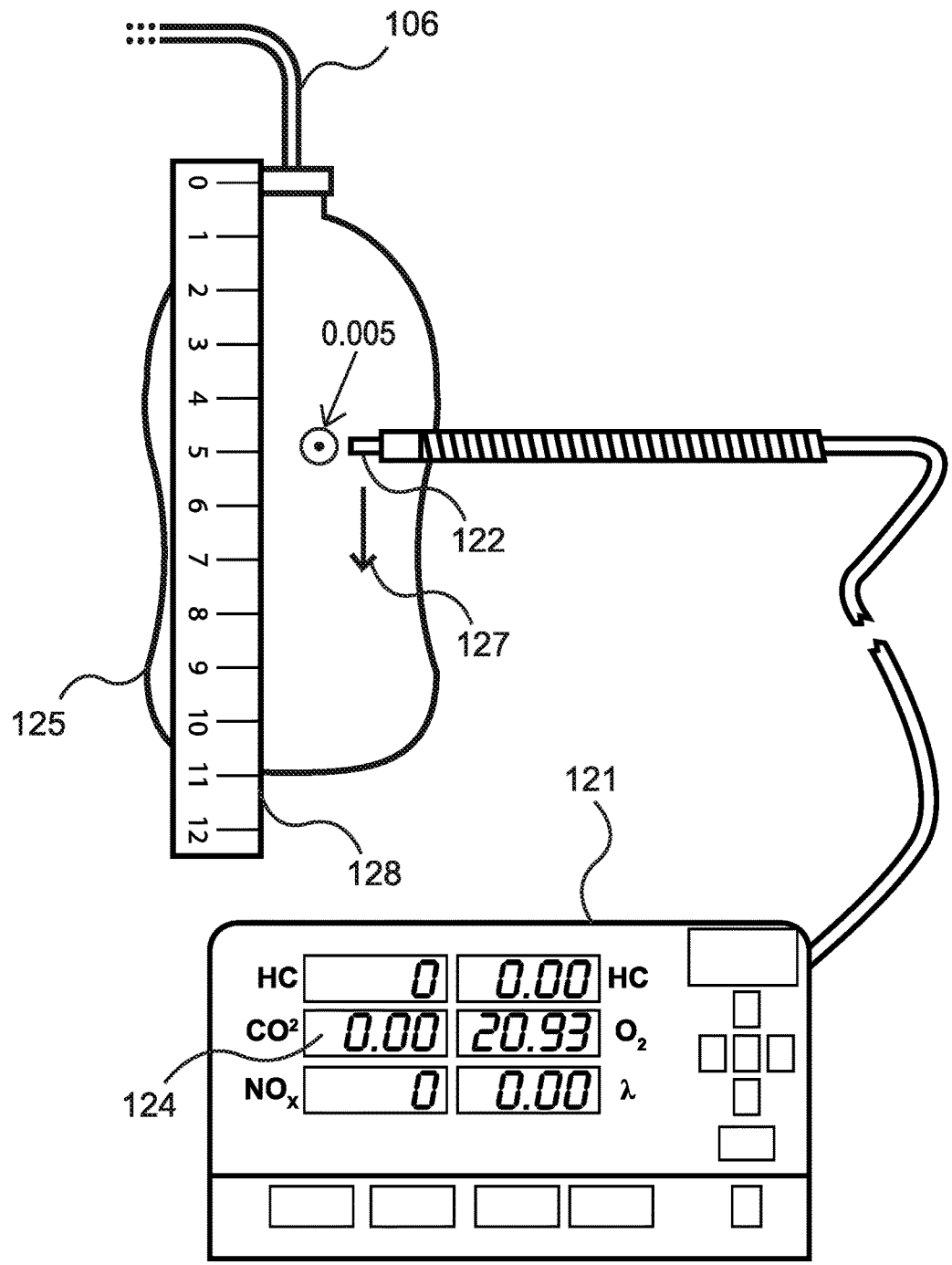
Figure 9J:
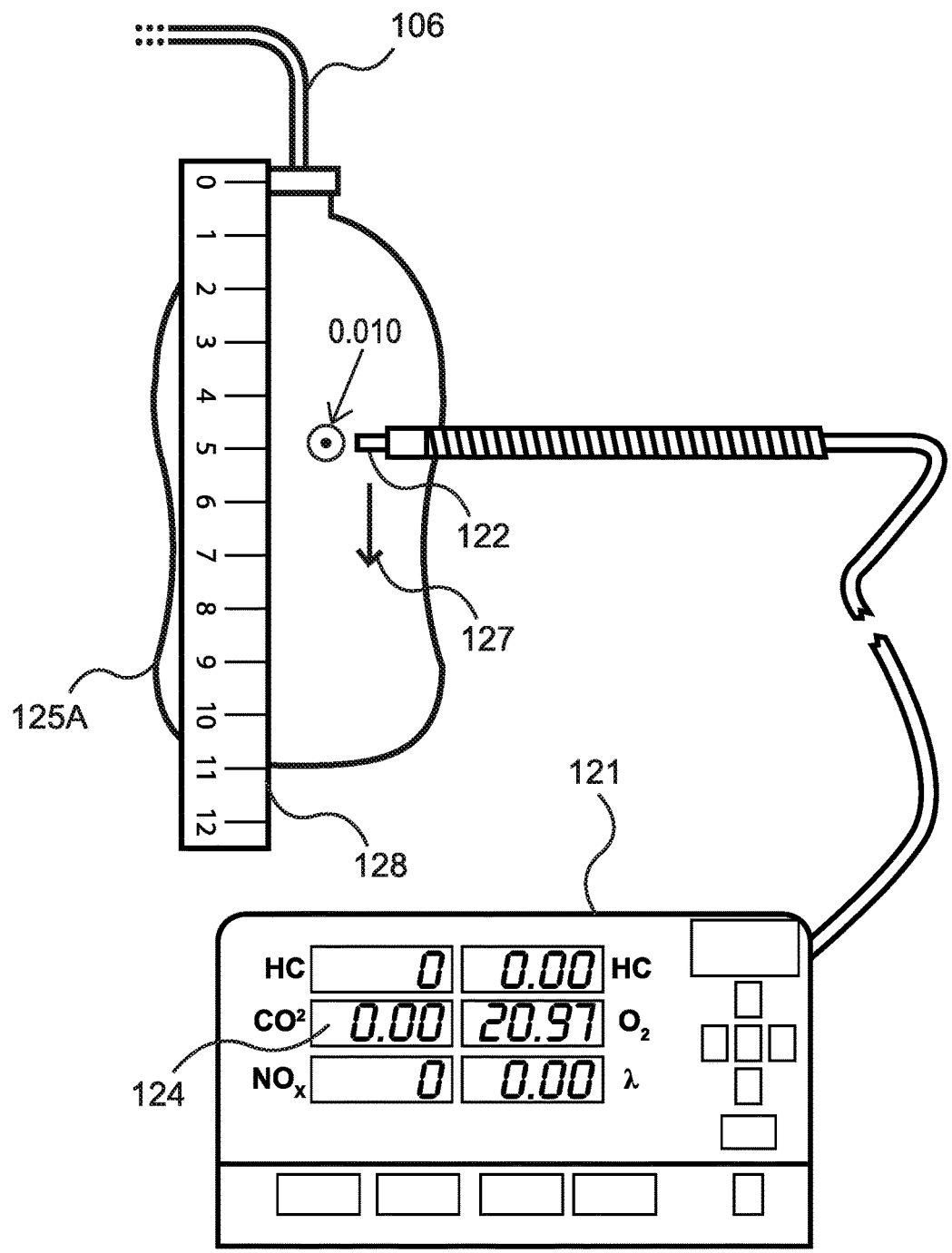
Figure 9K:
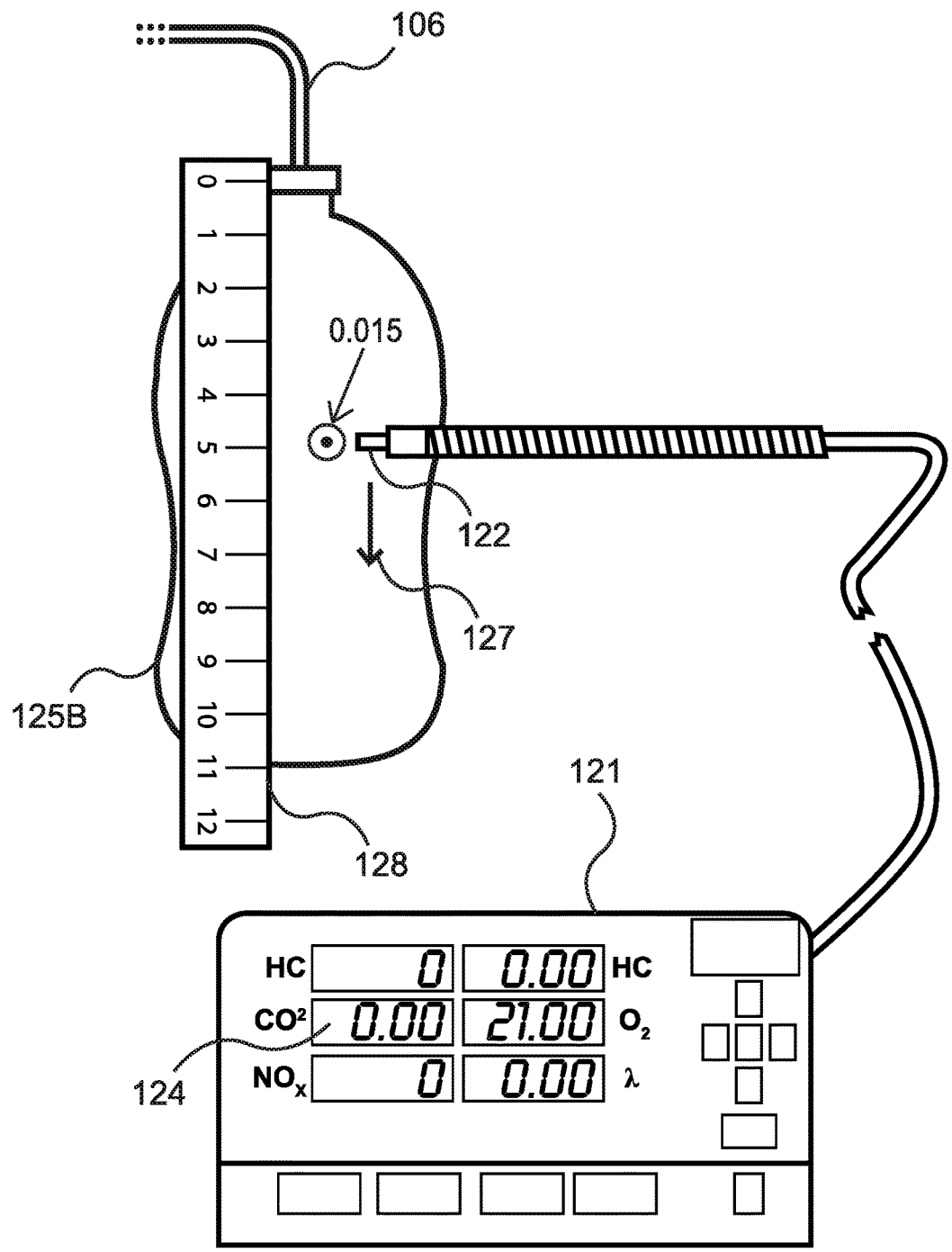
Figure 9L:
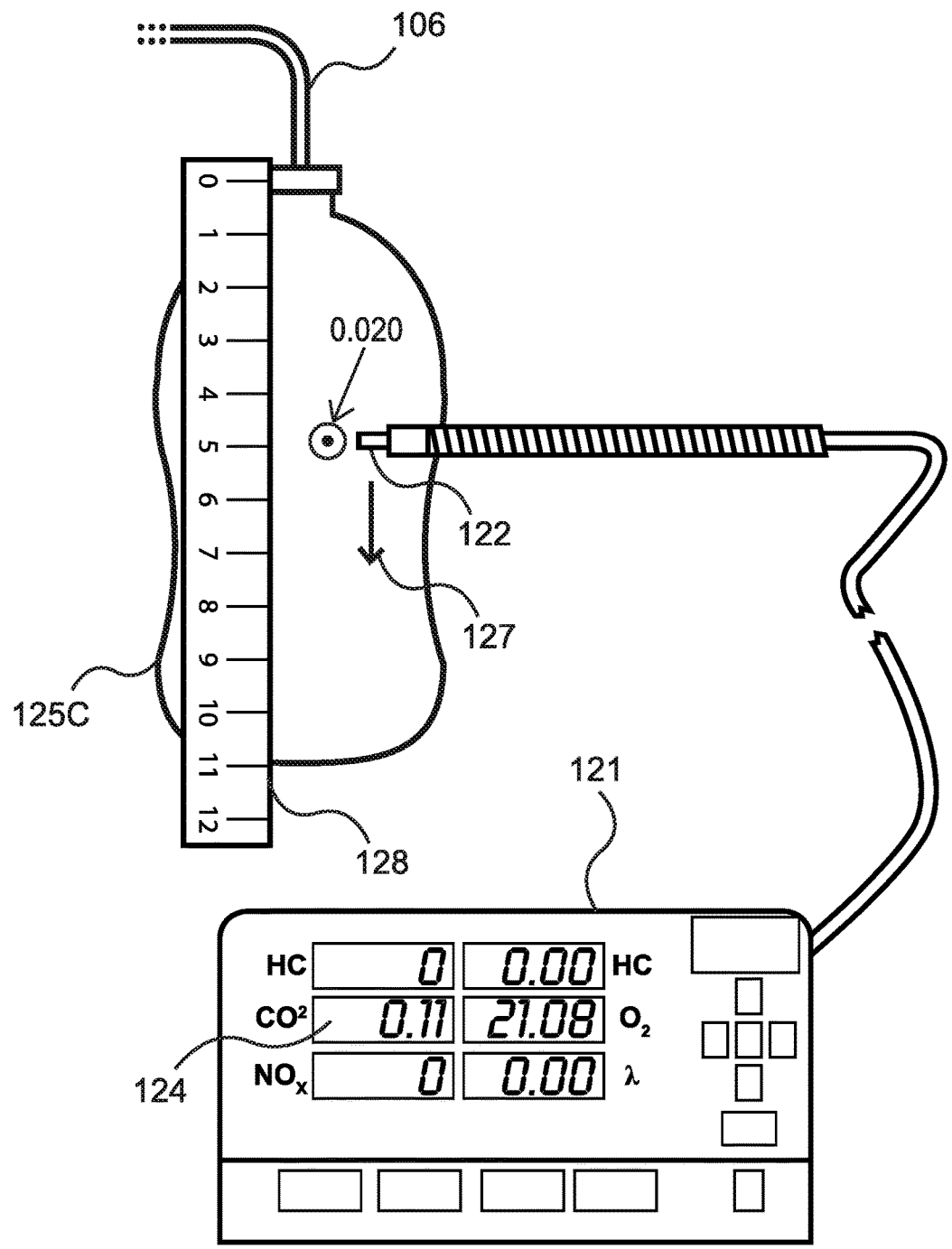
Figure 9M:
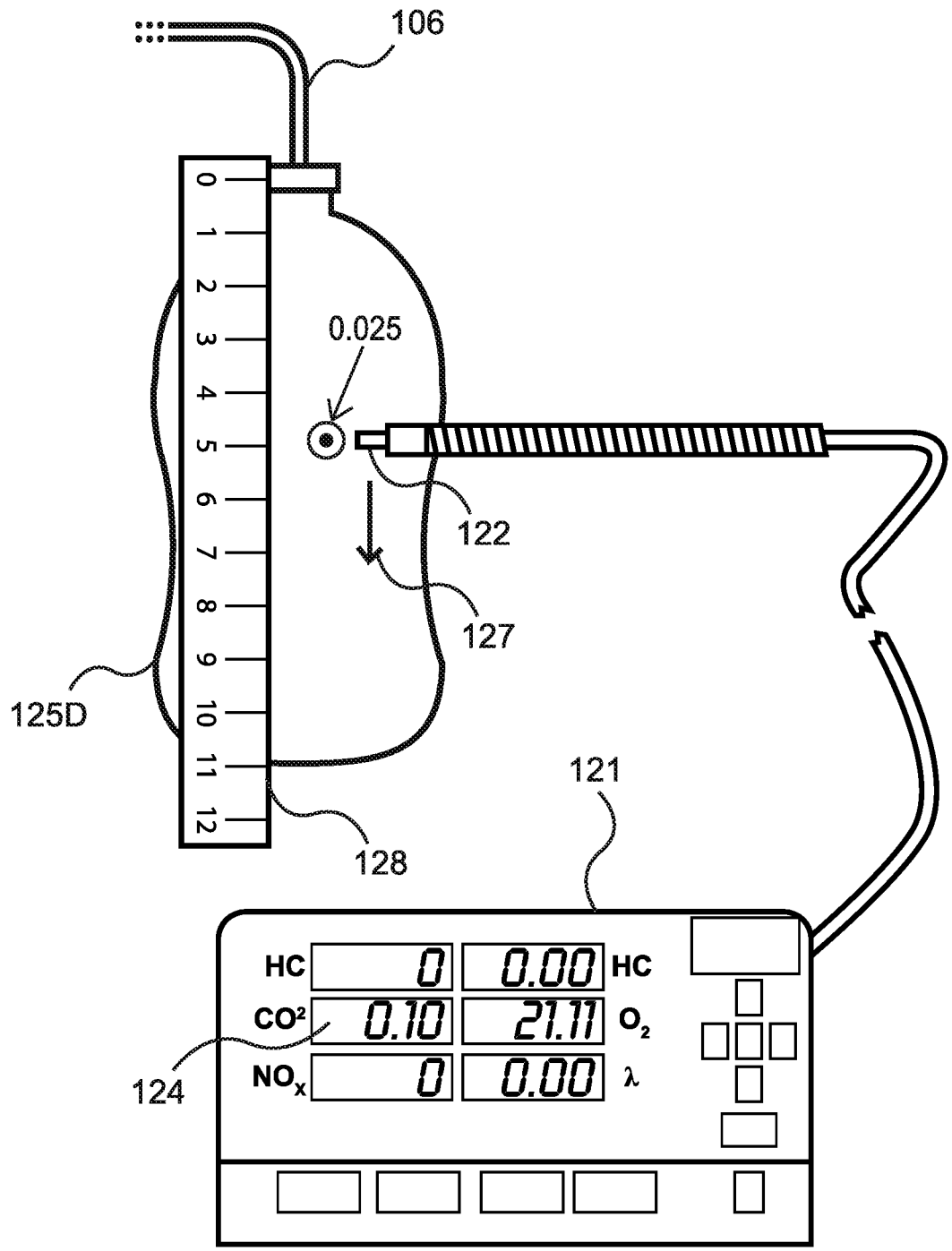
Figure 9N:
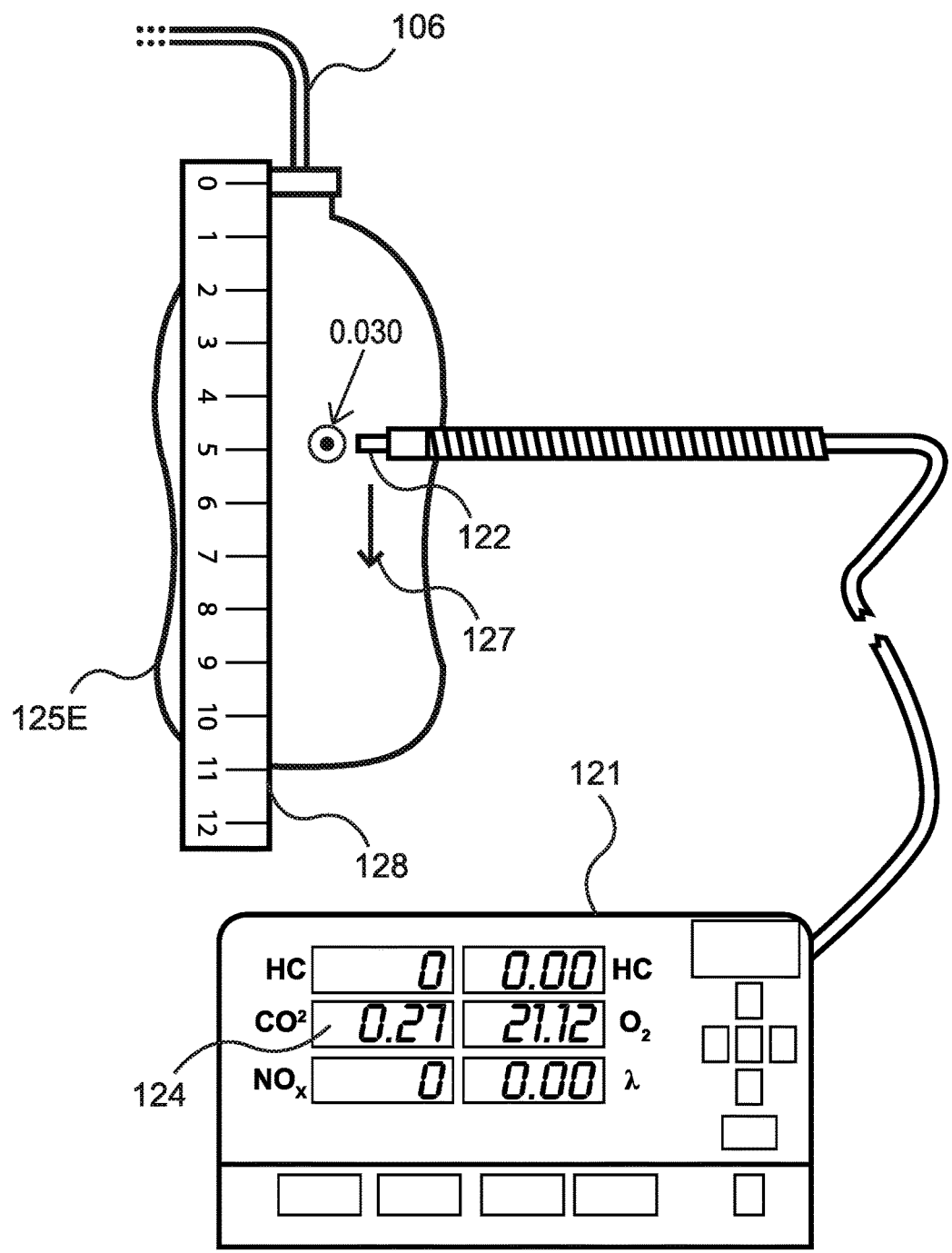
Figure 10:
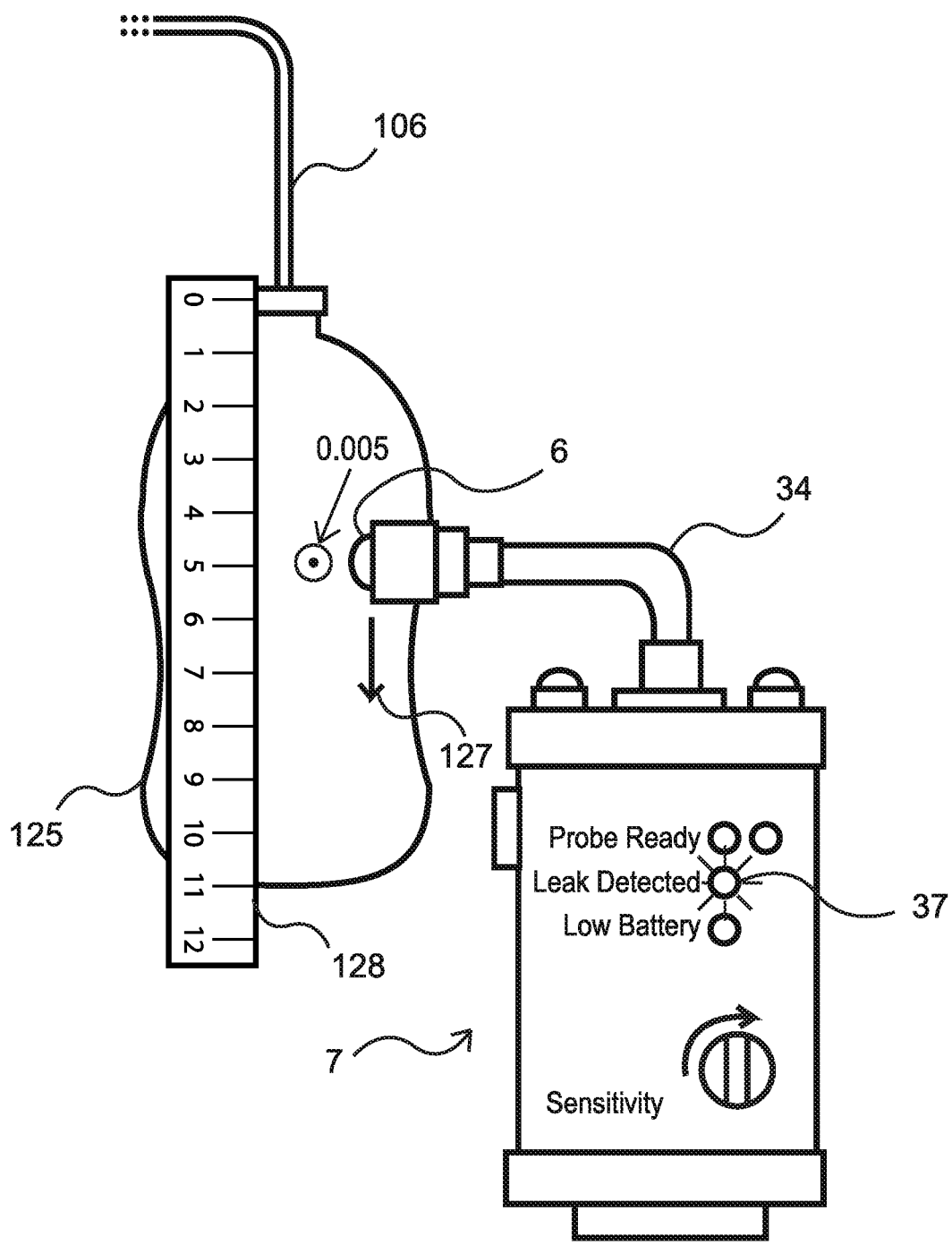
FIG. 10 is a drawing illustrating the use of the leak detector of the present invention identifying the location of a leak site 0.005" in diameter.

This fifth limitation is demonstrated with reference to FIGS. 9A-N. In each case the size of the leak site (i.e., from 0.001" to 0.030" in diameter) and location are known. Further, except in reference to FIGS. 9A and 9B, a closed plastic bottle (having a leak site) pressurized with $CO_2$ represents the sealed (or closed), but leaking system. In all of the tests an ATS Emission—5 Gas Analyzer 121 in proper calibration was used. It was on for a minimum of 15 minutes and was fully warmed up. Carbon dioxide ($CO_2$) pressure was regulated to 0.5 psi and allowed to fill each container completely before testing was carried out and no other substance (e.g., gasoline) was in the container. In the tests illustrated in FIGS. 9A-9H the gas analyzer probe 122 was held stationary for greater than 30 seconds directly above the leak site. Obviously this is not real world testing, but was designed to give the gas analyzer the best possible chance to detect the presence of $CO_2$ from the leak site. In FIGS. 9I-9N the gas analyzer probe was moving at less than 1 inch per second, which is very slow and not a real world condition, and the time after crossing the leak site was extended approximately 30 seconds to account for the maximum latency of any gas analyzer. The highest concentration value over this 30 second period is shown on the digital readout 124. Again this is not real world testing but allows the gas analyzer the best possible chance to detect the leak site.

FIG. 9A shows ATS 5 gas analyzer (EMS 1000) 121 testing for a $CO_2$ leak from fitting 103 having a 0.001" orifice from O'Keefe Controls Co. coupled to test block 104. The other end of the test block is coupled to the source of $CO_2$ (not shown). The gas analyzer probe 122 was held stationary directly above the leak site for 30 seconds, and as can be seen on the display panel 124, 0.00% $CO_2$ was registered.

FIG. 9B shows the ATS 5 gas analyzer (EMS 1000) 121 testing for a $CO_2$ leak from fitting 107 having a 0.002" orifice from O'Keefe Controls Co., again coupled to test block 104 as described above. The gas analyzer probe 122 was held stationary directly above the leak site for 30 seconds, and as can be seen on the display panel 124, 0.00% $CO_2$ was registered.

FIG. 9C shows the ATS 5 gas analyzer (EMS 1000) 121 testing for a leak in a plastic bottle 125 pressurized with $CO_2$ to 0.5 psi with an approximate 0.005" diameter orifice hole. Again, the gas analyzer probe 122 was held stationary directly above the leak site for 30 seconds, and as can be seen on the display panel 124, 0.00% $CO_2$ is registered.

FIG. 9D shows the ATS 5 gas analyzer (EMS 1000) 121 testing for a leak in a plastic bottle 125A pressurized with $CO_2$ to 0.5 psi with an approximate 0.010" diameter orifice hole. The gas analyzer probe 122 was held stationary directly above the leak site for 30 seconds, and as can be seen on the display panel 124, 0.00% $CO_2$ is registered.

FIG. 9E shows the ATS 5 gas analyzer (EMS 1000) 121 testing for a leak in a plastic bottle 125B pressurized with $CO_2$ to 0.5 psi with an approximate 0.015" diameter orifice hole. The gas analyzer probe 122 was held stationary directly above the leak site for 30 seconds, and as can be seen on the display panel 124, 0.12% $CO_2$ is registered.

FIG. 9F shows the ATS 5 gas analyzer (EMS 1000) 121 testing for a leak in a plastic bottle 125C pressurized with $CO_2$ to 0.5 psi with an approximate 0.020" diameter orifice hole. The gas analyzer probe 122 was held stationary directly above the leak site for 30 seconds, and as can be seen on the display panel 124, 0.81% $CO_2$ is registered.

FIG. 9G shows the ATS 5 gas analyzer (EMS 1000) 121 testing for a leak in a plastic bottle 125D pressurized with $CO_2$ to 0.5 psi with an approximate 0.025" diameter orifice hole. The gas analyzer probe 122 was held stationary directly above the leak site for 30 seconds, and as can be seen on the display panel 124, 2.49% $CO_2$ is registered.

FIG. 9H shows the ATS 5 gas analyzer (EMS 1000) 121 testing for a leak in a plastic bottle 125E pressurized with $CO_2$ to 0.5 psi with an approximate 0.030" diameter orifice hole. The gas analyzer probe 122 was held stationary directly above the leak site for 30 seconds, and as can be seen on the display panel 124, 2.84% $CO_2$ is registered.

FIG. 9I shows the ATS 5 gas analyzer (EMS 1000) 121 testing a for leak in plastic bottle 125 pressurized with $CO_2$ to 0.5 psi with an approximate 0.005" diameter orifice hole. The gas analyzer probe 122 is moving, as indicated by arrow 127, slower than 1 inch per second across the leak site, and as can be seen on the display panel 124, 0.00% $CO_2$ is registered. The speed and distance in this test, as well as those discussed in reference to FIGS. 9J-N, was determined by the tape measure 128 and a stop watch (not shown).

FIG. 9J shows the ATS 5 gas analyzer (EMS 1000) 121 testing for a leak in plastic bottle 125A pressurized with $CO_2$ to 0.5 psi with an approximate 0.010" diameter orifice hole. The gas analyzer probe 122 is moving slower than 1 inch per second across the leak site, and as can be seen on the display panel 124, 0.00% $CO_2$ is registered.

FIG. 9K shows the ATS 5 gas analyzer (EMS 1000) 121 testing for a leak in plastic bottle 125B pressurized with $CO_2$ to 0.5 psi with an approximate 0.015" diameter orifice hole. The gas analyzer probe 122 is moving slower than 1 inch per second across the leak site, and as can be seen on the display panel 124, 0.00% $CO_2$ is registered.

FIG. 9L shows the ATS 5 gas analyzer (EMS 1000) 121 testing for a leak in plastic bottle 125C pressurized with $CO_2$ to 0.5 psi with an approximate 0.020" diameter orifice hole. The gas analyzer probe 122 is moving slower than 1 inch per second across the leak site, and as can be seen on the display panel 124, 0.11% $CO_2$ is registered.

FIG. 9M shows the ATS 5 gas analyzer (EMS 1000) 121 testing for a leak in plastic bottle 125D pressurized with $CO_2$ to 0.5 psi with an approximate 0.025" diameter orifice hole. The gas analyzer probe 122 is moving slower than 1 inch per second across the leak site, and as can be seen on the display panel 124, 0.10% $CO_2$ is registered.

FIG. 9N shows the ATS 5 gas analyzer (EMS 1000) 121 testing for a leak in plastic bottle 125E pressurized with $CO_2$ to 0.5 psi with an approximate 0.030" diameter orifice hole. The gas analyzer probe is moving slower than 1 inch per second across the leak site, and as can be seen on the display panel 124, 0.27% $CO_2$ is registered.

In contrast with the tests illustrated and described in reference to FIGS. 9I-N, FIG. 10 shows the use of detector 7 of the present invention (with sensor 6 in the black tip at the end of the yellow flexible connector 34) testing for a leak in plastic bottle 125 pressurized with $CO_2$ to 0.5 psi with an approximate 0.005" diameter orifice hole. (Though not specifically labeled, detector 7 is clearly identified by the words PROBE READY (and associated lights), LEAK DETECTED (and the associated light), LOW BATTERY (and the associated light), and SENSITIVITY (and the associated knob). Further, to simulate real world testing conditions, detector 7 (sensor 6) was moving faster than 4 inches per second across the leak site, and as can be seen by alert lamp 37, the leak site is identified. Further, detector 7 identified the location of the leak site in less than 1 second after crossing over the hole. It should be understood that if detector 7 can find these very small leak sites when moving very fast, larger leaks are no problem and, therefore, not illustrated in reference to the hole sizes tested in FIG. 9J-9N.

As is evident from the discussion of the testing illustrated in FIGS. 8A-X, smoke machines (such as disclosed in Pieroni) are not effective in identifying leaks smaller than a hole 0.020" in diameter. Gas analyzers are also ineffective, as is evident from the testing described in reference to FIGS. 9I-N. These limitations present an additional problem in testing to determine whether or not there actually is a leak in those systems where control or monitoring equipment associated with such systems indicates that a leak (at an unspecified location or locations) is present. In the case of motor vehicles, the fuel containment and handling system of such vehicles is monitored by the Engine Control Module (or ECM), which ECM will set what is known as a Diagnostic Trouble Code (or DTC) if there actually is a leak, or, for instance, one or more sensors is defective or providing a false reading. When a Diagnostic Trouble Code (DTC) is set for leakage the technician assumes there actually is a leak. To validate the DTC the method that the technician uses will be very important. If this method cannot clearly determine that a leak is present or not present within the fuel containment and handling system, then a false DTC cannot be ruled out. One example would be if the fuel gauge is misreading. The ECM checks the enabling criteria to make sure that the test results will be accurate. If the fuel tank is full, there is not enough vapor space in the fuel tank to accurately run the EVAP leak test so the test sequence is suspended. However, if the fuel level gauge misreads the fuel level the test will be allowed to run when the test should have been suspended. This will happen when the fuel tank is full, but the fuel gauge reads that the fuel level in the fuel tank is only ½ filled. In this situation the ECU calculates the vapor space within the fuel tank at ½ being that of vapor space. This, in turn, can set a false leak DTC, instead of flagging a misreading fuel gauge. The present invention (e.g., detector 7) can clearly and quickly determine if a leak is present or not within the fuel containment and handling system and, therefore, can determine if the DTC is a false DTC or not. If no leak is found, the false DTC is flagged and the technician can focus on the cause(s) of such false DTC.

Whereas the drawings and accompanying description have shown and described the preferred embodiments of the present invention, it should be apparent to those skilled in the art that various changes may be made in the forms and uses of the inventions without affecting the scope thereof. For instance, testing to determine whether or not there is a leak could also be applied to systems other than fuel containment and handling systems, such as air conditioning systems and plumbing systems.

We claim:

1. A method of detecting a leak from a leak site in a sealed system, the sealed system including one or more external surfaces; the method including the use of a source of pressurized $CO_2$ gas external to the sealed system which gas is capable of passing through the leak site: the method also including the use of a detector capable of detecting the presence of the $CO_2$ gas after it has passed through the leak site; the method further including the use of a composition of matter which foams or is in the form of a foam when applied to the one or more external surfaces (herein "foam") and adheres to the one or more external surfaces, the composition of matter including water and an indicator which changes from a first color to a second color in the presence of $CO_2$ escaping from the leak site and reacting with the water; the method including the steps of:

injecting the $CO_2$ gas from the external source into the sealed system to a pressure in excess of the pressure surrounding the sealed system;

scanning with the detector at least some of the one or more external surfaces of the sealed system for the presence of the $CO_2$ gas escaping from the leak site in the sealed system to identify the base location of the leak site;

covering the external surface in the area including the base location identified by the detector with the foam;

reacting the $CO_2$ escaping from the leak site directly with the water, thereby changing the pH of the water over the leak site and both the indicator and the foam over the leak site from the first color to the second color; and examining the foam after it has been applied to locate the leak site by the presence of the second color around the leak site.

2. The method as set forth in claim 1, wherein the indicator is a colorimetric pH indicator and wherein the method includes the use of a colorimetric pH indicator to change the color of the foam over the leak site.

3. The method as set forth in claim 2, wherein the indicator is selected from the group including phenol red, bromothymol blue, neutral red, cresol red, azolitmin and naptholphthalein.

4. The method as set forth in claim 2, wherein the indicator is phenol red, the foam is pinkish in color, and wherein the $CO_2$ escaping from the leak site changes the color of the foam from pinkish to yellow over the leak site.

5. The method as set forth in claim 1, further including the step of providing the external source of $CO_2$ gas with a pressure regulator, and wherein the method further includes the step of setting the pressure of the $CO_2$ gas being injected into the sealed system.

6. The method as set forth in claim 5, further including the step of adjusting the pressure of the $CO_2$ gas being injected into the sealed system.

* * * * *

UNITED STATES PATENT AND TRADEMARK OFFICE
CERTIFICATE OF CORRECTION

PATENT NO. : 10,222,291 B2
APPLICATION NO. : 13/789319
DATED : March 5, 2019
INVENTOR(S) : Bernie C. Thompson et al.

It is certified that error appears in the above-identified patent and that said Letters Patent is hereby corrected as shown below:

In the Claims

Column 20, Lines 7-10, cancel Claim 4 and insert the following correct claim language:
--4. The method as set forth in claim 3, wherein the indicator is phenol red, the foam is pinkish in color, and wherein the $CO_2$ escaping from the leak site changes the color of the foam from pinkish to yellow over the leak site.--

Signed and Sealed this
Thirtieth Day of April, 2019

Andrei Iancu
*Director of the United States Patent and Trademark Office*